(12) United States Patent
Rosenflanz

(10) Patent No.: US 7,147,544 B2
(45) Date of Patent: *Dec. 12, 2006

(54) GLASS-CERAMICS

(75) Inventor: Anatoly Z. Rosenflanz, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 44 days.

This patent is subject to a terminal disclaimer.

(21) Appl. No.: 10/211,044

(22) Filed: Aug. 2, 2002

(65) Prior Publication Data

US 2003/0145525 A1 Aug. 7, 2003

Related U.S. Application Data

(63) Continuation-in-part of application No. 09/922,530, filed on Aug. 2, 2001, now abandoned, and a continuation-in-part of application No. 09/922,528, filed on Aug. 2, 2001, now abandoned, and a continuation-in-part of application No. 09/922,527, filed on Aug. 2, 2001, now abandoned, and a continuation-in-part of application No. 09/922,526, filed on Aug. 2, 2001, now abandoned.

(51) Int. Cl.
*B24B 7/19* (2006.01)

(52) U.S. Cl. .................. 451/28; 51/307; 51/309; 428/426; 501/2; 501/10; 501/41; 501/127

(58) Field of Classification Search ............. 428/426; 51/307, 308, 309; 501/2, 10, 41, 127; 451/28
See application file for complete search history.

(56) References Cited

U.S. PATENT DOCUMENTS

| 659,926 A | 10/1900 | Jacobs |
|---|---|---|
| 906,339 A | 12/1908 | Tone |
| 960,712 A | 6/1910 | Saunders |
| 1,037,999 A | 9/1912 | Saunders |
| 1,107,011 A | 8/1914 | Allen |
| 1,149,064 A | 8/1915 | Kalmus |
| 1,161,620 A | 11/1915 | Coulter |
| 1,192,709 A | 7/1916 | Tone |
| 1,240,490 A | 9/1917 | Saunders et al. |
| 1,247,337 A | 11/1917 | Saunders et al. |
| 1,257,356 A | 2/1918 | Hutchins |
| 1,263,708 A | 4/1918 | Saunders et al. |
| 1,263,709 A | 4/1918 | Saunders et al. |
| 1,263,710 A | 4/1918 | Saunders et al. |
| 1,268,532 A | 6/1918 | Allen |
| 1,268,533 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |

(Continued)

FOREIGN PATENT DOCUMENTS

AT 333146 11/1976

(Continued)

OTHER PUBLICATIONS

U.S. Application entitled "Method of Making Abrasive Particles", filed Dec. 18, 2003, having U.S. Appl. No. 10/739,624.

(Continued)

*Primary Examiner*—Archene Turner

(57) ABSTRACT

Glass-ceramics and methods of making the same. Embodiments of the invention include abrasive particles. The abrasive particles can be incorporated into a variety of abrasive articles, including bonded abrasives, coated abrasives, nonwoven abrasives, and abrasive brushes.

25 Claims, 7 Drawing Sheets

U.S. PATENT DOCUMENTS

| | | |
|---|---|---|
| 1,910,444 A | 5/1933 | Nicholson |
| 2,000,857 A | 5/1935 | Masin |
| 2,206,081 A | 7/1940 | Eberlin |
| 2,424,645 A | 7/1947 | Baumann, Jr. et al. |
| 2,618,567 A | 11/1952 | Cornstock, III |
| 2,805,166 A | 9/1957 | Loffler |
| 2,958,593 A | 11/1960 | Hoover et al. |
| 2,961,296 A | 11/1960 | Fenerty |
| 3,041,156 A | 6/1962 | Rowse et al. |
| 3,141,747 A | 7/1964 | Marshall |
| 3,174,871 A | 3/1965 | Geffcken et al. |
| 3,181,939 A | 5/1965 | Marshall et al. |
| 3,216,794 A | 11/1965 | Roschuk |
| 3,377,660 A | 4/1968 | Marshall et al. |
| 3,498,769 A | 3/1970 | Coes, Jr. |
| 3,625,717 A | 12/1971 | Grubba et al. |
| 3,635,739 A | 1/1972 | Macdowell et al. |
| 3,637,361 A | 1/1972 | Kita et al. |
| 3,646,713 A | 3/1972 | Marshall et al. |
| 3,650,780 A | 3/1972 | Connelly |
| 3,714,059 A | 1/1973 | Shaw et al. |
| 3,717,583 A | 2/1973 | Shaw et al. |
| 3,726,621 A | 4/1973 | Cichy |
| 3,754,978 A | 8/1973 | Elmer et al. |
| 3,781,172 A | 12/1973 | Pett et al. |
| 3,792,553 A | 2/1974 | Schleifer et al. |
| 3,859,407 A | 1/1975 | Blanding et al. |
| 3,881,282 A | 5/1975 | Watson |
| 3,891,408 A | 6/1975 | Rowse et al. |
| 3,893,826 A | 7/1975 | Quinan et al. |
| 3,916,584 A | 11/1975 | Howard et al. |
| 3,926,603 A | 12/1975 | Plesstinger et al. |
| 3,928,515 A | 12/1975 | Richmond et al. |
| 3,940,276 A | 2/1976 | Wilson |
| 3,947,281 A | 3/1976 | Bacon |
| 3,973,977 A | 8/1976 | Wilson |
| 3,996,702 A | 12/1976 | Leahy |
| 4,014,122 A | 3/1977 | Woods |
| 4,035,162 A | 7/1977 | Brothers et al. |
| 4,049,397 A | 9/1977 | Bockstiegel et al. |
| 4,059,417 A | 11/1977 | Ilmaier et al. |
| 4,070,796 A | 1/1978 | Scott |
| 4,073,096 A | 2/1978 | Ueltz et al. |
| 4,111,668 A | 9/1978 | Walker et al. |
| 4,111,707 A | 9/1978 | Komorita et al. |
| 4,126,429 A | 11/1978 | Watson |
| 4,140,494 A | 2/1979 | Coes, Jr. |
| 4,157,898 A | 6/1979 | Walker et al. |
| 4,182,437 A | 1/1980 | Roberts et al. |
| 4,194,887 A | 3/1980 | Ueltz et al. |
| 4,217,264 A | 8/1980 | Mabie et al. |
| 4,218,253 A | 8/1980 | Dworak et al. |
| 4,238,213 A | 12/1980 | Pallo et al. |
| 4,261,706 A | 4/1981 | Blanding et al. |
| 4,311,489 A | 1/1982 | Kressner |
| 4,314,827 A | 2/1982 | Leitheiser et al. |
| 4,316,964 A | 2/1982 | Lange |
| 4,341,533 A | 7/1982 | Daire et al. |
| RE31,128 E | 1/1983 | Walker et al. |
| 4,405,545 A | 9/1983 | Septier et al. |
| 4,415,510 A | 11/1983 | Richmond |
| 4,439,845 A | 3/1984 | Geohegan, Jr. et al. |
| 4,457,767 A | 7/1984 | Poon et al. |
| 4,467,767 A | 8/1984 | Kampichler et al. |
| 4,472,511 A | 9/1984 | Mennemann et al. |
| RE31,725 E | 11/1984 | Walker et al. |
| 4,489,022 A | 12/1984 | Robyn et al. |
| 4,518,397 A | 5/1985 | Leitheiser et al. |
| 4,530,909 A | 7/1985 | Makishima et al. |
| 4,543,107 A | 9/1985 | Rue |
| 4,552,199 A | 11/1985 | Onoyama et al. |
| 4,584,279 A | 4/1986 | Grabowski et al. |
| 4,588,419 A | 5/1986 | Caul et al. |
| 4,595,663 A | 6/1986 | Krohn et al. |
| 4,623,364 A | 11/1986 | Cottringer et al. |
| 4,652,275 A | 3/1987 | Bloecher et al. |
| 4,705,656 A | 11/1987 | Onoyama et al. |
| 4,734,104 A | 3/1988 | Broberg |
| 4,737,163 A | 4/1988 | Larkey |
| 4,741,743 A | 5/1988 | Narayanan et al. |
| 4,744,802 A | 5/1988 | Schwabel |
| 4,751,137 A | 6/1988 | Halg et al. |
| 4,752,459 A | 6/1988 | Pepper |
| 4,756,746 A | 7/1988 | Kemp, Jr. et al. |
| 4,757,036 A | 7/1988 | Kaar et al. |
| 4,762,677 A | 8/1988 | Dolgin |
| 4,770,671 A | 9/1988 | Monroe et al. |
| 4,772,511 A | 9/1988 | Wood et al. |
| 4,780,268 A | 10/1988 | Papsi et al. |
| 4,789,501 A | 12/1988 | Day et al. |
| 4,799,939 A | 1/1989 | Bloecher et al. |
| 4,800,685 A | 1/1989 | Haynes, Jr. |
| 4,812,422 A | 3/1989 | Yuhaku et al. |
| 4,829,031 A | 5/1989 | Roy et al. |
| 4,881,951 A | 11/1989 | Wood et al. |
| 4,898,587 A | 2/1990 | Mera |
| 4,898,597 A | 2/1990 | Hay et al. |
| 4,950,294 A | 8/1990 | Hakamatsuka |
| 4,960,441 A | 10/1990 | Pellow et al. |
| 4,997,461 A | 3/1991 | Markhof-Matheny et al. |
| 5,007,943 A | 4/1991 | Kelly et al. |
| 5,009,675 A | 4/1991 | Kunz et al. |
| 5,009,676 A | 4/1991 | Rue et al. |
| 5,011,508 A | 4/1991 | Wald et al. |
| 5,013,696 A | 5/1991 | Greskovich et al. |
| 5,023,212 A | 6/1991 | Dubots et al. |
| 5,038,453 A | 8/1991 | Kurita et al. |
| 5,042,991 A | 8/1991 | Kunz et al. |
| 5,057,018 A | 10/1991 | Bowen |
| 5,071,801 A | 12/1991 | Bedard et al. |
| 5,085,671 A | 2/1992 | Martin et al. |
| 5,090,968 A | 2/1992 | Pellow |
| 5,094,672 A | 3/1992 | Giles, Jr. et al. |
| 5,104,319 A | 4/1992 | Evans et al. |
| 5,110,332 A | 5/1992 | Isaksson |
| 5,118,326 A | 6/1992 | Lee et al. |
| 5,122,176 A | 6/1992 | Goettler |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,164,348 A | 11/1992 | Wood |
| 5,185,299 A | 2/1993 | Wood et al. |
| 5,194,072 A | 3/1993 | Rue et al. |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,215,563 A | 6/1993 | LaCourse et al. |
| 5,227,104 A | 7/1993 | Bauer |
| 5,248,318 A | 9/1993 | Tamamaki et al. |
| 5,259,147 A | 11/1993 | Falz et al. |
| 5,282,875 A | 2/1994 | Wood et al. |
| 5,312,789 A | 5/1994 | Wood |
| 5,336,280 A | 8/1994 | Dubots et al. |
| 5,352,254 A | 10/1994 | Celikkaya |
| 5,366,523 A | 11/1994 | Rowenhorst et al. |
| 5,372,620 A | 12/1994 | Rowse et al. |
| 5,376,470 A | 12/1994 | Sprouse |
| 5,378,251 A | 1/1995 | Culler et al. |
| 5,378,662 A | 1/1995 | Tsuyuki |
| 5,395,407 A | 3/1995 | Cottringer et al. |
| 5,395,407 A | 3/1995 | Cottringer et al. |
| 5,413,974 A | 5/1995 | Yokoyama et al. |

| | | |
|---|---|---|
| 5,417,726 A | 5/1995 | Stout et al. |
| 5,427,595 A | 6/1995 | Pihl et al. |
| 5,429,647 A | 7/1995 | Larmie |
| 5,431,704 A | 7/1995 | Tamamaki et al. |
| 5,436,063 A | 7/1995 | Follett et al. |
| 5,443,906 A | 8/1995 | Pihl et al. |
| 5,449,389 A | 9/1995 | Yoshizumi et al. |
| 5,484,752 A | 1/1996 | Waku et al. |
| 5,496,386 A | 3/1996 | Broberg et al. |
| 5,498,269 A * | 3/1996 | Larmie .................. 51/295 |
| 5,516,348 A * | 5/1996 | Conwell et al. .......... 51/309 |
| 5,520,711 A | 5/1996 | Helmin |
| 5,534,843 A | 7/1996 | Tsunoda et al. |
| 5,547,479 A * | 8/1996 | Conwell et al. .......... 501/153 |
| 5,549,962 A | 8/1996 | Holmes et al. |
| 5,551,963 A * | 9/1996 | Larmie .................. 51/307 |
| 5,552,213 A | 9/1996 | Eschner |
| 5,569,547 A | 10/1996 | Waku et al. |
| 5,593,467 A | 1/1997 | Monroe |
| 5,605,870 A | 2/1997 | Strom-Olsen et al. |
| 5,609,706 A | 3/1997 | Benedict et al. |
| 5,611,829 A * | 3/1997 | Monroe et al. ........... 51/309 |
| 5,641,469 A | 6/1997 | Garg et al. |
| 5,645,619 A | 7/1997 | Erickson et al. |
| 5,651,925 A | 7/1997 | Ashley et al. |
| 5,653,775 A | 8/1997 | Plovnick et al. |
| 5,665,127 A | 9/1997 | Moltgen et al. |
| 5,679,067 A | 10/1997 | Johnson et al. |
| 5,682,082 A | 10/1997 | Wei et al. |
| 5,693,239 A | 12/1997 | Wang et al. |
| 5,721,188 A | 2/1998 | Sung et al. |
| 5,725,162 A | 3/1998 | Garg et al. |
| 5,733,178 A | 3/1998 | Ohishi |
| 5,733,564 A | 3/1998 | Lehtinen |
| 5,738,696 A | 4/1998 | Wu |
| 5,747,397 A | 5/1998 | McPherson et al. |
| 5,763,345 A | 6/1998 | Ohshima et al. |
| 5,782,940 A | 7/1998 | Jayan et al. |
| 5,804,513 A | 9/1998 | Sakatani et al. |
| 5,847,865 A | 12/1998 | Gopinath et al. |
| 5,856,254 A | 1/1999 | Feige et al. |
| 5,863,308 A | 1/1999 | Qi et al. |
| 5,876,470 A | 3/1999 | Abrahamson |
| 5,902,763 A | 5/1999 | Waku et al. |
| 5,903,951 A | 5/1999 | Ionta et al. |
| 5,952,256 A | 9/1999 | Morishita et al. |
| 5,954,844 A | 9/1999 | Law et al. |
| 5,961,674 A | 10/1999 | Gagliardi et al. |
| 5,975,988 A | 11/1999 | Christianson |
| 5,976,274 A | 11/1999 | Inoue et al. |
| 5,981,415 A | 11/1999 | Waku et al. |
| 6,053,956 A * | 4/2000 | Wood ................... 51/309 |
| 6,054,093 A | 4/2000 | Torre, Jr. et al. |
| 6,128,430 A | 10/2000 | Chu et al. |
| 6,146,244 A | 11/2000 | Atsugi et al. |
| 6,214,429 B1 | 4/2001 | Zou et al. |
| 6,245,700 B1 | 6/2001 | Budd et al. |
| 6,251,813 B1 | 6/2001 | Sato |
| 6,254,981 B1 | 7/2001 | Castle |
| 6,268,303 B1 | 7/2001 | Aitken et al. |
| 6,277,161 B1 * | 8/2001 | Castro et al. .......... 51/309 |
| 6,287,353 B1 | 9/2001 | Celikkaya |
| 6,306,926 B1 | 10/2001 | Bretscher et al. |
| 6,335,083 B1 | 1/2002 | Kasai et al. |
| 6,361,414 B1 | 3/2002 | Ravkin et al. |
| 6,362,119 B1 | 3/2002 | Chiba |
| 6,447,937 B1 | 9/2002 | Murakawa et al. |
| 6,451,077 B1 | 9/2002 | Rosenflanz |
| 6,454,822 B1 | 9/2002 | Rosenflanz |
| 6,458,731 B1 | 10/2002 | Rosenflanz |
| 6,461,988 B1 | 10/2002 | Budd et al. |
| 6,469,825 B1 | 10/2002 | Digonnet et al. |
| 6,482,758 B1 | 11/2002 | Weber et al. |
| 6,482,761 B1 | 11/2002 | Watanabe et al. |
| 6,484,539 B1 | 11/2002 | Nordine et al. |
| 6,490,081 B1 | 12/2002 | Feillens et al. |
| 6,511,739 B1 | 1/2003 | Kasai et al. |
| 6,514,892 B1 | 2/2003 | Kasai et al. |
| 6,521,004 B1 | 2/2003 | Culler et al. |
| 6,582,488 B1 | 6/2003 | Rosenflanz |
| 6,583,080 B1 | 6/2003 | Rosenflanz |
| 6,589,305 B1 | 7/2003 | Rosenflanz |
| 6,592,640 B1 * | 7/2003 | Rosenflanz et al. ........... 51/309 |
| 6,596,041 B1 * | 7/2003 | Rosenflanz ............... 501/153 |
| 6,607,570 B1 * | 8/2003 | Rosenflanz et al. ......... 501/153 |
| 6,620,214 B1 | 9/2003 | McArdle et al. |
| 6,666,750 B1 * | 12/2003 | Rosenflanz .................. 51/309 |
| 6,669,749 B1 * | 12/2003 | Rosenflanz et al. ......... 501/153 |
| 6,706,083 B1 * | 3/2004 | Rosenflanz .................. 51/309 |
| 6,749,653 B1 * | 6/2004 | Castro et al. .................. 51/309 |
| 2001/0030811 A1 | 10/2001 | Kasai et al. |
| 2002/0066233 A1 | 6/2002 | McArdle et al. |
| 2002/0160694 A1 | 10/2002 | Wood et al. |
| 2003/0040423 A1 | 2/2003 | Harada et al. |
| 2004/0148868 A1 | 8/2004 | Anderson et al. |
| 2005/0075233 A1 | 4/2005 | Weber et al. |

FOREIGN PATENT DOCUMENTS

| | | |
|---|---|---|
| DE | 20 34 011 | 7/1970 |
| DE | 134 638 A | 3/1979 |
| DE | 141 420 | 4/1980 |
| EP | 0 200 487 | 11/1986 |
| EP | 0 227 374 | 7/1987 |
| EP | 0 236 507 | 9/1987 |
| EP | 0 291 029 A1 | 11/1988 |
| EP | 0 408 771 A1 | 1/1991 |
| EP | 0 480 678 A1 | 4/1992 |
| EP | 0 495 536 A2 | 7/1992 |
| EP | 0 579 281 A1 | 1/1994 |
| EP | 0 601 453 A2 | 6/1994 |
| EP | 0 647 601 A1 | 4/1995 |
| EP | 0 666 238 B1 | 8/1995 |
| EP | 0 666 239 B1 | 8/1995 |
| EP | 0 722 919 A1 | 7/1996 |
| EP | 0 291 029 B2 | 11/1996 |
| FR | 1547989 | 10/1968 |
| FR | 2 118 026 | 7/1972 |
| FR | 2 538 370 | 6/1984 |
| FR | 2 609 708 | 7/1988 |
| GB | 793503 | 4/1958 |
| GB | 1005338 | 9/1965 |
| GB | 1 260 933 A | 1/1972 |
| GB | 2 116 992 | 10/1983 |
| JP | 50-25608 | 3/1975 |
| JP | 59 22 7726 A | 12/1984 |
| JP | 60-221338 | 11/1985 |
| JP | 61099665 | 5/1986 |
| JP | 62-003041 | 1/1987 |
| JP | 63-156024 | 6/1988 |
| JP | 63-303821 | 12/1988 |
| JP | HEI 4-119941 | 4/1992 |
| JP | 05-085821 | 4/1993 |
| JP | 05-226733 | 9/1993 |
| JP | 06 040765 A | 2/1994 |
| JP | 06-171974 | 6/1994 |
| JP | 3113428 A | 5/1999 |
| JP | HEI 11-189926 | 7/1999 |
| JP | 10-208229 | 2/2000 |
| JP | 10-208244 | 2/2000 |
| JP | 200045128 A | 2/2000 |
| JP | 200045129 A | 2/2000 |
| JP | 201294480 | 10/2001 |
| JP | 2003-94414 | 4/2003 |
| KR | 9601009 B1 | 1/1996 |
| SU | 1455569 | 10/1996 |

| WO | WO 94/14722 | 7/1994 |
| WO | WO 97/16385 | 5/1997 |
| WO | WO 97/25284 | 7/1997 |
| WO | WO 00/34201 | 6/2000 |
| WO | WO 01/16047 A2 | 3/2001 |
| WO | WO 01/23321 A1 | 4/2001 |
| WO | WO 01/23323 A1 | 4/2001 |
| WO | WO 01/27046 A1 | 4/2001 |
| WO | WO 01/56946 A | 8/2001 |
| WO | WO 01/56947 A | 8/2001 |
| WO | WO 01/56949 A | 8/2001 |
| WO | WO 01/56950 A | 8/2001 |
| WO | WO 02/08146 A | 1/2002 |
| WO | WO 03/011776 A1 | 2/2003 |

OTHER PUBLICATIONS

U.S. Application entitled "Ceramics, and Methods of Making and Using the Same", filed Jul. 29, 2004.

U.S. Application entitled "Method of Making Ceramic Articles", filed Jul. 29, 2004.

Aasland and McMillan, Nature 369, 633 (1994).

Aguilar et al, "Melt Extraction Processing of Structural $Y_2O_3$-$Al_2O_3$ Fibers", J. Eur. Ceram. Soc. 20 1091-1098 (2000).

Gandhi, A.S. and Jarayam, V., "Pressure Consolidation of Amorphous $ZrO_2$-$Al_2O_3$ by Plastic Deformation of Powder Particles", Acta Materiala, 50 (2002), 2137-2149.

Gonzalez, Eduardo J., et al., "High Pressure Compaction and Sintering of Nano-Size γ-$Al_2O_3$ Powder", Materials and Manufacturing Processes vol. 11, No. 6, 951-967, 1996.

Jantzen, C.M., Krepski, R.P., & Herman, H., "Ultra-Rapid Quenching of Laser-Method Binary and Unary Oxides", Mat. Res. Bull. 15, 1313-1326 (1980).

Khor K.A., "Novel ZrO2-Mullite Composites Produced By Plasma Spraying", Proceedings of the 15th International Thermal Pray Conference, May 25-29, 1998, Nice, France.

Ray, C.S. and Day, D.E., "Determining the Nucleation Rate Curve for Lithium Disilicate Glass by Differential Thermal Analysis", J. Am. Ceram. Soc. 73(2) 439-442 (1990).

Schmucker, M, et al., "Constitution of Mullite Glasses Produced by Ultra-Rapid Quenching of Plasma-Sprayed Melts", Journal of the European Ceramic Society 15 (1995) 1201-1205.

Sarjeant, P.T, & Roy, R., in Reactivity of Solids (ed. J. W. Mitchell, R.C., DeVries, R.W., Roberts and P. Cannon) 725-33 (John Wiley & Sons, Inc., New York 1969).

Takamori, T., & Roy, R., "Rapid Crystallization of SiO2-Al2O3 Glasses", Journal of American Society, vol. 56, No. 12, Dec. 1973.

Weber et al., "Synthesis and Optical Properties of Rare-Earth-Aluminum Oxide Glasses", J. Am. Ceram. Soc. 85(5) 1309-1311 (2002).

Wilding, M.C., McMillan, P.F., "Polyamorphic Transitions in Yttria-Alumina Liquids", J. Non-Cryst. Solids. 293-295, 357-365 (2001).

Article: Imakoa, Minoru et al., "Refractive Index and Abbe's Number of Glass of Lanthanum Borate System," Journal Ceramic Assoc. Japan, vol. 70, No. 5, (1962), pp. 115 et seq.

Book Excerpt: Kingery, W.D., Introduction to Ceramics, Second Edition, Chpt. III subchapter 8.8, Glass-Ceramic Materials, (1976), pp. 368-374,.

Article: Kokubo, Tadashi et al., "Infrared Transmission of ($R_2O$ or R'O)-($TiO_2$, $Nb_2O_5$ or $Ta_2O_5$)-$Al_2O_3$ Glasses," Journal of Non-Crystalline Solids 22, (1970), pp. 125-134.

Book: McMillan, P.W., Glass-Ceramics, Academic Press, Inc., 2nd Edition (1979). (Too Voluminous).

Symposium: Stookey, "Ceramics Made by Nucleation of Glass—Comparison of Microstructure and Properties with Sintered Ceramics," (1962), pp. 1-4.

Book Excerpt: Varshneya, Fundamentals of Inorganic Glasses, (1994), pp. 425-427.

Symposium: Weber et al., "Rare Earth Oxide—Aluminum Oxide Glasses for Mid-Range IR Devices," Containerless Research, Inc., BIOS 2003, Optical Fibers and Sensors for Medical Applications III, Conference 4957, (2003), 7 pages.

Symposium: Weber et al., "Device Materials Based on Er-, Ho-, Tm-, and Yb-Doped Rare Earth Aluminum Oxide (REAL™) Glass," Containerless Research, Inc., BIOS 2003, Optical Fibers and Sensors for Medical Applications III, Conference 4957, (2003), 7 pages.

Article: Shishido et al., "$Gd_3Al_5O_{12}$ Phase Obtained by Crystallization of Amorphous $Gd_2O_3$-$^5/_3Al_2O_3$," Journal of the American Ceramic Society—Discussions and Notes, Jul.-Aug. 1978, pp. 373-375.

Article: Suzuki et al., "Rapid Quenching on the Binary Systems of High Temperature Oxides," Mat. Res. Bull., vol. 9, (1974), pp. 745-754.

Article: Yajima et al., "Unusual Glass Formation in the Al-Nd-O System," Chemistry Letters, (1973), pp. 741-742.

Article: Yajima et al., "Glass Formation in the Ln-Al-O System (Ln : Lanthanoid and Yttrium Elements)," Chemistry Letters, (1973), pp. 1327-1330.

Article: Coutures et al., "Production and Studies of Alumina Based Refractory Glass," Mat. Res. Bull., vol. 10, No. 6, (1975), pp. 539-546.

Article: van den Hoven et al., "Net Optical Gain at 1.53 μm in Er-Doped $Al_2O_3$ Waveguides on Silicon," Appl. Phys. Lett., vol. 68, No. 14, Apr. 1, 1996, pp. 1886-1888.

Article: Harris, "Durable 3-5 μm Transmitting Infrared Window Materials," Infrared Physics & Technology, vol. 39, (1998), pp. 185-201.

Article: Yan et al., "Erbium-Doped Phosphate Glass Waveguide on Silicon with 4.1 dB/cm Gain at 1.535 μm," Appl. Phys. Lett, vol. 71, No. 20, Nov. 17, 1997, pp. 2922-2924.

U.S. Application entitled "Methods of Making $Al_2O_3$-$SiO_2$ Ceramics," Celikkaya et al., filed Sep. 5, 2003, having U.S. Appl. No. 10/655,729.

U.S. Application entitled "Methods of Making Ceramics Comprising $Al_2O_3$, REO, $ZRO_2$ and/or $HfO_2$ and $Nb_2O_5$ and/or $Ta_2O_5$," Rosenflanz, filed Sep. 18, 2003, having U.S. Appl. No. 10/666,615.

U.S. Application entitled "Ceramics Comprising $Al_2O_3$, REO, $ZRO_2$ and/or $HfO_2$ and $Nb_2O_5$ and/or $Ta_2O_5$ and Methods of Making the Same," Rosenflanz et al., filed Sep. 18, 2003, having U.S. Appl. No. 10/666,212.

U.S. Application entitled "Ceramics Comprising $Al_2O_3$, $Y_2O_3$, $ZRO_2$ and/or $HfO_2$ and $Nb_2O_5$ and/or $Ta_2O_5$ and Methods of Making the Same," Rosenflanz et al., filed Sep. 18, 2003, having U.S. Appl. No. 10/666,098.

U.S. Application entitled "Alumina-Yttria Particles and Methods of Making the Same," Anderson et al., filed Dec. 18, 2003, having U.S. Appl. No. 10/740,262.

U.S. Application entitled "Method of Making Abrasive Particles," Anderson et al., filed Dec. 18, 2003, having U.S. Appl. No. 10/739,420.

U.S. Application entitled "Transparent Fused Crystalline Ceramic, and Method of Making the Same," Rosenflanz et al., filed Dec. 18, 2003, having U.S. Appl. No. 10/739,439.

U.S. Application entitled "Method of Making Abrasive Particles," Anderson et al., filed Dec. 18, 2003, having U.S. Appl. No. 10/739,440.

U.S. Application entitled "Method of Making Abrasive Particles," Celikkaya et al., filed Dec. 18, 2003, having U.S. Appl. No. 10/740,096.

U.S. Application entitled "Method of Making Abrasive Particles," Celikkaya et al., filed Dec. 18, 2003, having U.S. Appl. No. 10/739,441.

U.S. Application entitled "Powder Feeding Method and Apparatus," Celikkaya et al., filed Dec. 18, 2003, having U.S. Appl. No. 10/739,233.

U.S. Application entitled "Use of Ceramics in Dental and Orthodontic Applications," Cummings et al., filed Feb. 5, 2003, having U.S. Appl. No. 10/358,856.

U.S. Application entitled "Use of Glasses Containing Rare Earth Oxide, Alumina, and Zirconia and Dopant in Optical Waveguides," Cummings et al., filed Apr. 28, 2003, having U.S. Appl. No. 10/425,039.

U.S. Application entitled "Ceramic Aggregate Particles," McArdle et al., filed Feb. 11, 2004, having U.S. Appl. No. 10/776,156.

Kondrashov V I et al., "Opacified Glass "Decorit" Synthesis Directions", Steklo I Keramika 2001, No. 1, pp. 8-11.
"$Gd_3Al_5O_{12}$ Phase Obtained by Crystallization of Amorphous $Gd_2O_3 \cdot 5/3\ Al_2O_3$," Shishido et al., *Journal of the American Ceramic Society*, vol. 61, No. 7-8, Jul.-Aug. 1978, pp. 373-374.
"Rapid Quenching on the Binary Systems of High Temperature Oxides," Suzuki et al., *Mat. Res. Bull.*, vol. 9, 1974, pp. 745-754.
"Unusual Glass Formation in the Al-Nd-O System," Yajima et al., Chemistry Letters (published by the Chemical Society of Japan), 1973, pp. 741-742.
Glass Formation in the Ln-Al-O System, (Ln: Lanthanoid and Yttrium Elements), Yajima et al., Chemistry Letters, 1973, pp. 1327-1330.
"Production and Studies of Alumina Based Refractory Glass," Coutures et al., *Mat. Res. Bull.*, vol. 10, No. 6, 1975, pp. 539-546.
"Net Optical Gain at 1.53 µm in Er-DOPED $Al_2O_3$ Waveguides on Silicon," van den Hoven et al., Appl. Phys. Lett. 68 (14), Apr. 1, 1966, pp. 1886-1888.
"DURABLE 3-5 µm Transmitting Infrared Window Materials," Harris et al., Infrared Physics & Technology 39, 1998, pp. 185-201.
"Erbium-Doped Phosphate Glass Waveguide on Silicon with 4.1 dB/cm Gain at 1.535 µm," Yan et al., Appl. Phys. Lett, 71 (20), Nov. 17, 1997.
Abstract for "Kinetics on Nonisothermal Sintering of Some Eutectic Oxide Compositions," I. Yu Volkova et al., 1986 (abstract from Database Chemabs 'Online! Chemical Abstracts Service, Columbus, Ohio, US).
"Eutectic Precipitation of the Spinel Solid Solution-Yttrium Aluminum Garnet (YAG) System," Shuqiang Wang et al., *Journal of the American Ceramic Society*, 1998, vol. 81, No. 1, pp. 263-265.
"Microstructures of laser-treated $Al_2O_3$-$ZrO_2$-$CeO_2$ composites," Zan-Hwey Chen et al., *Materials Science & Engineering A (Structural Materials: Properties, Microstructures and Processing)*, 1995, vol. A196, No. 1-2, pp. 253-260.
"Advances in the Grinding Efficiency of Sintered Alumina Abrasives," Andreas Krell et al., *Journal of the American Ceramic Society*, 1996, vol. 79, No. 3, pp. 763-769.
"Interface modification for increased fracture toughness in reaction-formed yttrium aluminum garnet/alumina eutectic composites," Luke N. Brewer et al., 1999, vol. 14, No. 10, pp. 3907-3912.
Dow Jones Interactive Internet Printout on Jun. 20, 2001 for web address "http://ptg.djnr.com/ccroot/asp/publib/story.asp"; "China's Rare Earth Industry In the Doldrums", Asia Pulse, Jan. 28, 1999, 2 pages.
Dow Jones Interactive Internet Printout on Jun. 20, 2001 for web address "http://ptg.djnr.com/ccroot/asp/publib/story.asp"; "China's Rare Earth Export Quota Set at 45,000 Tons", Asia Pulse, Jan. 9, 2001, 1 page.
Dow Jones Interactive Internet Printout on Jun. 20, 2001 for web address "http://ptg.djnr.com/ccroot/asp/publib/story.asp"; "ELEMENTS: China to Impose Quotas on Rare Earth Exports", Chemical Business NewsBase, Feb. 4, 1999, 1 page.
Dow Jones Interactive Internet Printout on Jun. 20, 2001 for web address "http://ptg.djnr.com/ccroot/asp/publib/story.asp"; "Rare Earth Prices and Market Outlook", Chemical Business NewsBase, May 27, 1999, 2 pages.
Dow Jones Interactive Internet Printout on Jun. 20, 2001 for web address "http://ptg.djnr.com/ccroot/asp/publib/story.asp"; "In Asia", Engineering & Mining Journal, Feb. 28, 2000, 4 pages.
Dow Jones Interactive Internet Printout on Jun. 20, 2001 for web address "http://ptg.djnr.com/ccroot/asp/publib/story.asp"; "Rare Earths: An Industry Review and Market Outlook—Part 1", Chemical Business NewsBase, Dec. 8, 2000, 2 pages.
Dow Jones Interactive Internet Printout on Jun. 20, 2001 for web address "http://ptg.djnr.com/ccroot/asp/publib/story.asp"; "Traders' View on Chemical Business (Part 2): Rare Earth: Market Confusion Inevitable Due to China's Unstable Supply", Chemical Business NewsBase, Aug. 10, 2000, 2 pages.
"China: Oversupply Puts Rare Earths Projects On Hold", Industrial Minerals, Aug. 1997, 1 page.
"Increase in Value of Rare Earth Products Boosts Yixing Xinwei", W. Yau, South China Morning Post, Apr. 12, 2000, 2 pages.
"Rare Earth—Market Confusion Inevitable Due to China's Unstable Supply", Japan Chemical Week, vol. 41, No. 2080, Jul. 6, 2000, pp. 6-7.
"Rare Earths Prices Recover Despite China's Overcapacity", Louise Rodriguez, America Metal Market, vol. 109, No. 14, Jan. 22, 2001, p. 13.
"Prices: Minerals", Asian Ceramics & Glass, Jan. 2001, 2 pages.
"China Rare Earth Information", China Rare Earth Information Center, vol. 6, No. 4, Aug. 2000, 3 pages.
"Microstructure and Thermal Stability of $Al_2O_3/Y_3Al_5O_{12}$ (YAG) Eutectic Composite Prepared by an Arc Discharge Method", T. Isobe et al., J. Ceram. Soc. Jap., 109, [1], 2001, pp. 66-70, Abstract in English.
"Divorced Eutectic and Interface Characteristics in a Solidified YAG-Spinel Composite With Spinel-Rich Composition", S. Wang et al., J. Mat. Sci., 35, 2000, pp. 2757-2761.
"Processing, Microstructure, and Strength of Alumina-YAG Eutectic Polycrystals", Tai-Il Mah et al., J. Am. Ceram. Soc., 83, [8], 2000, pp. 2088-2090.
"Phase Identification of $Al_2O_3/RE_3Al_5O_{12}$ and $Al_2O_3/REAlO_3$ (RE= Sm-Lu, Y) Eutectics", J. Crystal Growth, 218, 2000, pp. 67-73.
"Crystallization and Thermal Properties of $Al_2O_3$-$Y_2O_3$ Melts", S. V. Stankus et al., J. Crystal Growth, 167, 1996, pp. 165-170.
Dialog © file 319: Chem Bus NewsBase © 2001 Royal Soc Chemistry. Abstract for "China: Oversupply Puts Rare Earths Projects On Hold", Industrial Minerals n 359, p. 10.
"Rare-Earth Metals", J. Hedrick, pp. 61.1-61.6, 1997.
"Rare-Earth Metal Prices in the USA ca. 1960 to 1994", J. Hedrick, J. Alloys and Compounds, 1997, pp. 471-481.
"Preliminary data on subsolidus phase equilibria in the $La_2O_3$-$Al_2O_3$-$Mn_2O_3$ and $La_2O_3$-$Al_2O_3$-$Fe_2O_3$ systems", Hrovat et al., *Journal of Materials Science Letters*, vol. 14, 1995, pp. 265-267.
"Aspects of Synthesis of Decorite Opacified Glass", Keramika, Glass and Ceramics, vol. 58, Nos. 1-2, pp. 8-11, Jan. 2001.
"A New Ceramic Eutectic Composite with High Strength at 1873 K", Yoshiharu Waku, *Advanced Materials*, vol. 10, No. 8, 1998, pp. 615-617.
"Synthesis of Y-Al Garnet", Krokhin et al., *Glass and Ceramics*, vol. 65, Nos. 5-6, 1998, pp. 151-152.
"High-temperature strength and thermal stability of a unidirectionally solidified $Al_2O_3$/YAG eutectic composite", Waku et al., pp. 1217-1225.
"Sapphire matrix composites reinforced with single crystal VAG phases", Waku et al., *Journal of Materials Science*, vol. 31, 1996, pp. 4663-4670.
"Thermo-Mechanical Stability Of Directionally Solidified $Al_2O_3$-$ZrO_2(Y_2O_3)$ Eutectic Fibers", Yang and Zhu, *Scripta Materialia*, vol. 36, No. 8, 1997, pp. 961-965.
"A ductile ceramic eutectic composite with high strength at 1,873 K", Waku et al., *Nature*, vol. 389, Sep. 1997, pp. 49-52.
"The Liquidus Surface In The $Al_2O_3$-$ZrO_2$-$Y_2O_3$ Phase Diagram", Lakiza et al., *Powder Metallurgy and Metal Ceramics*, vol. 33, No. 11-12, 1994, pp. 595-597.
"Powder-Material Research Methods And Properties Polythermal Sections Of The $Al_2O_3$-$ZrO_2$-$Y_2O_3$ Phase Diagram", Lakiza et al., *Powder Metallurgy and Metal Ceramics*, vol. 34, No. 11-12, 1995, pp. 655-659.
"Metastable Phase Relationships In The System $Al_2O_3$-$ZrO_2$-$Y_2O_3$", Lakiz and Lopato, *Powder Metallurgy and Metal Ceramics*, vol. 35, Nos. 11-12, 1996, pp. 621-626.
"Solidus Surface And Phase Equilibria During The Solidification Of Alloys In The $Al_2O_3$-$ZrO_2$-$Y_2O_3$ System", Lakiza et al., *Powder Metallurgy and Metal Ceramics*, vol. 34, Nos. 1-2, 1995, pp. 64-67.
"Methods Of Investigation Of Properties Of Powder Materials, Interactions In The $Al_2O_3$-$ZrO_2$-$Y_2O_3$ System", Lakiza et al., *Powder Metallurgy and Metal Ceramics*, vol. 33, Nos. 9-10, 1994, pp. 486-490.
"Rapid Solidification of Ceramics a Technology Assessment", Brockway et al. *Metals and Ceramics Information Center*, MCIC Report, Jan. 1984 MCIC 84-49.
Figs. 311, 346, 350, 354-56, 373, and 716, *Phase Diagrams For Ceramists*, The American Ceramic Society, 1964, pp. 122, 136, 138, 140, 144, 248.

Figs. 2340-44, 2363, 2370, 2374-75, 2382-83, 2385, 2387, 2390, and 2392, *Phase Diagrams For Ceramists, 1969 Supplement*, The American Ceramic Society, 1969, pp. 95-96, 100, 102-103, 105-108.

Figs. 4366-71, 4377-78, 4404-05, 4417, 4426, 4430, 4433, 4437, 4440, 4444, 4457, 4572, and 4602, *Phase Diagrams For Ceramists, 1975 Supplement*, The American Ceramic Society, 1975, pp. 130-132, 135-136, 147, 152, 157, 159-160, 163-164, 166, 172-173, 238, 257.

Figs. 5042, 5211, 5217, 5224, 5228, 5232, 5237, 5239, 5241, 5245, 5251, 5257, 5418, and 5437, *Phase Diagrams For Ceramists*, vol. IV, The American Ceramic Society, 1981, pp. 29, 125, 127, 129-131, 133, 135-137, 139, 141, 143, 220, 228.

Fig. 6464, *Phase Diagrams For Ceramists*, vol. VI, The American Ceramic Society, 1981, p. 162.

Figs. 9262, and 9264, *Phase Diagrams For Ceramists*, vol. XI, *Oxides*, The American Ceramic Society, 1995, pp. 105-106.

"Phase Equilibria in the Yttrium Oxide-Alumina System", Toropov et al., *Bulletin of the Academy of Sciences, USSR*, Division of Chemical Science, No. 7, Jul. 1964, pp. 1076-1081, A translation of *Seriya Khimicheskaya*.

McKittrick, Joanna, et al., "Non-stoichiometry and defect structures in rapidly solidified MgO-$Al_2O_3$-$ZrO_2$ ternary eutectics," *Materials Science and Engineering* A231 (1997) 90-97.

Weber, J.K. Richard et al., "Glass fibres of pure and erbium- or neodymium-doped yttria-alumina compositions", Nature, Jun. 25, 1998, vol. 393, pp. 769-771.

Waku, Yoshiharu, et al., "A jelly-like ceramic fiber at 1193 K", Mat Res Innovat, 2000, vol. 3, pp. 185-189.

Weber, J.K. Richard et al., "Glass Formation and Polyamorphism in Rare-Earth Oxide-Aluminum Oxide Compositions", J. American Ceramic Society, 83 [8], 2000, 1868-1872.

Aguilar, E.A., "Processing and crystallization of rapidly solidified $Al_2O_3$-$Y_2O_3$ fibres", British Ceramic Transactions, 2000, vol. 99, No. 6, pp. 256-259.

U.S. Patent Application entitled "Fused $Al_2O_3$-$Y_2O_3$ Eutectic Abrasive Particles, Abrasive Articles, And Methods Of Making And Using The Same", filed Jul. 19, 2000, Rosenflanz et al. having U.S. Appl. No. 09/620,262.

U.S. Patent Application entitled "Fused $Al_2O_3$-MgO-$Y_2O_3$ Eutectic Abrasive Particles, Abrasive Articles, And Methods Of Making And Using The Same", filed Nov. 2, 2000, Rosenflanz having U.S. Appl. No. 09/704,843.

U.S. Patent Application entitled "Fused $Al_2O_3$Rare Earth Oxide Eutectic Abrasive Particles, Abrasive Articles, And Methods Of Making And Using The Same", filed Jul. 19, 2000, Rosenflanz et al. having U.S. Appl. No. 09/618,879.

U.S. Patent Application entitled "Fused Abrasive Particles, Abrasive Articles, And Methods Of Making And Using The Same", filed Jul. 19, 2000, Rosenflanz et al. having U.S. Appl. No. 09/619,191.

U.S. Patent Application entitled "Fused Aluminum Oxycarbide/Nitride- $Al_2O_3$Rare Earth Oxide Eutectic Abrasive Particles, Abrasive Articles, And Methods Of Making And Using The Same", filed Jul. 19, 2000, Rosenflanz having U.S. Appl. No. 09/619,289.

U.S. Patent Application entitled "Fused Aluminum Oxycarbide/Nitride-$Al_2O_3$Rare Earth Oxide Eutectic Materials", filed Jul. 19, 2000, Rosenflanz having U.S. Appl. No. 09/619,106.

U.S. Patent Application entitled "Fused $Al_2O_3$-$Y_2O_3$-$ZrO_2$ Eutectic Abrasive Particles, Abrasive Articles, And Methods Of Making And Using The Same", filed Jul. 19, 2000, Rosénflanz having U.S. Appl. No. 09/618,876.

U.S. Patent Application entitled "Fused $Al_2O_3$-Rare Earth Oxide-$ZrO_2$ Eutectic Materials", filed Jul. 19, 2000, Rosenflanz having U.S. Appl. No. 09/619,192.

U.S. Patent Application entitled "Fused $Al_2O_3$-Rare Earth Oxide-$ZrO_2$ Eutectic Abrasive Particles, Abrasive Articles, And Methods Of Making And Using The Same", filed Jul. 19, 2000, Rosenflanz having U.S. Appl. No. 09/619,744.

U.S. Patent Application entitled "Fused $Al_2O_3$ Rare Earth Oxide $ZrO_2$ Eutectic Materials", filed Jan. 30, 2001, Rosenflanz having U.S. Appl. No. 09/772,730.

U.S. Patent Application entitled "$Al_2O_3$-Rare Earth Oxide-$ZrO_2$/$HfO_2$ Materials, and Methods of Making and Using the Same", filed Aug. 2, 2002, Rosenflanz having U.S. Appl. No. 10/211,597.

U.S. Patent Application entitled "$Al_2O_3$-$Y_2O_3$-$ZrO_2$/$HfO_2$ Materials, and Methods of Making and Using the Same", filed Aug. 2, 2002, Rosenflanz having U.S. Appl. No. 10/211,638.

U.S. Patent Application entitled "Abrasive Particles, and Methods of Making and Using the Same", filed Aug. 2, 2002, Rosenflanz having U.S. Appl. No. 10/211,629.

U.S. Patent Application entitled "Abrasive Particles, Abrasive Articles, and Methods of Making and Using the Same", filed Aug. 2, 2002, Rosenflanz et al. having U.S. Appl. No. 10/211,598.

U.S. Patent Application entitled "Abrasive Particles, and Methods of Making and Using the Same", filed Aug. 2, 2002, Rosenflanz et al. having U.S. Appl. No. 10/211,630.

U.S. Patent Application entitled "Method for Making Amorphous Materials and Ceramics", filed Aug. 2, 2002, Rosenflanz et al. having U.S. Appl. No. 10/211,639.

U.S. Patent Application entitled "Ceramic Materials, Abrasive Particles, Abrasive Articles, and Methods of Making and Using the Same", filed Aug. 2, 2002, Rosenflanz having U.S. Appl. No. 10/211,034.

U.S. Patent Application entitled "Alunmina-Zirconia, and Methods of Making and Using the Same", filed Aug. 2, 2002, Rosenflanz et al. having U.S. Appl. No. 10/211,620.

U.S. Patent Application entitled "Method of Making Ceramic Articles", filed Aug. 2, 2002, Rosenflanz having U.S. Appl. No. 10/211,481.

U.S. Patent Application entitled "Plasma Spraying", filed Aug. 2, 2002, Rosenflanz et al. having U.S. Appl. No. 10/211,640.

U.S. Patent Application entitled "Method of Making Amorphous and Ceramics via Melt Spinning", filed Aug. 2, 2002, Rosenflanz et al. having U.S. Appl. No. 10/211,684.

* cited by examiner

GLASS-CERAMICS

This application is a continuation-in-part of U.S. Ser. Nos. 09/922,526, 09/922,527, 09/922,528, and 09/922,530, filed Aug. 2, 2001, the disclosures of which are incorporated herein by reference.

FIELD OF THE INVENTION

This invention relates to glass-ceramics.

DESCRIPTION OF RELATED ART

A large number of glass and glass-ceramic compositions are known. The majority of oxide glass systems utilize well-known glass-formers such as $SiO_2$, $B_2O_3$, $P_2O_5$, $GeO_2$, $TeO_2$, $As_2O_3$, and $V_2O_5$ to aid in the formation of the glass. Some of the glass compositions formed with these glass-formers can be heat-treated to form glass-ceramics. The upper use temperature of glasses and glass-ceramics formed from such glass formers is generally less than 1200° C., typically about 700–800° C. The glass-ceramics tend to be more temperature resistant than the glass from which they are formed.

In addition, many properties of known glasses and glass-ceramics are limited by the intrinsic properties of glass-formers. For example, for $SiO_2$, $B_2O_3$, and $P_2O_5$-based glasses and glass-ceramics, the Young's modulus, hardness, and strength are limited by such glass-formers. Such glass and glass-ceramics generally have inferior mechanical properties as compared, for example, to $Al_2O_3$ or $ZrO_2$. Hardnesses of known glass-ceramics are less than 12 GPa. Glass-ceramics having any mechanical properties similar to that of $Al_2O_3$ or $ZrO_2$ would be desirable.

Although some non-conventional glasses such as glasses based on rare earth oxide-aluminum oxide (see, e.g., PCT application having publication No. WO 01/27046 A1, published Apr. 19, 2001, and Japanese Document No. JP 2000-045129, published Feb. 15, 2000) are known, additional novel glasses and glass-ceramic, as well as use for both known and novel glasses and glass-ceramics is desired.

In another aspect, a variety of abrasive particles (e.g., diamond particles, cubic boron nitride particles, fused abrasive particles, and sintered, ceramic abrasive particles (including sol-gel-derived abrasive particles) known in the art. In some abrading applications, the abrasive particles are used in loose form, while in others the particles are incorporated into abrasive products (e.g., coated abrasive products, bonded abrasive products, non-woven abrasive products, and abrasive brushes). Criteria used in selecting abrasive particles used for a particular abrading application include: abrading life, rate of cut, substrate surface finish, grinding efficiency, and product cost.

From about 1900 to about the mid-1980's, the premier abrasive particles for abrading applications such as those utilizing coated and bonded abrasive products were typically fused abrasive particles. There are two general types of fused abrasive particles: (1) fused alpha alumina abrasive particles (see, e.g., U.S. Pat. No. 1,161,620 (Coulter), U.S. Pat. No. 1,192,709 (Tone), U.S. Pat. No. 1,247,337 (Saunders et al.), U.S. Pat. No. 1,268,533 (Allen), and U.S. Pat. No. 2,424,645 (Baumann et al.)), and (2) fused (sometimes also referred to as "co-fused") alumina-zirconia abrasive particles (see, e.g., U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), and U.S. Pat. No 5,143,522 (Gibson et al.)) (also see, e.g., U.S. Pat. No. 5,023,212 (Dubots et al.) and U.S. Pat. No. 5,336,280 (Dubots et al.) which report the certain fused oxynitride abrasive particles). Fused alumina abrasive particles are typically made by charging a furnace with an alumina source such as aluminum ore or bauxite, as well as other desired additives, heating the material above its melting point, cooling the melt to provide a solidified mass, crushing the solidified mass into particles, and then screening and grading the particles to provide the desired abrasive particle size distribution. Fused alumina-zirconia abrasive particles are typically made in a similar manner, except the furnace is charged with both an alumina source and a zirconia source, and the melt is more rapidly cooled than the melt used to make fused alumina abrasive particles. For fused alumina-zirconia abrasive particles, the amount of alumina source is typically about 50–80 percent by weight, and the amount of zirconia, 50–20 percent by weight zirconia. The processes for making the fused alumina and fused alumina abrasive particles may include removal of impurities from the melt prior to the cooling step.

Although fused alpha alumina abrasive particles and fused alumina-zirconia abrasive particles are still widely used in abrading applications (including those utilizing coated and bonded abrasive products, the premier abrasive particles for many abrading applications since about the mid-1980's are sol-gel-derived alpha alumina particles (see, e.g., U.S. Pat. No. 4,314,827 (Leitheiser et al.), U.S. Pat. No. 4,518,397 (Leitheiser et al.), U.S. Pat No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 4,960,441 (Pellow et al.), U.S. Pat. No. 5,139,978 (Wood), U.S. Pat. No. 5,201,916 (Berg et al.), U.S. Pat. No. 5,366,523 (Rowenhorst et al.), U.S. Pat. No. 5,429,647 (Larmie), U.S. Pat. No. 5,547,479 (Conwell et al.), U.S. Pat. No. 5,498,269 (Larmie), 5,551,963 (Larmie), and U.S. Pat. No. 5,725,162 (Garg et al.)).

The sol-gel-derived alpha alumina abrasive particles may have a microstructure made up of very fine alpha alumina crystallites, with or without the presence of secondary phases added. The grinding performance of the sol-gel-derived abrasive particles on metal, as measured, for example, by life of abrasive products made with the abrasive particles was dramatically longer than such products made from conventional fused alumina abrasive particles.

Typically, the processes for making sol-gel-derived abrasive particles are more complicated and expensive than the processes for making conventional fused abrasive particles. In general, sol-gel-derived abrasive particles are typically made by preparing a dispersion or sol comprising water, alumina monohydrate (boehmite), and optionally peptizing agent (e.g., an acid such as nitric acid), gelling the dispersion, drying the gelled dispersion, crushing the dried dispersion into particles, screening the particles to provide the desired sized particles, calcining the particles to remove volatiles, sintering the calcined particles at a temperature below the melting point of alumina, and screening and grading the particles to provide the desired abrasive particle size distribution. Frequently a metal oxide modifier(s) is incorporated into the sintered abrasive particles to alter or otherwise modify the physical properties and/or microstructure of the sintered abrasive particles.

There are a variety of abrasive products (also referred to "abrasive articles") known in the art. Typically, abrasive products include binder and abrasive particles secured within the abrasive product by the binder. Examples of abrasive products include: coated abrasive products, bonded abrasive products, nonwoven abrasive products, and abrasive brushes.

Examples of bonded abrasive products include: grinding wheels, cutoff wheels, and honing stones. The main types of bonding systems used to make bonded abrasive products are: resinoid, vitrified, and metal. Resinoid bonded abrasives utilize an organic binder system (e.g., phenolic binder systems) to bond the abrasive particles together to form the shaped mass (see, e.g., U.S. Pat. No. 4,741,743 (Narayanan et al.), U.S. Pat. No. 4,800,685 (Haynes et al.), U.S. Pat. No. 5,037,453 (Narayanan et al.), and U.S. Pat. No. 5,110,332 (Narayanan et al.)). Another major type are vitrified wheels in which a glass binder system is used to bond the abrasive particles together mass (see, e.g., U.S. Pat. No. 4,543,107 (Rue), U.S. Pat. No. 4,898,587 (Hay et al.), U.S. Pat. No. 4,997,461 (Markhoff-Matheny et al.), and U.S. Pat. No. 5,863,308 (Qi et al.)). These glass bonds are usually matured at temperatures between 900° C. to 1300° C. Today vitrified wheels utilize both fused alumina and sol-gel-derived abrasive particles. However, fused alumina-zirconia is generally not incorporated into vitrified wheels due in part to the thermal stability of alumina-zirconia. At the elevated temperatures at which the glass bonds are matured, the physical properties of alumina-zirconia degrade, leading to a significant decrease in their abrading performance. Metal bonded abrasive products typically utilize sintered or plated metal to bond the abrasive particles.

The abrasive industry continues to desire abrasive particles and abrasive products that are easier to make, cheaper to make, and/or provide performance advantage(s) over conventional abrasive particles and products.

SUMMARY OF THE INVENTION

In one aspect, the present invention provides glass-ceramic having an average hardness of at least 13 GPa (in some embodiments preferably, at least 14, 15, 16, 17, or even at least 18 GPa), wherein the glass-ceramic has x, y, and z dimensions each perpendicular to each other, and wherein each of the x, y, and z dimensions is at least 5 mm (in some embodiments, at least 10 mm). The x, y, and z dimensions of a material are determined either visually or using microscopy, depending on the magnitude of the dimensions. The reported z dimension is, for example, the diameter of a sphere, the thickness of a coating, or the longest length of a prismatic shape.

In this Application:

"amorphous material" refers to material derived from a melt and/or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes amorphous material, glass, crystalline ceramic, glass-ceramic, and combinations thereof;

"complex metal oxide" refers to a metal oxide comprising two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$.metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3.Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3$.REO" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramics comprising crystals formed by heat-treating amorphous material;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium (e.g., $Tb_2O_3$), thorium oxide (e.g., $Th_4O_7$), thulium (e.g., $Tm_2O_3$), and ytterbium oxide (e.g., $Yb_2O_3$), and combinations thereof; and "REO" refers to rare earth oxide(s).

Further, it is understood herein that unless it is stated that a metal oxide (e.g., $Al_2O_3$, complex $Al_2O_3$.metal oxide, etc.) is crystalline, for example, in a glass-ceramic, it may be amorphous, crystalline, or portions amorphous and portions crystalline. For example if a glass-ceramic comprises $Al_2O_3$ and $ZrO_2$, the $Al_2O_3$ and $ZrO_2$ may each be in an amorphous state, crystalline state, or portions in an amorphous state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3$.metal oxides.

Further, it is understood that glass-ceramics formed by heating amorphous material not exhibiting a $T_g$ may not actually comprise glass, but rather may comprise the crystals and amorphous material that does not exhibiting a $T_g$.

In some embodiments, preferred glass-ceramics according to the present invention comprise at least 35 (in some embodiments, preferably at least 40, 45, 50, 55, 60, 65, or even at least 70) percent by weight $Al_2O_3$, based on the total weight of the glass-ceramic. In some embodiments, preferred glass-ceramics according to the present invention, and glasses used to make glass the glass-ceramics comprise, or further comprise with $Al_2O_3$ another oxide such as, $Y_2O_3$, REO, $ZrO_2$, $HfO_2$, and/or combinations thereof.

In some embodiments, preferred glass-ceramic according to the present invention, glasses comprising such glass-ceramics, and glasses used to make such glass-ceramics, comprise $Al_2O_3$, $Y_2O_3$, and at least one of $ZrO_2$ or $HfO_2$, wherein at least 80 percent by weight of the glass or glass-ceramic collectively comprises the $Al_2O_3$, $Y_2O_3$, and at least one of $ZrO_2$ or $HfO_2$, based on the total weight of the glass or glass-ceramic. In some embodiments, preferred glass-ceramic according to the present invention, glasses comprising such glass-ceramics, and glasses used to make such glass-ceramics, comprise $Al_2O_3$, REO, and at least one of $ZrO_2$ or $HfO_2$, wherein at least 80 (in some embodiments, 85, 90, 95, or even at least 100) percent by weight of the glass or glass-ceramic collectively comprises the $Al_2O_3$, REO, and at least one of $ZrO_2$ or $HfO_2$, based on the total weight of the glass or glass-ceramic. In some embodiments, preferred glass-ceramic according to the present invention, glasses comprising such glass-ceramics, and glasses used to make such glass-ceramics, comprise $Al_2O_3$, REO, $Y_2O_3$, and at least one of $ZrO_2$ or $HfO_2$, wherein at least 80 (in some embodiments, 85, 90, 95, or even at least 100) percent by weight of the glass or glass-ceramic collectively comprises the $Al_2O_3$, REO, $Y_2O_3$, and at least one of $ZrO_2$ or $HfO_2$, based on the total weight of the glass or glass-ceramic.

In some embodiments, preferred glass-ceramic according to the present invention, glasses comprising such glass-ceramics, and glasses used to make such glass-ceramics, comprise $Al_2O_3$, REO, and at least one of $ZrO_2$ or $HfO_2$, wherein at least 60 (in some embodiments, 65, 70, 75, 80, 85, 90, 95, or even at least 100) percent by weight of the glass or glass-ceramic collectively comprise the $Al_2O_3$, REO, and at least one of $ZrO_2$ or $HfO_2$, and less than 20 (in some embodiments preferably, less than 15, 10, 5, or even zero) percent by weight $SiO_2$ and less than 20 (in some embodiments, preferably less than 15, 10, 5, or even zero) percent by weight $B_2O_3$, based on the total weight of the glass or glass-ceramic. In some embodiments, preferred glass-ceramic according to the present invention, glasses comprising such glass-ceramics, and glasses used to make such glass-ceramics, comprise $Al_2O_3$, $Y_2O_3$, and at least one of $ZrO_2$ or $HfO_2$, wherein at least 60 (in some embodiments, 65, 70, 75, 80, 85, 90, 95, or even at least 100) percent by weight of the glass or glass-ceramic collectively comprise the $Al_2O_3$, $Y_2O_3$, and at least one of $ZrO_2$ or $HfO_2$, and less than 20 (in some embodiments, preferably less than 15, 10, 5, or even zero) percent by weight $SiO_2$ and less than 20 (in some embodiments, preferably less than 15, 10, 5, or even zero) percent by weight $B_2O_3$, based on the total weight of the glass or glass-ceramic. In some embodiments, preferred glass-ceramic according to the present invention, glasses comprising such glass-ceramics, and glasses used to make such glass-ceramics, comprise $Al_2O_3$, $Y_2O_3$, REO, and at least one of $ZrO_2$ or $HfO_2$, wherein at least 60 (in some embodiments, 65, 70, 75, 80, 85, 90, 95, or even at least 100) percent by weight of the glass or glass-ceramic collectively comprise the $Al_2O_3$, $Y_2O_3$, REO, and at least one of $ZrO_2$ or $HfO_2$, and less than 20 (preferably, less than 15, 10, 5, or even zero) percent by weight $SiO_2$, and less than 20 (preferably, less than 15, 10, 5, or even zero) percent by weight $B_2O_3$, based on the total weight of the glass or glass-ceramic.

In some embodiments, preferred glass-ceramic according to the present invention, glasses comprising such glass-ceramics, and glasses used to make such glass-ceramics, comprise $Al_2O_3$, $Y_2O_3$, and at least one of $ZrO_2$ or $HfO_2$, wherein at least 60 (in some embodiments, 65, 70, 75, 80, 85, 90, 95, or even at least 100) percent by weight of the glass or glass-ceramic comprise the $Al_2O_3$, $Y_2O_3$, and at least one of $ZrO_2$ or $HfO_2$, and less than 40 (in some embodiments, preferably less than 35, 30, 25, 20, 15, 10, 5, or even zero) percent by weight collectively $SiO_2$, $B_2O_3$, and $P_2O_5$, based on the total weight of the glass or glass-ceramic. In some embodiments, preferred glass-ceramic according to the present invention, glasses comprising such glass-ceramics, and glasses used to make such glass-ceramics, comprise $Al_2O_3$, REO, and at least one of $ZrO_2$ or $HfO_2$, wherein at least 60 (in some embodiments, 65, 70, 75, 80, 85, 90, 95, or even at least 100) percent by weight of the glass or glass-ceramic comprise the $Al_2O_3$, REO, and at least one of $ZrO_2$ or $HfO_2$, and less than 40 (preferably, less than 35, 30, 25, 20, 15, 10, 5, or even zero) percent by weight collectively $SiO_2$, $B_2O_3$, and $P_2O_5$, based on the total weight of the glass or glass-ceramic. In some embodiments, preferred glass-ceramic according to the present invention, glasses comprising such glass-ceramics, and glasses used to make such glass-ceramics, comprise $Al_2O_3$, REO, $Y_2O_3$, and at least one of $ZrO_2$ or $HfO_2$, wherein at least 60 (in some embodiments, 65, 70, 75, 80, 85, 90, 95, or even at least 100) percent by weight of the glass or glass-ceramic comprise the $Al_2O_3$, REO, $Y_2O_3$, and at least one of $ZrO_2$ or $HfO_2$, and less than 40 (preferably, less than 35, 30, 25, 20, 15, 10, 5, or even zero) percent by weight collectively $SiO_2$, $B_2O_3$, and $P_2O_5$, based on the total weight of the glass or glass-ceramic.

In some embodiments, preferred glass-ceramic according to the present invention, glasses comprising such glass-ceramics, and glasses used to make such glass-ceramics, contain less than 40 (preferably, less than 35, 30, 25, 20, 15, 10, 5, or even zero) percent by weight collectively $SiO_2$, $B_2O_3$, and $P_2O_5$, based on the total weight of the glass or glass-ceramic. In some embodiments, preferred glass-ceramic according to the present invention, glasses comprising such glass-ceramics, and glasses used to make such glass-ceramics, contain not more than 10 (in some embodiments preferably, less than 5, 4, 3, 2, 1, or even zero) percent by weight collectively $As_2O_3$, $B_2O_3$, $GeO_2$, $P_2O_5$, $SiO_2$, $TeO_2$, and $V_2O_5$, based weight of the glass or glass-ceramic.

In some embodiments preferably, glass-ceramics according to the present invention comprise at least 35, 40, 45, 50, 55, 60, 65, or even at least 70% by weight $Al_2O_3$, based on the total weight of the glass-ceramic.

In another aspect, the present invention provides a method for making glass-ceramic according to the present invention, the method comprising:
  heat-treating amorphous material (e.g., glass) such that at least a portion of the amorphous material converts to a glass-ceramic according to the present invention.

In another aspect, the present invention provides a method for making a glass-ceramic article, the method comprising:
  providing glass particles, the glass having a $T_g$;
  heating the glass particles above the $T_g$ such that the glass particles coalesce to form a shape;
  cooling the shape to provide a glass article, and
  heat-treating the glass article to provide a glass-ceramic article.

In another aspect, the present invention provides abrasive particles comprising a glass-ceramic according to the present invention having an average hardness of at least 15 GPa, preferably, at least 16 GPa, at least 17 GPa, or even at least 18 GPa.

The abrasive particles can be incorporated into an abrasive article, or used in loose form. Abrasive articles according to the present invention comprise binder and a plurality of abrasive particles, wherein at least a portion of the abrasive particles are the abrasive particles according to the present invention. Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments, preferably, at least 5, 10, 15, 20, 25, 30, 35, 40, 45, 50, 55, 60, 65, 70, 75, 80, 85, 90, 95, or even 100 percent by weight of the abrasive particles in an abrasive article are the abrasive particles according to the present invention, based on the total weight of the abrasive particles in the abrasive article.

Abrasive particles are usually graded to a given particle size distribution before use. Such distributions typically have a range of particle sizes, from coarse particles fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles according to the present invention. In some embodiments, preferably, at least 5, 10, 15, 20, 25, 30, 35, 40, 45, 50, 55, 60, 65, 70, 75, 80, 85, 90, 95, or even 100 percent by weight of the plurality of abrasive particles are the abrasive particles according to the present invention, based on the total weight of the plurality of abrasive particles.

In another aspect, the present invention provides a method for making abrasive particles according to the present invention, the method comprising heat-treating particles comprising the amorphous material such that at least a portion of the amorphous material converts to a glass-ceramic provide the abrasive particles comprising the glass-ceramic. Typically, the abrasive particles comprising the glass-ceramic are graded after heat-treating to provide a plurality of abrasive particles having a specified nominal grade, wherein at least a portion of the plurality of abrasive particles is a plurality of the abrasive particles comprising the glass-ceramic. Optionally, prior to the heat-treating the particles the amorphous material, a plurality of particles having a specified nominal grade is provided, wherein at least a portion of the particles is a plurality of the particles comprising the amorphous material to be heat-treated, and wherein the heat-treating is conducted such that a plurality of abrasive particles having a specified nominal grade is provided, wherein at least a portion of the abrasive particles is a plurality of the abrasive particles comprising the glass-ceramic.

In another aspect, the present invention provides a method for making abrasive particles according to the present invention, the method comprising heat-treating particles comprising the amorphous material such that at least a portion of the amorphous material converts to a glass-ceramic to provide the abrasive particles comprising the glass-ceramic. Typically, the abrasive particles comprising the glass-ceramic are graded after heat-treating to provide a plurality of abrasive particles having a specified nominal grade, wherein at least a portion of the plurality of abrasive particles is a plurality of the abrasive particles comprising the glass-ceramic. Optionally, prior to the heat-treating the particles comprising the amorphous material, a plurality of particles having a specified nominal grade is provided, wherein at least a portion of the particles is a plurality of the particles comprising the amorphous material to be heat-treated, and wherein the heat-treating is conducted such that a plurality of abrasive particles having a specified nominal grade is provided, wherein at least a portion of the abrasive particles is a plurality of the abrasive particles comprising the glass-ceramic.

In another aspect, the present invention provides a method for making abrasive particles according to the present invention, the method comprising:
heat-treating amorphous material such that at least a portion of the amorphous material converts to a glass-ceramic according to the present invention having an average hardness of at least 15 GPa; and
crushing the glass-ceramic to provide the abrasive particles comprising the glass-ceramic. Typically, the abrasive particles comprising the glass-ceramic are graded to provide a plurality of abrasive particles having a specified nominal grade, wherein at least a portion of the plurality of abrasive particles is a plurality of the abrasive particles comprising the glass-ceramic.

In another aspect, the present invention provides a method of abrading a surface, the method comprising:
providing an abrasive article comprising a binder and a plurality of abrasive particles, wherein at least a portion of the abrasive particles according to the present invention;
contacting at least one of the abrasive particles according to the present invention with a surface of a workpiece; and
moving at least one of the contacted abrasive particles according to the present invention or the contacted surface to abrade at least a portion of the surface with the contacted abrasive particle according to the present invention.

In another aspect, the present invention provides a method for making glass-ceramic according to the present invention, the method comprising:
combining at least (a) glass, the glass having a $T_g$, and (b) refractory particles (e.g., metal oxide particles, boride particles, carbide particles, nitride particles, diamond particles, metallic particles, glass particles, and combinations thereof) relative to the glass particles;
heating the glass particles above the $T_g$ such that the glass particles coalesce;
cooling the glass to provide ceramic; and
heat-treating the glass of the ceramic such that at least a portion of the glass converts to the glass-ceramic.

Glass-ceramics according to the present invention can be made, formed as, or converted into particles (e.g., glass beads (e.g., beads having diameters of at least 1 micrometer, 5 micrometers, 10 micrometers, 25 micrometers, 50 micrometers, 100 micrometers, 150 micrometers, 250 micrometers, 500 micrometers, 750 micrometers, 1 mm, 5 mm, or even at least 10 mm) articles (e.g., plates), fibers, particles, and coatings (e.g., thin coatings). Glass-ceramic particles and fibers are useful, for example, as thermal insulation, filler, or reinforcing material in composites (e.g., ceramic, metal, or polymeric matrix composites). The thin coatings can be useful, for example, as protective coatings in applications involving wear, as well as for thermal management. Examples of articles according of the present invention include kitchenware (e.g., plates, knives), dental brackets, and reinforcing fibers, cutting tool inserts, abrasive materials, and structural components of gas engines, (e.g., valves and bearings), medical implants, surgical scalpels. Other articles include those having a protective coating of ceramic on the outer surface of a body or other substrate.

DETAILED DESCRIPTION

Figure 1:
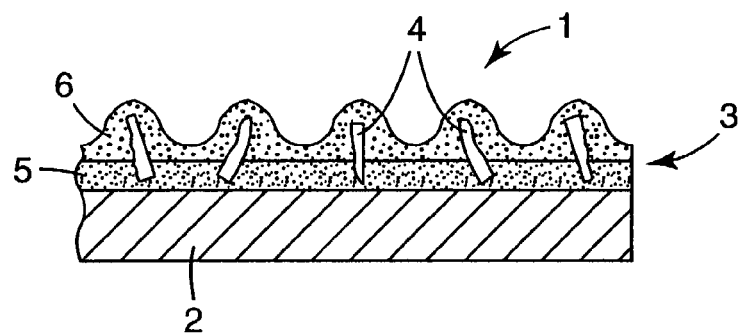
FIG. 1 is a fragmentary cross-sectional schematic view of a coated abrasive article including abrasive particles according to the present invention.

Glass-ceramics according to the present invention can be made, for example, by crystallizing amorphous material (e.g., glass) or amorphous material in a ceramic comprising the amorphous material to provide a glass-ceramic. In some embodiments, preferably amorphous materials used to make glass-ceramics according to the present invention, and the glass-ceramics made there from, contain not more than 30 (in some embodiments preferably, not more than 20, 15, 10, 5, 4, 3, 2, 1, or even zero) percent by weight collectively $As_2O_3$, $B_2O_3$, $GeO_2$, $P_2O_5$, $SiO_2$, $TeO_2$, and $V_2O_5$, based on the total weight of the amorphous material or glass-ceramic.

In some embodiments preferably, amorphous materials used to make glass-ceramics according to the present invention, and glass-ceramics made there from, comprise at least 35, 40, 45, 50, 55, 60, 65, or even at least 70% by weight $Al_2O_3$, based on the total weight of the amorphous material or glass-ceramic.

Some amorphous materials used to make glass-ceramics according to the present invention, and the glass-ceramics made there from, comprise 20 to at least 70 percent by weight (in some embodiments, 30 to at least 70 percent, 40 to at least 70 percent, 50 to at least 70 percent, or even 60 to at least 70 percent) $Al_2O_3$; 0 to 50 percent by weight (in some embodiments, 0 to 25 percent; or even 0 to 10 percent) $Y_2O_3$; and 0 to 70 percent by weight (in some embodiments, 0 to 50 percent, 0 to 25 percent; or even 0 to 10 percent) at least one of $ZrO_2$ or $HfO_2$, based on the total weight of the amorphous material or glass-ceramic. In some embodiments, such amorphous materials, and the glass-ceramics made there from, comprise at least 30 percent by weight, at least 40 percent by weight, at least 50 percent by weight, at least 60 percent by weight, or even at least 70 percent by weight $Al_2O_3$, based on the total weight of the amorphous material or glass-ceramic. In some embodiments, such amorphous materials, and the glass-ceramics made there from, contain less than 40 (in some embodiments, less than 35, 30, 25, 20, 15, 10, 5, 4, 3, 2, 1, or even zero) percent by weight collectively $SiO_2$, $B_2O_3$, and $P_2O_5$, based on the total weight of the amorphous material or glass-ceramic. In some embodiments, such amorphous materials, and the glass-ceramics made there from, contain less than 20 (in some embodiments, less than 15, 10, 5, or even zero) percent by weight $SiO_2$ and less than 20 (preferably, less than 15, 10, 5, or even zero) percent by weight $B_2O_3$, based on the total weight of the amorphous material or glass-ceramic.

Some amorphous materials used to make glass-ceramics according to the present invention, and the glass-ceramics made there from, comprise 20 to at least 70 percent by weight (in some embodiments, 30 to at least 70 percent, 40 to at least 70 percent, 50 to at least 70 percent, or even 60 to at least 70 percent) $Al_2O_3$; 0 to 70 percent by weight (in some embodiments, 0 to 50 percent, 0 to 25 percent; or even 0 to 10 percent) REO; 0 to 50 percent by weight (in some embodiments, 0 to 25 percent; or even 0 to 10 percent) at least one of $ZrO_2$ or $HfO_2$, based on the total weight of the amorphous material or glass-ceramic. In some embodiments, such amorphous materials, and the glass-ceramics made there from, comprise 30 percent by weight, at least 40 percent by weight, at least 50 percent by weight, at least 60 percent by weight, or even at least 70 percent by weight $Al_2O_3$, based on the total weight of the amorphous material or glass-ceramic. In some embodiments, such amorphous materials, and the glass-ceramics made there from, comprise less than 40 (in some embodiments, less than 35, 30, 25, 20, 15, 10, 5, 4, 3, 2, 1, or even zero) percent by weight collectively $SiO_2$, $B_2O_3$, and $P_2O_5$, based on the total weight of the amorphous materials or glass-ceramic. In some embodiments, such glasses, and the glass-ceramics made there from, contain less than 20 (in some embodiments, less than 15, 10, 5, or even zero) percent by weight $SiO_2$ and less than 20 (in some embodiments, less than 15, 10, 5, or even zero) percent by weight $B_2O_3$, based on the total weight of the amorphous material or glass-ceramic.

Some amorphous materials used to make glass-ceramics according to the present invention, and the glass-ceramics made there from, comprise 20 to at least 70 percent by weight (in some embodiments, 30 to at least 70 percent, 40 to at least 70 percent, 50 to at least 70 percent, or even 60 to 70 percent) $Al_2O_3$; 0 to 70 percent by weight (in some embodiments, 0 to 50 percent, 0 to 25 percent; or even 0 to 10 percent) $Y_2O_3$; 0 to 70 percent by weight (in some embodiments, 0 to 50 percent, 0 to 25 percent; or even 0 to 10 percent) REO, 0 to 50 percent by weight (in some embodiments, 0 to 25 percent; or even 0 to 10 percent) at least one of $ZrO_2$ or $HfO_2$, based on the total weight of the amorphous material or glass-ceramic. In some embodiments, such amorphous materials, and the glass-ceramics made there from, comprise at least 30 percent by weight, at least 40 percent by weight, at least 50 percent by weight, at least 60 percent by weight, or even at least 70 percent by weight $Al_2O_3$, based on the total weight of the amorphous material or glass-ceramic. In some embodiments, such amorphous materials, and the glass-ceramics made there from, contain less than 40 (in some embodiments, less than 35, 30, 25, 20, 15, 10, 5, 4, 3, 2, 1, or even zero) percent by weight collectively $SiO_2$, $B_2O_3$, and $P_2O_5$, based on the total weight of the amorphous material or glass-ceramic. In some embodiments, such amorphous materials, and the glass-ceramics made there from, contain less than 20 (in some embodiments, less than 15, 10, 5, or even zero) percent by weight $SiO_2$ and less than 20 (in some embodiments, less than 15, 10, 5, or even zero) percent by weight $B_2O_3$, based on the total weight of the amorphous material or glass-ceramic.

Amorphous materials (e.g., glasses), ceramics comprising the amorphous material, particles comprising the amorphous material, etc. can be made, for example, by heating (including in a flame) the appropriate metal oxide sources to form a melt, desirably a homogenous melt, and then rapidly cooling the melt to provide amorphous material. Embodiments of amorphous materials can be made, for example, by melting the metal oxide sources in any suitable furnace (e.g., an inductive heated furnace, a gas-fired furnace, or an electrical furnace), or, for example, in a plasma. The resulting melt is cooled (e.g., discharging the melt into a cooling media (e.g., high velocity air jets, liquids, metal plates (including chilled metal plates), metal rolls (including chilled metal rolls), metal balls (including chilled metal balls), and the like)).

Embodiments of amorphous material can be made utilizing flame fusion as disclosed, for example, in U.S. Pat. No. 6,254,981 (Castle), the disclosure of which is incorporated herein by reference. In this method, the metal oxide sources materials are fed (e.g., in the form of particles, sometimes referred to as "feed particles") directly into a burner (e.g., a methane-air burner, an acetylene-oxygen burner, a hydrogen-oxygen burner, and like), and then quenched, for example, in water, cooling oil, air, or the like. Feed particles can be formed, for example, by grinding, agglomerating (e.g., spray-drying), melting, or sintering the metal oxide sources. The size of feed particles fed into the flame generally determine the size of the resulting amorphous material comprising particles.

Embodiments of amorphous materials can also be obtained by other techniques, such as: laser spin melt with free fall cooling, Taylor wire technique, plasmatron technique, hammer and anvil technique, centrifugal quenching, air gun splat cooling, single roller and twin roller quenching, roller-plate quenching and pendant drop melt extraction (see, e.g., *Rapid Solidification of Ceramics*, Brockway et al., Metals And Ceramics Information Center, A Department of Defense Information Analysis Center, Columbus, Ohio, January, 1984, the disclosure of which is incorporated here as a reference). Embodiments of amorphous materials may also be obtained by other techniques, such as: thermal (including flame or laser or plasma-assisted) pyrolysis of suitable precursors, physical vapor synthesis (PVS) of metal precursors and mechanochemical processing.

Useful amorphous material formulations include those at or near a eutectic composition(s) (e.g., binary and ternary eutectic compositions). In addition to compositions disclosed herein, other compositions, including quaternary and other higher order eutectic compositions, may be apparent to those skilled in the art after reviewing the present disclosure.

Typically, amorphous materials, and the glass-ceramics according to the present invention made there from, have x, y, and z dimensions each perpendicular to each other, and wherein each of the x, y, and z dimensions is at least 25 micrometers. In some embodiments, the x, y, and z dimensions is at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 1 mm, 5 mm, or even at least 10 mm.

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$.metal oxides (e.g., $Dy_3Al_5O_{12}$, $Y_3Al_5O_{12}$, $CeAl_{11}O_{18}$, etc.)).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxide.other metal oxides (e.g., $Dy_3Al_5O_{12}$, $CeAl_{11}O_{18}$, etc.)).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$)).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

Other useful metal oxide may also include, on a theoretical oxide basis, BaO, CaO, $Cr_2O_3$, CoO, $Fe_2O_3$, $GeO_2$, $Li_2O$, MgO, MnO, NiO, $Na_2O$, $Sc_2O_3$, SrO, $TiO_2$, ZnO, and combinations thereof. Sources, including commercial sources, include the oxides themselves, complex oxides, ores, carbonates, acetates, nitrates, chlorides, hydroxides, etc. These metal oxides are added to modify a physical property of the resulting abrasive particles and/or improve processing. These metal oxides are typically are added anywhere from 0 to 50% by weight, in some embodiments preferably 0 to 25% by weight and more preferably 0 to 50% by weight of the glass-ceramic depending, for example, upon the desired property.

The particular selection of metal oxide sources and other additives for making ceramics according to the present invention typically takes into account, for example, the desired composition and microstructure of the resulting ceramics, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

In some instances, it may be preferred to incorporate limited amounts of metal oxides selected from the group consisting of: $Na_2O$, $P_2O_5$, $SiO_2$, $TeO_2$, $V_2O_3$, and combinations thereof. Sources, including commercial sources, include the oxides themselves, complex oxides, ores, carbonates, acetates, nitrates, chlorides, hydroxides, etc. These metal oxides may be added, for example, to modify a physical property of the resulting abrasive particles and/or improve processing. These metal oxides when used are typically are added from greater than 0 to 20% by weight, preferably greater than 0 to 5% by weight and more preferably greater than 0 to 2% by weight of the glass-ceramic depending, for example, upon the desired property.

In some embodiments, it may be advantageous for at least a portion of a metal oxide source (in some embodiments, preferably, 10 15, 20, 25, 30, 35, 40, 45, or even at least 50 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise metal them with the other raw materials. Although not wanting to be bound by theory, it is believed that the heat resulting from the exothermic reaction associated with the oxidation of the metal is beneficial in the formation of a homogeneous melt and resulting amorphous material. For example, it is believed that the additional heat generated by the oxidation reaction within the raw material eliminates or minimizes insufficient heat transfer, and hence facilitates formation and homogeneity of the melt, particularly when forming amorphous particles with x, y, and z dimensions over 150 micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or otherwise not practical due to high melting point of the materials. Further, the presence of the additional heat generated by the oxidation reaction actually enables the formation of amorphous material that otherwise could not be made, or could not be made in the desired size range. Another advantage of the invention include, in forming the amorphous materials, that many of the chemical and physical processes such as melting, densification and spherodizing can be achieved in a short time, so that very high quench rates be can achieved. For additional details, see copending application having U.S. Ser. No. 10/211,639, filed the same date as the instant application, the disclosure of which is incorporated herein by reference.

The addition of certain metal oxides may alter the properties and/or crystalline structure or microstructure of a glass-ceramic according to the present invention, as well as the processing of the raw materials and intermediates in making the glass-ceramic. For example, oxide additions such as MgO, CaO, $Li_2O$, and $Na_2O$ have been observed to alter both the $T_g$ (for a glass) and $T_x$ (wherein $T_x$ is the crystallization temperature) of amorphous material. Although not wishing to be bound by theory, it is believed that such additions influence glass formation. Further, for example, such oxide additions may decrease the melting temperature of the overall system (i.e., drive the system toward lower melting eutectic), and ease of amorphous material-formation. Complex eutectics in multi component systems (quaternary, etc.) may result in better amorphous material-forming ability. The viscosity of the liquid melt and viscosity of the glass in its "working" range may also be affected by the addition of certain metal oxides such as MgO, CaO, $Li_2O$, and $Na_2O$. It is also within the scope of the present invention to incorporate at least one of halogens (e.g., fluorine and chlorine), or chalcogenides (e.g., sulfides, selenides, and tellurides) into the amorphous materials, and the glass-ceramics made there from.

Crystallization of the amorphous material and ceramic comprising the amorphous material may also be affected by the additions of certain materials. For example, certain metals, metal oxides (e.g., titanates and zirconates), and fluorides, for example, may act as nucleation agents resulting in beneficial heterogeneous nucleation of crystals. Also, addition of some oxides may change nature of metastable phases devitrifying from the amorphous material upon reheating. In another aspect, for ceramics comprising crystalline $ZrO_2$, it may be desirable to add metal oxides (e.g., $Y_2O_3$, $TiO_2$, CaO, and MgO) that are known to stabilize tetragonal/cubic form of $ZrO_2$.

The particular selection of metal oxide sources and other additives for making ceramics according to the present invention typically takes into account, for example, the desired composition and microstructure of the resulting ceramics, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

The metal oxide sources and other additives can be in any form suitable to the process and equipment being used to make the glass-ceramics according to the present invention. The raw materials can be melted and quenched using techniques and equipment known in the art for making oxide amorphous materials and amorphous metals. Desirable cooling rates include those of 50K/s and greater. Cooling techniques known in the art include roll-chilling. Roll-chilling can be carried out, for example, by melting the metal oxide sources at a temperature typically 20–200° C. higher than the melting point, and cooling/quenching the melt by spraying it under high pressure (e.g., using a gas such as air, argon, nitrogen or the like) onto a high-speed rotary roll(s). Typically, the rolls are made of metal and are water cooled. Metal book molds may also be useful for cooling/quenching the melt.

Other techniques for forming melts, cooling/quenching melts, and/or otherwise forming amorphous material include vapor phase quenching, melt-extraction, plasma spraying, and gas or centrifugal atomization. Vapor phase quenching can be carried out, for example, by sputtering, wherein the metal alloys or metal oxide sources are formed into a sputtering target(s) which are used. The target is fixed at a predetermined position in a sputtering apparatus, and a substrate(s) to be coated is placed at a position opposing the target(s). Typical pressures of $10^{-3}$ torr of oxygen gas and Ar gas, discharge is generated between the target(s) and a substrate(s), and Ar or oxygen ions collide against the target to start reaction sputtering, thereby depositing a film of composition on the substrate. For additional details regarding plasma spraying, see, for example, copending application having U.S. Ser. No. 10/211,604, filed the same date as the instant application, the disclosure of which is incorporated herein by reference.

Gas atomization involves melting feed particles to convert them to melt. A thin stream of such melt is atomized through contact with a disruptive air jet (i.e., the stream is divided into fine droplets). The resulting substantially discrete, generally ellipsoidal amorphous material comprising particles (e.g., beads) are then recovered. Examples of bead sizes include those having a diameter in a range of about 5 micrometers to about 3 mm. Melt-extraction can be carried out, for example, as disclosed in U.S. Pat. No. 5,605,870 (Strom-Olsen et al.), the disclosure of which is incorporated herein by reference. Containerless glass forming techniques utilizing laser beam heating as disclosed, for example, in PCT application having Publication No. WO 01/27046 A1, published Apr. 4, 2001, the disclosure of which is incorporated herein by reference, may also be useful in making materials according to the present invention.

The cooling rate is believed to affect the properties of the quenched amorphous material. For instance, glass transition temperature, density and other properties of glass typically change with cooling rates.

Typically, it is preferred that the bulk material comprises at least 50, 60, 75, 80, 85, 90, 95, 98, 99, or even 100 percent by weight of the amorphous material.

Rapid cooling may also be conducted under controlled atmospheres, such as a reducing, neutral, or oxidizing environment to maintain and/or influence the desired oxidation states, etc. during cooling. The atmosphere can also influence amorphous material formation by influencing crystallization kinetics from undercooled liquid. For example, larger undercooling of $Al_2O_3$ melts without crystallization has been reported in argon atmosphere as compared to that in air.

The microstructure or phase composition (glassy/amorphous/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

A percent amorphous yield can be calculated for beads using a −100+120 mesh size fraction (i.e., the fraction collected between 150-micrometer opening size and 125-micrometer opening size screens). The measurements are done in the following manner. A single layer of beads is spread out upon a glass slide. The beads are observed using an optical microscope. Using the crosshairs in the optical microscope eyepiece as a guide, beads that lay along a straight line are counted either amorphous or crystalline depending on their optical clarity. A total of 500 beads are counted and a percent amorphous yield is determined by the amount of amorphous beads divided by total beads counted.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, an XRD can be used qualitatively to determine types of phases. The presence of a broad diffused intensity peak is taken as an indication of the amorphous nature of a material. The existence of both a broad peak and well-defined peaks is taken as an indication of existence of crystalline matter within an amorphous matrix.

The initially formed amorphous material or ceramic (including glass prior to crystallization) may be larger in size than that desired. The amorphous material or ceramic can be converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the ceramic is formed (solidified), it may be in the form of larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are of the desired size may be recrushed if they are too large, or "recycled" and used as a raw material for re-melting if they are too small.

The shape of the ceramic (including glass prior to crystallization) may depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. The resulting abrasive particle may have an average aspect ratio ranging from 1:1 to 5:1, typically 1.25:1 to 3:1 and preferably 1.5:1 to 2.5:1.

It is also within the scope of the present invention, for example, to directly form ceramic (including glass prior to crystallization) may in desired shapes. For example, ceramic (including glass prior to crystallization) may be formed (including molded) by pouring or forming the melt into a mold.

It is also within the scope of the present invention, for example, to fabricate the ceramic (including glass prior to crystallization) by coalescing. This coalescing step in essence forms a larger sized body from two or more smaller particles. For example, amorphous material comprising particles (obtained, for example, by crushing) (including beads and microspheres), fibers, etc. may formed into a larger particle size. For example, ceramic (including glass prior to crystallization), may also be provided by heating, for example, particles comprising the amorphous material, and/or fibers, etc. above the $T_g$ such that the particles, etc. coalesce to form a shape and cooling the coalesced shape. The temperature and pressure used for coalescing may depend, for example, upon composition of the amorphous material and the desired density of the resulting material.

The temperature should below glass crystallization temperature, and for glasses, greater than the glass transition temperature. In certain embodiments, the heating is conducted at at least one temperature in a range of about 850° C. to about 1100° C. (in some embodiments, preferably 900° C. to 1000° C.). Typically, the amorphous material is under pressure (e.g., greater than zero to 1 GPa or more) during coalescence to aid the coalescence of the amorphous material. In one embodiment, a charge of the particles, etc. is placed into a die and hot-pressing is performed at temperatures above glass transition where viscous flow of glass leads to coalescence into a relatively large part. Examples of typical coalescing techniques include hot pressing, hot isostatic pressure, hot extrusion and the like. Typically, it is generally preferred to cool the resulting coalesced body before further heat treatment. After heat treatment if so desired, the coalesced body may be crushed to smaller particle sizes or a desired particle size distribution.

It is also within the scope of the present invention to conduct additional heat-treatment to further improve desirable properties of the material. For example, hot-isostatic pressing may be conducted (e.g., at temperatures from about 900° C. to about 1400° C.) to remove residual porosity, increasing the density of the material. Optionally, the resulting, coalesced article can be heat-treated to provide glass-ceramic, crystalline ceramic, or ceramic otherwise comprising crystalline ceramic.

Coalescence of the amorphous material and/or glass-ceramic (e.g., particles) may also be accomplished by a variety of methods, including pressureless or pressure sintering (e.g., sintering, plasma assisted sintering, hot pressing, HIPing, hot forging, hot extrusion, etc.).

Heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment can be conducted continuously, for example, using rotary kilns. In the case of a rotary kiln, the material is fed directly into a kiln operating at the elevated temperature. The time at the elevated temperature may range from a few seconds (in some embodiments even less than 5 seconds) to a few minutes to several hours. The temperature may range anywhere from 900° C. to 1600° C., typically between 1200° C. to 1500° C. It is also within the scope of the present invention to perform some of the heat-treatment in batches (e.g., for the nucleation step) and another continuously (e.g., for the crystal growth step and to achieve the desired density). For the nucleation step, the temperature typically ranges between about 900° C. to about 1100° C., in some embodiments, preferably in a range from about 925° C. to about 1050° C. Likewise for the density step, the temperature typically is in a range from about 1100° C. to about 1600° C., in some embodiments, preferably in a range from about 1200° C. to about 1500° C. This heat treatment may occur, for example, by feeding the material directly into a furnace at the elevated temperature. Alternatively, for example, the material may be feed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for example, it may be desirable to heat-treat under gas pressure as in, for example, hot-isostatic press, or in gas pressure furnace. It is within the scope of the present invention to convert (e.g., crush) the resulting article or heat-treated article to provide particles (e.g., abrasive particles).

The amorphous material is heat-treated to at least partially crystallize the amorphous material to provide glass-ceramic. The heat-treatment of certain glasses to form glass-ceramics is well known in the art. The heating conditions to nucleate and grow glass-ceramics are known for a variety of glasses. Alternatively, one skilled in the art can determine the appropriate conditions from a Time-Temperature-Transformation (TTT) study of the glass using techniques known in the art. One skilled in the art, after reading the disclosure of the present invention should be able to provide TTT curves for glasses according to the present invention, determine the appropriate nucleation and/or crystal growth conditions to provide glass-ceramics according to the present invention.

Typically, glass-ceramics are stronger than the amorphous materials from which they are formed. Hence, the strength of the material may be adjusted, for example, by the degree to which the amorphous material is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example, *Glass-Ceramics*, P. W. McMillan, Academic Press, Inc., $2^{nd}$ edition, 1979, the disclosure of which is incorporated herein by reference.

For example, during heat-treatment of some exemplary amorphous materials for making glass-ceramics according to present invention, formation of phases such as $La_2Zr_2O_7$, and, if $ZrO_2$ is present, cubic/tetragonal $ZrO_2$, in some cases monoclinic $ZrO_2$, have been observed at temperatures above about 900° C. Although not wanting to be bound by theory, it is believed that zirconia-related phases are the first phases to nucleate from the amorphous material. Formation of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Typically, crystallite size during this nucleation step is on order of nanometers. For example, crystals as small as 10–15 nanometers have been observed. For at least some embodiments, heat-treatment at about 1300° C. for about 1 hour provides a full crystallization. In generally, heat-treatment times for each of the nucleation and crystal growth steps may range of a few seconds (in some embodiments even less than 5 seconds) to several minutes to an hour or more.

The size of the resulting crystals can typically controlled at least in part by the nucleation and/or crystallization times and/or temperatures. Although it is generally preferred to have small crystals (e.g., on the order not greater than a micrometer, or even not greater than a nanometer) glass-ceramics according to the present invention may be made with larger crystal sizes (e.g., at least 1–10 micrometers, at least 10–25 micrometers, at least 50–100 micrometers, or even grater than 100 micrometers). Although not wanting to be bound by theory, it is generally believed in the art that the finer the size of the crystals (for the same density), the higher the mechanical properties (e.g., hardness and strength) of the ceramic.

Examples of crystalline phases which may be present in embodiments of glass-ceramics according to the present invention include: $Al_2O_3$ (e.g., $\alpha$-$Al_2O_3$), $Y_2O_3$, REO, $HfO_2$ $ZrO_2$ (e.g., cubic $ZrO_2$ and tetragonal $ZrO_2$), BaO, CaO, $Cr_2O_3$, CoO, $Fe_2O_3$, $GeO_2$, $Li_2O$, MgO, MnO, NiO, $Na_2O$, $P_2O_5$, $Sc_2O_3$, $SiO_2$, SrO, $TeO_2$, $TiO_2$, $V_2O_3$, $Y_2O_3$, ZnO, "complex metal oxides" (including "complex $Al_2O_3$.metal oxide (e.g., complex $Al_2O_3$.REO (e.g., $ReAlO_3$ (e.g., $GdAlO_3$, $LaAlO_3$), $ReAl_{11}O_{18}$ (e.g., $LaAl_{11}O_{18}$,), and $Re_3Al_5O_{12}$ (e.g., $Dy_3Al_5O_{12}$)), complex $Al_2O_3.Y_2O_3$ (e.g., $Y_3Al_5O_{12}$), and complex $ZrO_2$.REO (e.g., $Re_2Zr_2O_7$ (e.g., $La_2Zr_2O_7$))), and combinations thereof.

It is also with in the scope of the present invention to substitute a portion of the yttrium and/or aluminum cations in a complex $Al_2O_3$.metal oxide (e.g., complex $Al_2O_3.Y_2O_3$ (e.g., yttrium aluminate exhibiting a garnet crystal structure)) with other cations. For example, a portion of the Al cations in a complex $Al_2O_3.Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3.Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Similarly, it is also with in the scope of the present invention to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

It is also with in the scope of the present invention to substitute a portion of the rare earth and/or aluminum cations in a complex $Al_2O_3$.metal oxide (e.g., complex $Al_2O_3$.REO) with other cations. For example, a portion of the Al cations in a complex $Al_2O_3$.REO may be substituted with at least one cation of an element selected from the group consisting of: Cr, Ti, Sc, Fe, Mg, Ca, Si, Co, and combinations thereof. For example, a portion of the Y cations in a complex $Al_2O_3$.REO may be substituted with at least one cation of an element selected from the group consisting of: Y, Fe, Ti, Mn, V, Cr, Co, Ni, Cu, Mg, Ca, Sr, and combinations thereof. Similarly, it is also with in the scope of the present invention to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

The average crystal size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The mounted and polished sample is sputtered with a thin layer of gold-palladium and viewed using a scanning electron microscopy (such as the JEOL SEM Model JSM 840A). A typical back-scattered electron (BSE) micrograph of the microstructure found in the sample is used to determine the average crystal size as follows. The number of crystals that intersect per unit length ($N_L$) of a random straight line drawn across the micrograph are counted. The average crystal size is determined from this number using the following equation.

$$\text{Average Crystal Size} = \frac{1.5}{N_L M}$$

Where $N_L$ is the number of crystals intersected per unit length and M is the magnification of the micrograph.

Some embodiments of the present invention include glass-ceramics comprising alpha alumina having at least one of an average crystal size not greater than 150 nanometers.

Some embodiments of the present invention include glass-ceramics comprising alpha alumina, wherein at least 90 (in some embodiments preferably, 95, or even 100) percent by number of the alpha alumina present in such portion have crystal sizes not greater than 200 nanometers.

Some embodiments of the present invention include glass-ceramics comprising alpha $Al_2O_3$, crystalline $ZrO_2$, and a first complex $Al_2O_3.Y_2O_3$, and wherein at least one of the alpha $Al_2O_3$, the crystalline $ZrO_2$, or the first complex $Al_2O_3.Y_2O_3$ has an average crystal size not greater than 150 nanometers. In some embodiments preferably, the glass-ceramics further comprise a second, different complex $Al_2O_3.Y_2O_3$. In some embodiments preferably, the glass-ceramics further comprise a complex $Al_2O_3$.REO.

Some embodiments of the present invention include glass-ceramics comprising a first complex $Al_2O_3.Y_2O_3$, a second, different complex $Al_2O_3.Y_2O_3$, and crystalline $ZrO_2$, and wherein for at least one of the first complex $Al_2O_3.Y_2O_3$, the second complex $Al_2O_3.Y_2O_3$, or the crystalline $ZrO_2$, at least 90 (in some embodiments preferably, 95, or even 100) percent by number of the crystal sizes thereof are not greater than 200 nanometers. In some embodiments preferably, the glass-ceramics further comprise a second, different complex $Al_2O_3.Y_2O_3$. In some embodiments preferably, the glass-ceramics further comprise a complex $Al_2O_3$.REO.

Some embodiments of the present invention include glass-ceramics comprising alpha $Al_2O_3$, crystalline $ZrO_2$, and a first complex $Al_2O_3$.REO, and wherein at least one of the alpha $Al_2O_3$, the crystalline $ZrO_2$, or the first complex $Al_2O_3$.REO has an average crystal size not greater than 150 nanometers. In some embodiments preferably, the glass-ceramics further comprise a second, different complex $Al_2O_3$.REO. In some embodiments preferably, the glass-ceramics further comprise a complex $Al_2O_3.Y_2O_3$.

Some embodiments of the present invention include glass-ceramics comprising a first complex $Al_2O_3$.REO, a second, different complex $Al_2O_3$.REO, and crystalline $ZrO_2$, and wherein for at least one of the first complex $Al_2O_3$.REO, the second complex $Al_2O_3$.REO, or the crystalline $ZrO_2$, at least 90 (in some embodiments preferably, 95, or even 100) percent by number of the crystal sizes thereof are not greater than 200 nanometers. In some embodiments preferably, the glass-ceramics further comprise a complex $Al_2O_3.Y_2O_3$.

Some embodiments of the present invention include glass-ceramics comprising a first complex $Al_2O_3.Y_2O_3$, a second, different complex $Al_2O_3.Y_2O_3$, and crystalline $ZrO_2$, and wherein at least one of the first complex $Al_2O_3.Y_2O_3$, the second, different complex $Al_2O_3.Y_2O_3$, or the crystalline $ZrO_2$ has an average crystal size not greater than 150 nanometers. In some embodiments preferably, the glass-ceramics further comprise a second, different complex $Al_2O_3.Y_2O_3$. In some embodiments preferably, the glass-ceramics further comprise a complex $Al_2O_3$.REO.

Some embodiments of the present invention include glass-ceramics comprising a first complex $Al_2O_3.Y_2O_3$, a second, different complex $Al_2O_3.Y_2O_3$, and crystalline $ZrO_2$, and wherein for at least one of the first complex $Al_2O_3.Y_2O_3$, the second, different complex $Al_2O_3.Y_2O_3$, or the crystalline $ZrO_2$, at least 90 (in some embodiments preferably, 95, or even 100) percent by number of the crystal sizes thereof are not greater than 200 nanometers. In some embodiments preferably, the glass-ceramics further comprise a complex $Al_2O_3.REO$.

Some embodiments of the present invention include glass-ceramics comprising a first complex $Al_2O_3.REO$, a second, different complex $Al_2O_3.REO$, and crystalline $ZrO_2$, and wherein at least one of the first complex $Al_2O_3.REO$, the second, different complex $Al_2O_3.REO$, or the crystalline $ZrO_2$ has an average crystal size not greater than 150 nanometers. In some embodiments preferably, the glass-ceramics further comprise a second, different complex $Al_2O_3.REO$. In some embodiments preferably, the glass-ceramics further comprise a complex $Al_2O_3.Y_2O_3$.

Some embodiments of the present invention include glass-ceramics comprising a first complex $Al_2O_3.REO$, a second, different complex $Al_2O_3.REO$, and crystalline $ZrO_2$, and wherein for at least one of the first complex $Al_2O_3.REO$, the second, different complex $Al_2O_3.REO$, or the crystalline $ZrO_2$, at least 90 (in some embodiments preferably, 95, or even 100) percent by number of the crystal sizes thereof are not greater than 200 nanometers. In some embodiments preferably, the glass-ceramics further comprise a complex $Al_2O_3.Y_2O_3$.

In some embodiments, glass-ceramics according to the present invention comprise at least 75, 80, 85, 90, 95, 97, 98, 99, or even 100 percent by volume crystallites, wherein the crystallites have an average size of less than 1 micrometer. In some embodiments, glass-ceramics according to the present invention comprise not greater than at least 75, 80, 85, 90, 95, 97, 98, 99, or even 100 percent by volume crystallites, wherein the crystallites have an average size not greater than 0.5 micrometer. In some embodiments, glass-ceramics according to the present invention comprise less than at 75, 80, 85, 90, 95, 97, 98, 99, or even 100 percent by volume crystallites, wherein the crystallites have an average size not greater than 0.3 micrometer. In some embodiments, glass-ceramics according to the present invention comprise less than at least 75, 80, 85, 90, 95, 97, 98, 99, or even 100 percent by volume crystallites, wherein the crystallites have an average size not greater than 0.15 micrometer.

Crystals formed by heat-treating amorphous to provide embodiments of glass-ceramics according to the present invention may be, for example, equiaxed, columnar, or flattened splat-like features.

Although a glass-ceramic according to the present invention may be in the form of a bulk material, it is also within the scope of the present invention to provide composites comprising a glass-ceramic according to the present invention. Such a composite may comprise, for example, a phase or fibers (continuous or discontinuous) or particles (including whiskers) (e.g., metal oxide particles, boride particles, carbide particles, nitride particles, diamond particles, metallic particles, glass particles, and combinations thereof) dispersed in a glass-ceramic according to the present invention, invention or a layered-composite structure (e.g., a gradient of glass-ceramic according to the present invention to amorphous material used to make the glass-ceramic and/or layers of different compositions of glass-ceramics according to the present invention).

Typically, the (true) density, sometimes referred to as specific gravity, of ceramics according to the present invention is typically at least 70% of theoretical density. More desirably, the (true) density of ceramic according to the present invention is at least 75%, 80%, 85%, 90%, 92%, 95%, 96%, 97%, 98%, 99%, 99.5% or even 100% of theoretical density. Abrasive particles according to the present invention have densities of at least 85%, 90%, 92%, 95%, 96%, 97%, 98%, 99%, 99.5% or even 100% of theoretical density.

The average hardness of the material of the present invention can be determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991), the disclosure of which is incorporated herein by reference.

Abrasive particles according to the present invention have an average hardness of at least 15 GPa, in some embodiments, at least 16 GPa, at least 17 GPa, or even at least 18 GPa.

Additional details regarding amorphous materials and glass-ceramics, including making, using, and properties thereof, can be found in application having U.S. Ser. Nos. 09/922,526, 09/922,527, and 09/922,530, filed Aug. 2, 2001, and U.S. Ser. Nos. 10/211,598; 10/211,630; 10/211,639; 10/211,034; 10/211,628; 10/211,640; and 10/211,684, filed the same date as the instant application, the disclosures of which are incorporated herein by reference.

Abrasive particles according to the present invention generally comprise crystalline ceramic (in some embodiments, preferably at least 75, 80, 85, 90, 91, 92, 93, 94, 95, 96, 97, 98, 99, 99.5, or even 100 percent by volume) crystalline ceramic.

Abrasive particles according to the present invention can be screened and graded using techniques well known in the art, including the use of industry recognized grading standards such as ANSI (American National Standard Institute), FEPA (Federation Europeenne des Fabricants de Products Abrasifs), and JIS (Japanese Industrial Standard). Abrasive particles according to the present invention may be used in a wide range of particle sizes, typically ranging in size from about 0.1 to about 5000 micrometers, more typically from about 1 to about 2000 micrometers; desirably from about 5 to about 1500 micrometers, more desirably from about 100 to about 1500 micrometers.

ANSI grade designations include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. Preferred ANSI grades comprising abrasive particles according to the present invention are ANSI 8–220. FEPA grade designations include P8, P12, P16, P24, P36, P40, P50, P60, P80, P100, P120, P150, P180, P220, P320, P400, P500, P600, P800, P1000, and P1200. Preferred FEPA grades comprising abrasive particles according to the present invention are P12–P220. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000. Preferred JIS grades comprising abrasive particles according to the present invention are JIS8–220.

After crushing and screening, there will typically be a multitude of different abrasive particle size distributions or grades. These multitudes of grades may not match a manufacturer's or supplier's needs at that particular time. To minimize inventory, it is possible to recycle the off demand grades back into melt to form amorphous material. This recycling may occur after the crushing step, where the particles are in large chunks or smaller pieces (sometimes referred to as "fines") that have not been screened to a particular distribution.

In another aspect, the present invention provides a method for making abrasive particles, the method comprising heat-treating amorphous (e.g., glass) comprising particles such that at least a portion of the amorphous material converts to a glass-ceramic to provide abrasive particles comprising the glass-ceramic. The present invention also provides a method for making abrasive particles comprising a glass-ceramic, the method comprising heat-treating amorphous material such that at least a portion of the amorphous material converts to a glass-ceramic, and crushing the resulting heat-treated material to provide the abrasive particles. When crushed, glass tends to provide sharper particles than crushing significantly crystallized glass-ceramics or crystalline material.

In another aspect, the present invention provides agglomerate abrasive grains each comprise a plurality of abrasive particles according to the present invention bonded together via a binder. In another aspect, the present invention provides an abrasive article (e.g., coated abrasive articles, bonded abrasive articles (including vitrified, resinoid, and metal bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) according to the present invention. Methods of making such abrasive articles and using abrasive articles are well known to those skilled in the art. Furthermore, abrasive particles according to the present invention can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. The backing can be any suitable material, including cloth, polymeric film, fibre, nonwoven webs, paper, combinations thereof, and treated versions thereof. The binder can be any suitable binder, including an inorganic or organic binder (including thermally curable resins and radiation curable resins). The abrasive particles can be present in one layer or in two layers of the coated abrasive article.

An example of a coated abrasive article according to the present invention is depicted in FIG. 1. Referring to this figure, coated abrasive article according to the present invention 1 has a backing (substrate) 2 and abrasive layer 3. Abrasive layer 3 includes abrasive particles according to the present invention 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3–50% by volume bond material, about 30–90% by volume abrasive particles (or abrasive particle blends), up to 50% by volume additives (including grinding aids), and up to 70% by volume pores, based on the total volume of the bonded abrasive article.

Figure 2:
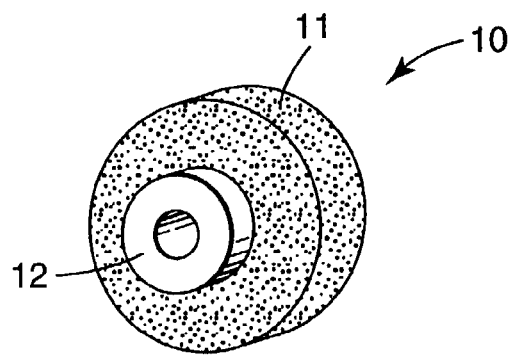
FIG. 2 is a perspective view of a bonded abrasive article including abrasive particles according to the present invention.

A preferred form is a grinding wheel. Referring to FIG. 2, grinding wheel according to the present invention 10 is depicted, which includes abrasive particles according to the present invention 11, molded in a wheel and mounted on hub 12.

Figure 3:
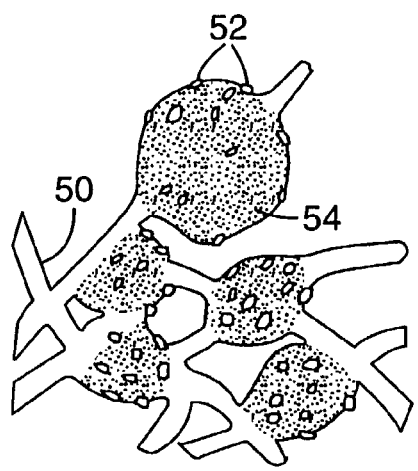
FIG. 3 is an enlarged schematic view of a nonwoven abrasive article including abrasive particles according to the present invention.

Nonwoven abrasive articles typically include an open porous lofty polymer filament structure having abrasive particles according to the present invention distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive article according to the present invention is provided. Such a nonwoven abrasive article according to the present invention comprises fibrous mat 50 as a substrate, onto which abrasive particles according to the present invention 52 are adhered by binder 54.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.), the disclosure of which is incorporated herein by reference). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.), the disclosures of which are incorporated herein by reference.

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles according to the present invention may be in the shape of a wheel (including cut off wheels), honing stone, mounted pointed or other conventional bonded abrasive shape. A preferred vitrified bonded abrasive article according to the present invention is a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

Preferred vitrified bonding materials may include those comprising silica, alumina (desirably, at least 10 percent by weight alumina), and boria (desirably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect. The preferred grinding aid is cryolite; the most preferred grinding aid is potassium tetrafluoroborate.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50–300 $g/m^2$ (desirably, about 80–160 $g/m^2$). In vitrified bonded abrasive articles grinding aid is typically impregnated into the pores of the article.

The abrasive articles can contain 100% abrasive particles according to the present invention, or blends of such abrasive particles with other abrasive particles and/or diluent particles. However, at least about 2% by weight, desirably at least about 5% by weight, and more desirably about 30–100% by weight, of the abrasive particles in the abrasive articles should be abrasive particles according to the present invention. In some instances, the abrasive particles according the present invention may be blended with another abrasive particles and/or diluent particles at a ratio between 5 to 75% by weight, about 25 to 75% by weight about 40 to 60% by weight, or about 50% to 50% by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol-gel abrasive particles include those described U.S. Pat. No. 4,314,827 (Leitheiser et al.), U.S. Pat. No. 4,518, 397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No.5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. No. 5,551,963 (Larmie), the disclosures of which are incorporated herein by reference. Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen), the disclosures of which are incorporated herein by reference. Additional details concerning fused abrasive particles, can be found, for example, in U.S.

Pat. No. 1,161,620 (Coulter), U.S. Pat. No. 1,192,709 (Tone), U.S. Pat. No. 1,247,337 (Saunders et al.), U.S. Pat. No. 1,268,533 (Allen), and U.S. Pat. No. 2,424,645 (Baumann et al.), U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), U.S. Pat. No. 5,023,212 (Dubots et al.), U.S. Pat. No. 5,143,522 (Gibson et al.), and U.S. Pat. No. 5,336,280 (Dubots et al.), and applications having U.S. Ser. Nos. 09/495,978, 09/496,422, 09/496,638, and 09/496,713, each filed on Feb. 2, 2000, and, 09/618,876, 09/618,879, 09/619,106, 09/619,191, 09/619,192, 09/619,215, 09/619,289, 09/619,563, 09/619,729, 09/619,744, and 09/620,262, each filed on Jul. 19, 2000, and 09/772,730, filed Jan. 30, 2001, the disclosures of which are incorporated herein by reference. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles according to the present invention, with the smaller sized particles being another abrasive particle type. Conversely, for example, the smaller sized abrasive particles may be abrasive particles according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates. Abrasive particles according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), and applications having U.S. Ser. Nos. 09/688,444 and 09/688,484, filed Oct. 16, 2000, the disclosures of which are incorporated herein by reference.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles according to the present invention, and the second (outermost) layer comprises abrasive particles according to the present invention. Likewise in a bonded abrasive, there may be two distinct sections of the grinding wheel. The outermost section may comprise abrasive particles according to the present invention, whereas the innermost section does not. Alternatively, abrasive particles according to the present invention may be uniformly distributed throughout the bonded abrasive article.

Further details regarding coated abrasive articles can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christianson), the disclosures of which are incorporated herein by reference. Further details regarding bonded abrasive articles can be found, for example, in U.S. Pat. No. 4,543,107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,037,453 (Narayanan et al.), U.S. Pat. No. 5,110,332 (Narayanan et al.), and U.S. Pat. No. 5,863,308 (Qi et al.) the disclosures of which are incorporated herein by reference. Further details regarding vitreous bonded abrasives can be found, for example, in U.S. Pat. No. 4,543,107 (Rue), U.S. Pat. No. 4,898,597 (Hay et al.), U.S. Pat. No. 4,997,461 (Markhoff-Matheny et al.), U.S. Pat. No. 5,094,672 (Giles Jr. et al.), U.S. Pat. No. 5,118,326 (Sheldon et al.), U.S. Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi), the disclosures of which are incorporated herein by reference. Further details regarding nonwoven abrasive articles can be found, for example, in U.S. Pat. No. 2,958,593 (Hoover et al.), the disclosure of which is incorporated herein by reference.

The present invention provides a method of abrading a surface, the method comprising contacting at least one abrasive particle according to the present invention, with a surface of a workpiece; and moving at least of one the abrasive particle or the contacted surface to abrade at least a portion of said surface with the abrasive particle. Methods for abrading with abrasive particles according to the present invention range of snagging (i.e., high pressure high stock removal) to polishing (e.g., polishing medical implants with coated abrasive belts), wherein the latter is typically done with finer grades (e.g., less ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles according to the present invention may be used to abrade workpieces such as aluminum metal, carbon steels, mild steels, tool steels, stainless steel, hardened steel, titanium, glass, ceramics, wood, wood like materials, paint, painted surfaces, organic coated surfaces and the like. The applied force during abrading typically ranges from about 1 to about 100 kilograms.

Other examples of uses of embodiments of glass-ceramics according to the present invention include as solid electrolytes in such applications as solid state batteries, solid oxide fuel cells and other electrochemical devices; as hosts for radioactive wastes and surplus actinides; as oxidation catalysts; as oxygen monitoring sensors; as hosts for fluorescence centers; durable IR transmitting window materials; and armor. For example, pyrochlore type of rare earth zirconium oxides ($Re_2Zr_2O_7$) are known to be useful phases for the above-mentioned radioactive wastes surplus actinides, oxidation catalysts, oxygen monitoring sensors, and fluorescence centers applications. Further, for example, Ce-containing mixed oxides are known as oxidation catalysts. Although not wanting to be bound by theory, it is believed that the redox properties and the relatively high oxygen storage capacity of the Ce-containing mixed oxides aid in oxidation catalysts. With regard to durable IR transmitting window materials applications uses include those involving moisture, impact by solid and liquid particles, high temperatures, and rapid heating rates.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated. Unless otherwise stated, all examples contained no significant amount of $SiO_2$, $B_2O_3$, $P_2O_5$, $GeO_2$, $TeO_2$, $As_2O_3$, and $V_2O_5$.

EXAMPLES

Examples 1–20

A 250-ml polyethylene bottle (7.3-cm diameter) was charged with a 50-gram mixture of various powders (as shown below in Table 1, with sources of the raw materials listed in Table 2), 75 grams of isopropyl alcohol, and 200 grams of alumina milling media (cylindrical shape, both height and diameter of 0.635 cm; 99.9% alumina; obtained from Coors, Golden, Colo.). The contents of the polyethylene bottle were milled for 16 hours at 60 revolutions per minute (rpm). After the milling, the milling media were removed and the slurry was poured onto a warm (approximately 75° C.) glass ("PYREX") pan and dried. The dried mixture was screened through a 70-mesh screen (212-micrometer opening size) with the aid of a paint brush.

After grinding and screening, the mixture of milled feed particles was fed slowly (0.5 gram/minute) into a hydrogen/oxygen torch flame to melt the particles. The torch used to melt the particles, thereby generating molten droplets, was a Bethlehem bench burner PM2D Model B obtained from Bethlehem Apparatus Co., Hellertown, Pa. Hydrogen and oxygen flow rates for the torch were as follows. For the inner ring, the hydrogen flow rate was 8 standard liters per minute (SLPM) and the oxygen flow rate was 3.5 SLPM. For the outer ring, the hydrogen flow rate was 23 SLPM and the oxygen flow rate was 12 SLPM. The dried and sized particles were fed slowly (0.5 gram/minute) into the torch flame which melted the particles and carried them into a 19-liter (5-gallon) cylindrical container (30 cm diameter by 34 cm height) of continuously circulating, turbulent water to rapidly quench the molten droplets. The angle at which the flame hit the water was approximately 45°, and the flame length, burner to water surface, was approximately 18 centimeters (cm). The resulting molten and rapidly quenched particles were collected and dried at 110° C. The particles were spherical in shape and varied in size from a few micrometers (i.e., microns) up to 250 micrometers.

A percent amorphous yield was calculated from the resulting flame-formed beads using a –100+120 mesh size fraction (i.e., the fraction collected between 150-micrometer opening size and 125-micrometeropening size screens). The measurements were done in the following manner. A single layer of beads was spread out upon a glass slide. The beads were observed using an optical microscope. Using the crosshairs in the optical microscope eyepiece as a guide, beads that lay along a straight line were counted either amorphous or crystalline depending on their optical clarity. A total of 500 beads were counted and a percent amorphous yield was determined by the amount of amorphous beads divided by total beads counted.

Materials prepared in Examples 12 through 20 were amorphous as determined by visual inspection, but the quantitative analysis according to the above procedure was not performed. Amorphous material is typically transparent due to the lack of light scattering centers such as crystal boundaries, while the crystalline particles show a crystalline structure and are opaque due to light scattering effects.

The phase composition (glassy/amorphous/crystalline) was determined through Differential Thermal Analysis (DTA) as described below. The material was classified as amorphous if the corresponding DTA trace of the material contained an exothermic crystallization event ($T_x$). If the same trace also contained an endothermic event ($T_g$) at a temperature lower than $T_x$ it was considered to consist of a glass phase. If the DTA trace of the material contained no such events, it was considered to contain crystalline phases.

Differential thermal analysis (DTA) was conducted using the following method. DTA runs were made (using an instrument obtained from Netzsch Instruments, Selb, Germany under the trade designation "NETZSCH STA 409 DTA/TGA") using a –140+170 mesh size fraction (i.e., the fraction collected between 105-micrometer opening size and 90-micrometer opening size screens). The amount of each screened sample placed in a 100-microliter $AL_2O_3$ sample holder was about 400 milligrams. Each sample was heated in static air at a rate of 10° C./minute from room temperature (about 25° C.) to 1100° C.

Figure 4:
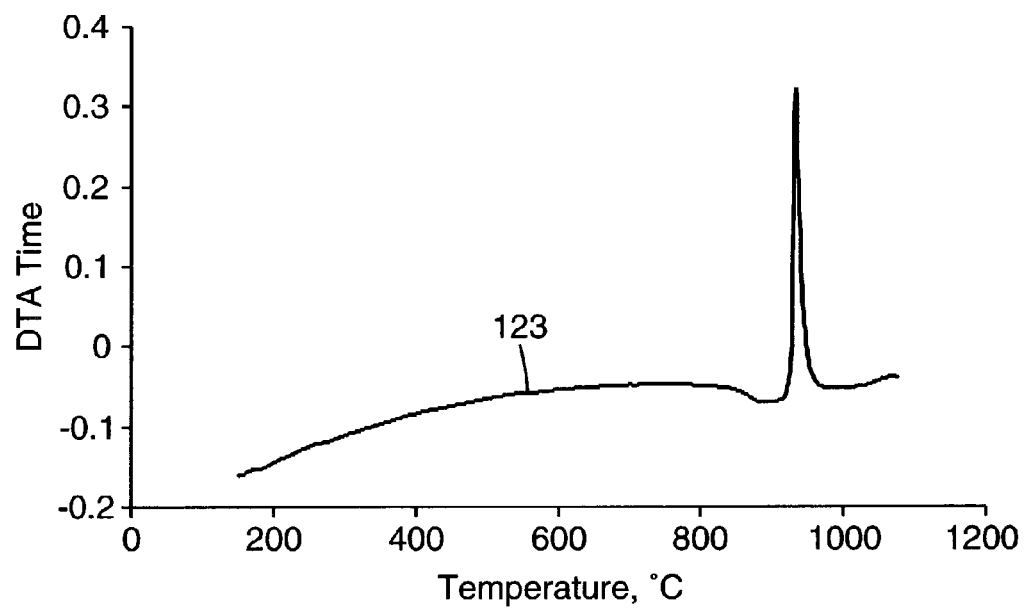
FIG. 4 is a DTA of the material prepared in Example 1.

Referring to FIG. 4, line 123 is the plotted DTA data for the Example 1 material. Referring to FIG. 4, line 123, the material exhibited an endothermic event at temperature around 872° C., as evidenced by the downward curve of line 123. It is believed this event was due to the glass transition ($T_g$) of the glass material. At about 958° C., an exothermic event was observed as evidenced by the sharp peak in line 123. It is believed that this event was due to the crystallization ($T_x$) of the material. These $T_g$ and $T_x$ values for other examples, except for Examples 15–20, are reported in Table 1 below.

TABLE 1

| Example | Batch amounts, g | Weight percent of components | Final weight percent alumina % | Percent final alumina from Al metal | Percent amorphous yield | Glass transition/ crystallization temperatures |
|---|---|---|---|---|---|---|
| Ex. 1 ALZ | $Al_2O_3$: 19.3 $La_2O_3$: 21.3 | $Al_2O_3$: 38.5 $La_2O_3$: 42.5 | | | | 882° C. |
| | $ZrO_2$: 9.5 | $ZrO_2$: 19.0 | 38.5 | 0 | 98 | 932° C. |

TABLE 1-continued

| Example | Batch amounts, g | Weight percent of components | Final weight percent alumina % | Percent final alumina from Al metal | Percent amorphous yield | Glass transition/ crystallization temperatures |
|---|---|---|---|---|---|---|
| Ex. 2 AYZ | Al₂O₃: 16.7 Al: 8.8 Y₂O₃: 16 ZrO₂: 8.6 | Al₂O₃: 33.3 Al: 17.6 Y₂O₃: 31.9 ZrO₂: 17.2 | 57.5 | 50 | 89 | 900° C. 935° C. |
| Ex. 3 AGdZ | Al₂O₃: 20.5 Gd₂O₃: 20.5 ZrO₂: 9 | Al₂O₃: 41.0 Gd₂O₃: 41.0 ZrO₂: 18 | 41.0 | 0 | 94 | 872° C. |
| Ex. 4 AY | Al₂O₃: 19.5 Al: 10.3 Y₂O₃: 20.1 | Al₂O₃: 39.1 Al: 20.7 Y₂O₃: 40.3 | 66 | 50 | 93 | 894° C. 943° C. |
| Ex. 5 AYMg | Al₂O₃: 18.8 Al: 10.0 MgO: 0.0 Mg: 1.8 Y₂O₃: 19.4 | Al₂O₃: 37.7 Al: 19.9 MgO: 0.0 Mg: 3.6 Y₂O₃: 38.8 | 62.7 | 50 | 93 | 848° C. 996° C. |
| Ex. 6 AYMg | Al₂O₃: 18.1 Al: 9.6 MgO: 0.0 Mg: 3.7 Y₂O₃: 18.6 | Al₂O₃: 36.2 Al: 19.2 MgO: 0.0 Mg: 7.3 Y₂O₃: 37.3 | 59.4 | 50 | 81 | 832° C. 884° C. |
| Ex. 7 AZ | Al₂O₃: 17.0 Al: 9.0 ZrO₂: 24.1 | Al₂O₃: 33.9 Al: 18.0 ZrO₂: 48.1 | 58.5 | 50 | 63 | none 959° C. |
| Ex. 8 AZ-Ti | Al₂O₃: 15.5 Al: 8.2 ZrO₂: 22.0 TiO₂: 4.3 | Al₂O₃: 31.0 Al: 16.4 ZrO₂: 44.0 TiO₂: 8.6 | 54 | 50 | 79 | none 936° C. |
| Ex. 9 AZ-La | Al₂O₃: 12.3 Al: 6.5 ZrO₂: 17.4 La₂O₃: 13.8 | Al₂O₃: 24.5 Al: 13.0 ZrO₂: 34.8 La₂O₃: 27.7 | 44 | 50 | 94 | 889° C. 918° C. |
| Ex. 10 AZ-La | Al₂O₃: 9.1 Al: 4.8 ZrO₂: 13.0 La₂O₃: 23.1 | Al₂O₃: 18.2 Al: 9.6 ZrO₂: 25.9 La₂O₃: 46.2 | 34 | 50 | 96 | 868° C. 907° C. |
| Ex. 11 AZ-La | Al₂O₃: 7.5 Al: 4.0 ZrO₂: 17.0 La₂O₃: 21.4 | Al₂O₃: 15.0 Al: 8.0 ZrO₂: 34.0 La₂O₃: 42.8 | 28 | 50 | 93 | 870° C. 898° C. |
| Ex. 12 ACZ | Al₂O₃: 20.3 ZrO₂: 9.0 La₂O₃: 20.7 | Al₂O₃: 40.6 ZrO₂: 18.0 La₂O₃: 41.4 | 40.6 | 0 | NA | 838° C. 908° C. |
| Ex. 13 ALZ/ CaF₂ | Al₂O₃: 15.6 La₂O₃: 17 ZrO₂: 7.4 CaF₂: 10 | Al₂O₃: 31.2 La₂O₃: 34 ZrO₂: 14.8 CaF₂: 20 | 37.04 | 0 | NA | none 676° C. |
| Ex. 14 ALZ/ P₂O₅ | Al₂O₃: 17.87 La₂O₃: 21.08 ZrO₂: 8.55 P₂O₅: 2.5 | Al₂O₃: 35.73 La₂O₃: 42.17 ZrO₂: 17.1 P₂O₅: 5 | 35.73 | 0 | NA | 857° C. 932° C. |
| Ex. 15 ALZ/ Nb₂O₅ | Al₂O₃: 17.87 La₂O₃: 21.08 ZrO₂: 8.55 Nb₂O₅: 2.5 | Al₂O₃: 35.73 La₂O₃: 42.17 ZrO₂: 17.1 Nb₂O₅: 5 | 35.73 | 0 | NA | NA |
| Ex. 16 ALZ/ Ta₂O₅ | Al₂O₃: 17.87 La₂O₃: 21.08 ZrO₂: 8.55 Ta₂O₅: 2.5 | Al₂O₃: 35.73 La₂O₃: 42.17 ZrO₂: 17.1 Ta₂O₅: 5 | 35.73 | 0 | NA | NA |
| Ex. 17 ALZ/ SrO | Al₂O₃: 17.87 La₂O₃: 21.08 ZrO₂: 8.55 SrO: 2.5 | Al₂O₃: 35.73 La₂O₃: 42.17 ZrO₂: 17.1 SrO: 5 | 35.73 | 0 | NA | NA |
| Ex. 18 ALZ/ Mn₂O₃ | Al₂O₃: 17.87 La₂O₃: 21.08 ZrO₂: 8.55 Mn₂O₃: 2.5 | Al₂O₃: 35.73 La₂O₃: 42.17 ZrO₂: 17.1 Mn₂O₃: 5 | 35.73 | 0 | NA | NA |

TABLE 1-continued

| Example | Batch amounts, g | Weight percent of components | Final weight percent alumina % | Percent final alumina from Al metal | Percent amorphous yield | Glass transition/ crystallization temperatures |
|---|---|---|---|---|---|---|
| Ex. 19 ALZ/ Fe₂O₃ | Al₂O₃: 18.25 La₂O₃: 21.52 ZrO₂: 8.73 Fe₂O₃: 1.5 | Al₂O₃: 36.5 La₂O₃: 43.04 ZrO₂: 17.46 Fe₂O₃: 3 | 36.5 | 0 | NA | NA |
| Ex. 20 ALZ/ Cr₂O₃ | Al₂O₃: 18.25 La₂O₃: 21.52 ZrO₂: 8.73 Cr₂O₃: 1.5 | Al₂O₃: 36.5 La₂O₃: 43.04 ZrO₂: 17.46 Cr₂O₃: 3 | 36.5 | 0 | NA | NA |

TABLE 2

| Raw Material | Source |
|---|---|
| Alumina particles (Al₂O₃) | Obtained from Alcoa Industrial Chemicals, Bauxite, AR, under the trade designation "A16SG" |
| Aluminum particles (Al) | Obtained from Alfa Aesar, Ward Hill, MA |
| Cerium oxide particles | Obtained from Rhone-Poulenc, France |
| Gadolinium oxide particles | Obtained from Molycorp Inc., Mountain Pass, CA |
| Lanthanum oxide particles (La₂O₃) | Obtained from Molycorp Inc., Mountain Pass, CA and calcined at 700° C. for 6 hours prior to batch mixing. |
| Magnesium particles (Mg) | Obtained from Alfa Aesar, Ward Hill, MA |
| Magnesium oxide particles (MgO) | Obtained from BDH Chemicals Ltd, Poole, England |
| Titanium oxide particles (TiO₂) | Obtained from Kemira, Savannah, GA, under the trade designation "Unitane 0-110" |
| Yttrium oxide particles (Y₂O₃) | Obtained from H.C. Stark Newton, MA |
| Zirconium oxide particles (ZrO₂) | Obtained from Zirconia Sales, Inc. of Marietta, GA under the trade designation "DK-2" |
| Calcium fluoride particles (CaF₂) | Obtained from Aldrich, Milwaukee, WI |
| Phosphorous oxide particles (P₂O₅) | Obtained from Aldrich, Milwaukee, WI |
| Niobium oxide particles (Nb₂O₅) | Obtained from Aldrich, Milwaukee, WI |
| Tantalum oxide particles (Ta₂O₅) | Obtained from Aldrich, Milwaukee, WI |
| Strontium oxide particles (SrO) | Obtained from Aldrich, Milwaukee, WI |
| Manganese oxide particles (Mn₂O₃) | Obtained from Aldrich, Milwaukee, WI |
| Iron oxide particles (Fe₂O₃) | Obtained from Aldrich, Milwaukee, WI |
| Chromium oxide particles (Cr₂O₃) | Obtained from Aldrich, Milwaukee, WI |

Example 21

About 25 grams of the beads from Example 1 were placed in a graphite die and hot-pressed using uniaxial pressing apparatus (obtained under the trade designation "HP-50", Thermal Technology Inc., Brea, Calif.). The hot-pressing was carried out in an argon atmosphere and 13.8 megapascals (MPa) (2000 pounds per square inch or 2 ksi) pressure. The hot-pressing furnace was ramped up to 970° C., at 25° C./minute. The result was a disc, 3.4 cm in diameter and 0.6 cm thick, of transparent bulk material. A DTA trace was conducted as described in Example 1–20. The trace exhibited an endothermic event at temperature around 885° C., as evidenced by the downward change in the curve of the trace. It is believed this event was due to the glass transition ($T_g$) of the glass material. The same material exhibited an exothermic event at a temperature around 928° C., as evidenced by the sharp peak in the trace. It is believed that this event was due to the crystallization ($T_x$) of the material.

Example 22

A 250-ml polyethylene bottle (7.3-cm diameter) was charged with the following 50-gram mixture: 19.3 grams of alumina particles (obtained from Alcoa Industrial Chemicals, Bauxite, Ark., under the trade designation "A16SG"), 9.5 grams of zirconium oxide particles (obtained from Zirconia Sales, Inc. of Marietta, Ga. under the trade designation "DK-2"), and 21.2 grams of lanthanum oxide particles (obtained from Molycorp Inc., Mountain Pass, Calif.), 75 grams of isopropyl alcohol, and 200 grams of alumina milling media (cylindrical in shape, both height and diameter of 0.635 cm; 99.9% alumina; obtained from Coors, Golden, Colo.). The contents of the polyethylene bottle were milled for 16 hours at 60 revolutions per minute (rpm). The ratio of alumina to zirconia in the starting material was 2:1, and the alumina and zirconia collectively made up about 58 weight percent (wt-%). After the milling, the milling media were removed and the slurry was poured onto a warm (approximately 75° C.) glass ("PYREX") pan and dried. The dried mixture was screened through a 70-mesh screen (212-micrometer opening size) with the aid of a paint brush.

After grinding and screening, the mixture of milled feed particles was fed slowly (0.5 gram/minute) into a hydrogen/oxygen torch flame to melt the particles. The torch used to melt the particles, thereby generating molten droplets, was a Bethlehem bench burner PM2D Model B obtained from Bethlehem Apparatus Co., Hellertown, Pa. Hydrogen and oxygen flow rates for the torch were as follows. For the inner ring, the hydrogen flow rate was 8 standard liters per minute (SLPM) and the oxygen flow rate was 3.5 SLPM. For the outer ring, the hydrogen flow rate was 23 SLPM and the oxygen flow rate was 12 SLPM. The dried and sized particles were fed slowly (0.5 gram/minute) into the torch flame, which melted the particles and carried them on to an inclined stainless steel surface (approximately 51 centimeters (20 inches) wide with a slope angle of 45 degrees) with cold water running over (approximately 8 liters/minute) the surface to rapidly quench the molten droplets. The resulting molten and quenched beads were collected and dried at 110° C. The particles were spherical in shape and varied in size from a few micrometers (i.e., microns) up to 250 micrometers.

Subsequently, the flame-formed beads having diameters less than 125 micrometers were then passed through a plasma gun and deposited on stainless steel substrates as follows.

Four 304 stainless steel substrates (76.2 millimeter (mm)× 25.4 mm×3.175 mm dimensions), and two 1080 carbon steel substrates (76.2 mm×25.4 mm×1.15 mm) were prepared in the following manner. The sides to be coated were sandblasted, washed in an ultrasonic bath, and then wiped clean with isopropyl alcohol. Four stainless steel and one 1080 carbon steel substrates were placed approximately 10 centimeters (cm) in front of the nozzle of a plasma gun (obtained under the trade designation "Praxair SG-100 Plasma Gun" from Praxair Surface Technologies, Concord, N.H.). The second 1080 carbon steel was placed 18 cm in front of the nozzle of the plasma gun. The coatings made on the second 1080 carbon steel samples at a distance of 18 cm in front of the nozzle of the plasma gun were not further characterized.

The plasma unit had a power rating of 40 kW. The plasma gas was argon (50 pounds per square inch (psi), 0.3 megapascal (MPa)) with helium as the auxiliary gas (150 psi, 1 MPa). The beads were passed through the plasma gun by using argon as the carrier gas (50 psi, 0.3 MPa) using a Praxair Model 1270 computerized powder feeder (obtained from Praxair Surface Technologies, Concord, N.H.). During deposition, a potential of about 40 volts and a current of about 900 amperes was applied and the plasma gun was panned left to right, up and down, to evenly coat the substrates. When the desired thickness was achieved, the plasma spray was shut off and the samples were recovered. The 1080 carbon steel substrate was flexed, thus separating the coating from the substrate resulting in a free-standing bulk material. The deposited material had a z dimension (thickness) of about 1350 micrometers, as determined using optical microscopy.

The phase composition (glassy/amorphous/crystalline) was determined through Differential Thermal Analysis (DTA) as described below. The material was classified as amorphous if the corresponding DTA trace of the material contained an exothermic crystallization event ($T_x$). If the same trace also contained an endothermic event ($T_g$) at a temperature lower than $T_x$ it was considered to consist of a glass phase. If the DTA trace of the material contained no such events, it was considered to contain crystalline phases.

Differential thermal analysis (DTA) was conducted using the following method. DTA runs were made (using an instrument obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). The amount of each screened sample placed in a 100-microliter $Al_2O_3$ sample holder was about 400 milligrams. Each sample was heated in static air at a rate of 10° C./minute from room temperature (about 25° C.) to 1100° C.

The coated material (on 304 stainless steel substrates) exhibited an endothermic event at a temperature around 880° C., as evidenced by a downward change in the curve of the trace. It is believed this event was due to the glass transition ($T_g$) of the glass material. The same material exhibited an exothermic event at a temperature around 931° C., as evidenced by a sharp peak in the trace. It is believed that this event was due to the crystallization ($T_x$) of the material. Thus, the coated material (on 304 stainless steel substrates) and the free-standing bulk material were glassy as determined by a DTA trace.

A portion of the glassy free-standing bulk material was then heat-treated at 1300° C. for 48 hours. Powder X-ray diffraction, XRD, (using an X-ray diffractometer (obtained under the trade designation "PHILLIPS XRG 3100" from Phillips, Mahwah, N.J.) with copper K α1 radiation of 1.54050 Angstrom) was used to determine the phases present. The phases were determined by comparing the peaks present in the XRD trace of the crystallized material to XRD patterns of crystalline phases provided in JCPDS (Joint Committee on Powder Diffraction Standards) databases, published by International Center for Diffraction Data. The resulting crystalline material included $LaAlO_3$, $ZrO_2$ (cubic, tetragonal), $LaAl_{11}O_{18}$, and transitional $Al_2O_3$ phases.

Figure 5:
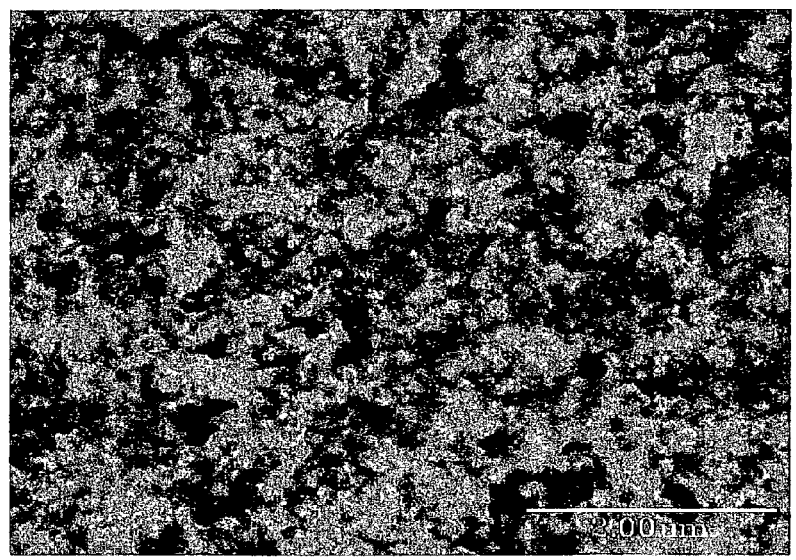
FIG. 5 is a Scanning Electron Micrograph (SEM) of fractured surface of material prepared in Example 22.

Another portion of the glassy free-standing bulk material was crystallized at 1300° C. for 1 hour in an electrically heated furnace (obtained from CM Furnaces, Bloomfield, N.J. under the trade designation "Rapid Temp Furnace"). The crystallized coating was crushed with a hammer into particles of −30+35 mesh size (i.e., the fraction collected between 600-micrometer opening size and 500-micrometer opening size screens). The particles were cleaned of debris by washing in a sonic bath (obtained from Cole-Parmer, Vernon Hills, Ill., under the trade designation "8891") for 15 minutes, dried at 100° C., and several were mounted on a metal cylinder (3 cm in diameter and 2 cm high) using carbon tape. The mounted sample was sputter coated with a thin layer of gold-palladium and viewed using a JEOL scanning electron microscopy (SEM) (Model JSM 840A). The fractured surface was rough and no crystals coarser than 200 nanometers (nm) were observed (FIG. 5) in the SEM.

Example 23

Feed particles were made as described in Example 22 using the following 50-gram mixture: 21.5 grams of alumina particles (obtained from Alcoa Industrial Chemicals, Bauxite, Ark. under the trade designation "A16SG"), 9 grams of zirconium oxide particles (obtained from Zirconia Sales, Inc. of Marietta, Ga. under the trade designation "DK-2"), and 19.5 grams of cerium oxide particles (obtained from Rhone-Poulence, France). The ratio of alumina to zirconia in the starting material was 2.4:1 and the alumina and zirconia collectively made up about 61 weight percent. Feed particles were flame-formed into beads (of a size that varied from a few micrometers up to 250 micrometers) as described in Example 22. Subsequently, the flame-formed beads having diameters between 180 micrometers and 250 micrometers were passed through a plasma gun and deposited on stainless and carbon steel substrates as described in Example 22.

The 1080 carbon steel substrates were flexed, thus separating the coating from the substrate resulting in a free-standing bulk material. The resulting bulk material had a z dimension (thickness) of about 700 micrometers, as determined using optical microscopy. The microstructure was also observed using optical microscopy. The material consisted of generally spherical and oblique crystalline particles, which were opaque, within a predominantly amorphous matrix, which was transparent. Amorphous material is typically transparent due to the lack of light scattering centers such as crystal boundaries, while the crystalline particles show a crystalline structure and are opaque due to light scattering effects. The crystalline phases, determined by powder XRD analysis as described in Example 22, consisted of $Zr_{0.4}Ce_{0.6}O_2$ (cubic) and transitional $Al_2O_3$.

A second deposition experiment was carried out using the flame-formed beads having diameters less than 125 micrometers. The resulting coating had a z dimension (thickness) of about 1100 micrometers, as determined using optical microscopy. The microstructure was also observed using optical microscopy. This material had similar features (i.e., consisted of generally spherical and oblique crystalline particles within a predominantly amorphous matrix) to those of the material formed from beads having diameters between 180 micrometers and 250 micrometers. The crystalline phases, determined by XRD analysis as described in Example 22, consisted of $Zr_{0.4}Ce_{0.6}O_2$ (cubic) and transitional $Al_2O_3$.

The average hardness of the as-sprayed material of this example was determined as follows. Sections of the material were mounted in mounting resin (obtained under the trade designation "TRANSOPTIC POWDER" from Buehler, Lake Bluff, Ill.). The resulting cylinder of resin was about 2.5 cm in diameter and about 1.9 cm high. The mounted section was prepared using conventional polishing techniques using a polisher (obtained from Buehler, Lake Bluff, Ill. under the trade designation "ECOMET 3"). The sample was polished for about 3 minutes with a diamond wheel, followed by 5 minutes of polishing with each of 45, 30, 15, 9, 3, and 1-micrometer slurries. The microhardness measurements were made using a conventional microhardness tester (obtained under the trade designation "MITUTOYO MVK-VL" from Mitutoyo Corporation, Tokyo, Japan) fitted with a Vickers indenter using a 100-gram indent load. The microhardness measurements were made according to the guidelines stated in ASTM Test Method E384 Test Methods for Microhardness of Materials (1991), the disclosure of which is incorporated herein by reference. The average microhardness (an average of 20 measurements) of the material of this example was 15 gigapascals (Gpa).

Example 24

Feed particles were made as described in Example 22 using the following 50-gram mixture: 27.9 grams of alumina particles (obtained from Alcoa Industrial Chemicals, Bauxite, Ark. under the trade designation "Al6SG"), 7.8 grams of zirconium oxide particles (obtained from Zirconia Sales, Inc. of Marietta, Ga. under the trade designation "DK-2"), and 14.3 grams of yttrium oxide particles (obtained from H. C. Stark Newton, Mass.). The ratio of alumina to zirconia of initial starting materials was 3.5:1 and the alumina and zirconia collectively made up about 72 weight percent. The feed particles were then screened through a 30-mesh screen (600-micrometer opening size) and heat-treated at 1400° C. for 2 hours in an electrically heated furnace (obtained from CM Furnaces, Bloomfield, N.J. under the trade designation "Rapid Temp Furnace"). The heat-treated particles were further screened to separate out particles with diameters between 125 micrometers and 180 micrometers, which were then passed through a plasma gun and deposited on stainless steel substrates as described in Example 22.

The 1080 carbon steel substrate was flexed, thus separating the coating from the substrate resulting in a free-standing bulk material. The resulting bulk material had a z dimension (thickness) of about 700 micrometers, as determined using optical microscopy. The microstructure was observed using optical microscopy. This material consisted of generally crystalline opaque particles (which retained their original shapes) within a predominantly transparent, amorphous matrix. The crystalline phases, determined by powder XRD analysis as described in Example 22, consisted of $Al_5Y_3O_{12}$ and $Y_{0.15}Zr_{0.85}O_{1.93}$.

Figure 6:
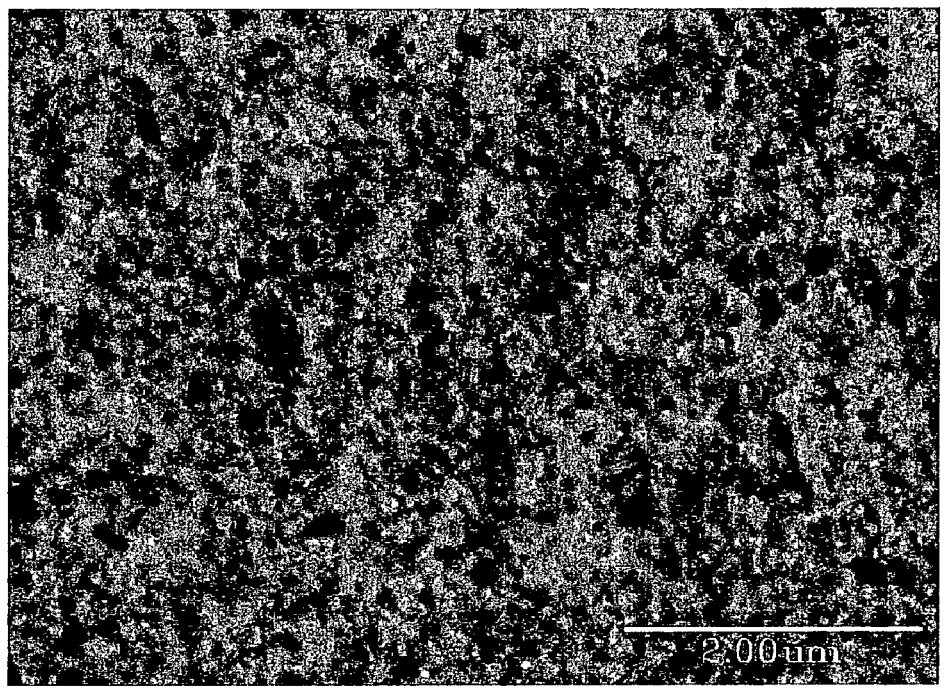
FIG. 6 is a Scanning Electron Micrograph (SEM) of fractured surface of material prepared in Example 24.

Another portion of the free-standing bulk material was crystallized at 1300° C. for 1 hour and the fractured surface was sputter coated with a thin layer of gold-palladium and viewed using a JEOL SEM (Model JSM 840A), as described above in Example 22. The fractured surface was rough and no crystals coarser than 200 nm were observed (FIG. 6).

A second deposition experiment was carried out using heat-treated particles having diameters less than 125 micrometers. The resulting coating was about 1500 micrometers thick (z dimension). The microstructure was observed using optical microscopy. This material had similar features (consisted of generally opaque, crystalline particles (which retained their original shapes) within a predominantly transparent, amorphous matrix) to the material formed from beads having diameters between 180 micrometers and 250 micrometers. The crystalline phases, determined by XRD analysis as described in Example 22, consisted of $Al_5Y_3O_{12}$ and $Y_{0.15}Zr_{0.85}O_{1.93}$.

Example 25

A thick coating consisting of various layers of the above three examples was plasma sprayed using feed particles produced in Examples 22–24. The first layer was coated as described in Example 23, the second as described in Example 22, and the third as described in Example 24.

The substrate was not sandblasted prior to coating so that it was removed easily by plying it apart by hand, resulting in a free-standing bulk material, approximately 75 millimeters (mm)×25 mm×7.5 mm. A cross-section, cutting through each layer, was sectioned from the material using a diamond saw. The sectioned piece was mounted in mounting resin (obtained under the trade designation "TRANSOPTIC POWDER" from Buehler, Lake Bluff, Ill.) such that the different layers were visible. The resulting cylinder of resin was about 2.5 cm in diameter and about 1.9 cm tall (i.e., high). The mounted section was prepared using conventional polishing techniques using a polisher (obtained from Buehler, Lake Bluff, Ill. under the trade designation "ECOMET 3"). The sample was polished for about 3 minutes with a diamond wheel, followed by 5 minutes of polishing with each of 45, 30, 15, 9, 3, and 1-micrometer slurries.

The first layer had a z dimension (thickness) of approximately 2.5 mm, as determined using optical microscopy. The microstructure was observed using optical microscopy. This material had similar features to those of the material of Example 23 (i.e., consisted of generally spherical and opaque crystalline particles within a predominantly transparent, amorphous matrix). The second layer had a z dimension (thickness) of approximately 2 mm, as determined using optical microscopy. The microstructure was also observed using optical microscopy. This material had similar features to those of the material of Example 22 (i.e., was transparent suggesting it was amorphous). The third layer had a z dimension (thickness) of approximately 3 mm, as determined using optical microscopy. The microstructure was also observed using optical microscopy. This material had similar features to those of the material of Example 24 (i.e., it consisted of generally opaque crystalline particles (which retained their original shapes) within a predominantly transparent, amorphous matrix).

Example 26

The consolidated material produced in Example 21 was crushed by using a "Chipmunk" jaw crusher (Type VD, manufactured by BICO Inc., Burbank, Calif.) into abrasive particles and graded to retain the −30+35 mesh fraction (i.e., the fraction collected between 600-micrometer opening size and 500-micrometer opening size screens) and the −35+40 mesh fraction (i.e., the fraction collected between 500-micrometer opening size and 425-micrometer opening size screens). The two mesh fractions were combined to provide a 50/50 blend.

An average aspect ratio of the particles was measured using a Zeiss Image Analysis System (Zeiss Stemi SV11 microscope and software loaded on a computer) and a video camera (3 CCD camera, model 330, (obtained from Dage MTI Inc., Michigan City, Ind.)). The resulting aspect ratio was 1.86.

Density of the particles was measured using a gas pychometer AccuPyc 1330, Micromeritics, Norcross, Ga. The resulting density was 4.65 grams per cubic centimeter (g/cc).

The crushed particles were heat-treated at 1300° C. for 45 minutes in an electrically heated furnace (obtained from CM Furnaces, Bloomfield, N.J. under the trade designation "Rapid Temp Furnace"). The resulting crystalline particles retained their original crushed shape. The density of the particle was found to be 5.24 grams per cubic centimeter (g/cc). The crystallized glass ceramic phases, determined by XRD analysis as described in Examples 1–20, were composed of $LaAlO_3$, cubic/tetragonal $ZrO_2$, $LaAl_{11}O_{18}$, $\alpha\text{-}Al_2O_3$, monoclinic $ZrO_2$ and minor amorphous phases.

Example 27–28

A 250-ml polyethylene bottle (7.3-cm diameter) was charged with 19.3 grams of alumina particles (obtained from Alcoa Industrial Chemicals, Bauxite, Ark., under the trade designation "Al6SG"), 9.5 grams of zirconium oxide particles (obtained from Zirconia Sales, Inc. of Marietta, Ga. under the trade designation "DK-2"), and 21.2 grams of lanthanum oxide particles (obtained from Molycorp Inc., Mountain Pass, Calif.), 75 grams of isopropyl alcohol, and 200 grams of alumina milling media (cylindrical shape, both height and diameter of 0.635 cm; 99.9% alumina; obtained from Coors, Golden, Colo.). The contents of the polyethylene bottle were milled for 16 hours at 60 revolutions per minute (rpm). After the milling, the milling media were removed and the slurry was poured onto a warm (approximately 75° C.) glass ("PYREX") pan, where it dried within 3 minutes. The dried mixture was screened through a 14-mesh screen (1400 micrometer opening size) with the aid of a paint brush and pre-sintered at 1400° C., in air, for two hours.

A hole (approximately 13 mm in diameter, about 8 cm deep) was bored at the end of a graphite rod (approximately 60 cm long, 15 mm in diameter). About 20 grams of pre-sintered particles were inserted into the hollow end. The hollow end of the graphite rod was inserted into the hot zone of a resistively heated furnace (obtained from Astro Industries, Santa Barbara, Calif.). The furnace was modified to convert it into a tube furnace with graphite tube with an inner diameter of approximately 18 mm. The hot zone was maintained at a temperature of 2000° C. and the furnace was tilted approximately 30° so that the melt would not spill out of the rod. The rod end was held in the hot zone for 10 minutes to ensure uniform melting. After the ten minutes, the rod was quickly removed from the furnace and tilted to pour the melt onto a quenching surface.

For Example 27, the quenching surface was two opposing stainless steel plates. The plates, 17.8 cm×5 cm×2.5 cm, were placed on their long edges parallel to each other with a gap of about 1 mm. The melt was poured into the gap where it rapidly solidified into a plate with a z dimension (thickness) of about 1 mm. The quenched melt was predominantly transparent and amorphous and exhibited a glass transition ($T_g$) of 885° C. and a crystallization temperature ($T_x$) of 930° C. as determine by a DTA trace obtained as described in Examples 1–20.

For Example 28, the quenching surface was two counter-rotating steel rollers. Rollers were 5 cm in diameter and driven by an electric motor at 80 rpm. The gap between the rollers was approximately 0.8 mm. The melt was poured into the gap where the rollers rapidly solidified into a plate with significant x and y dimensions and a z dimension (thickness) of 0.8 mm. The quenched melt was predominantly transparent and amorphous and exhibited a glass transition ($T_g$) of 885° C. and a crystallization temperature ($T_x$) of 930° C., as determine by a DTA trace obtained as described in Examples 1–20.

Example 29

The bulk amorphous/glass material produced in Example 21 was crushed by using a "Chipmunk" jaw crusher (Type VD, manufactured by BICO Inc., Burbank, Calif.) into abrasive particles and graded to retain the −30+35 mesh fraction (i.e., the fraction collected between 600-micrometer opening size and 500-micrometer opening size screens) and the −35+40 mesh fraction (i.e., the fraction collected between 500-micrometer opening size and 425-micrometer opening size screens). The two mesh fractions were combined to provide a 50/50 blend.

An aspect ratio measurement was taken using the method described in Example 26. The resulting aspect ratio was 1.83.

Density of the particles was taken using the method described in Example 26. The resulting density was 4.61 g/cc.

Examples 30–31

A hot-pressed disk was prepared as describe in Example 21 and was sectioned into 2 bars (approximately 2 cm×0.5 cm×0.5 cm) using a diamond saw (obtained from Buehler, Lake Bluff, Ill. under the trade designation "ISOMET 1000"). Both bars were annealed in an electrically heated furnace (obtained from CM Furnaces, Bloomfield, N.J. under the trade designation "Rapid Temp Furnace") at 800° C. for 2 hours. No crystallization occurred during the annealing process.

For Example 30, one bar was crushed with a hammer into particles of −30+35 mesh size (i.e., the fraction collected between 600-micrometer opening size and 500-micrometer opening size screens). The crushed particles were heat-treated at 1300° C. for 1 hour in an electrically heated furnace (obtained from CM Furnaces, Bloomfield, N.J. under the trade designation "Rapid Temp Furnace") to crystallize them. The particles were cleaned of debris by washing in a sonic bath (obtained from Cole-Parmer, Vernon Hills, Ill., under the trade designation "8891") for 15 minutes, dried at 100° C., and several were mounted on a metal cylinder (3 cm in diameter and 2 cm high) using carbon tape. The mounted sample was sputtered with a thin layer of gold-palladium and view using a JEOL SEM (Model JSM 840A).

Figure 7:
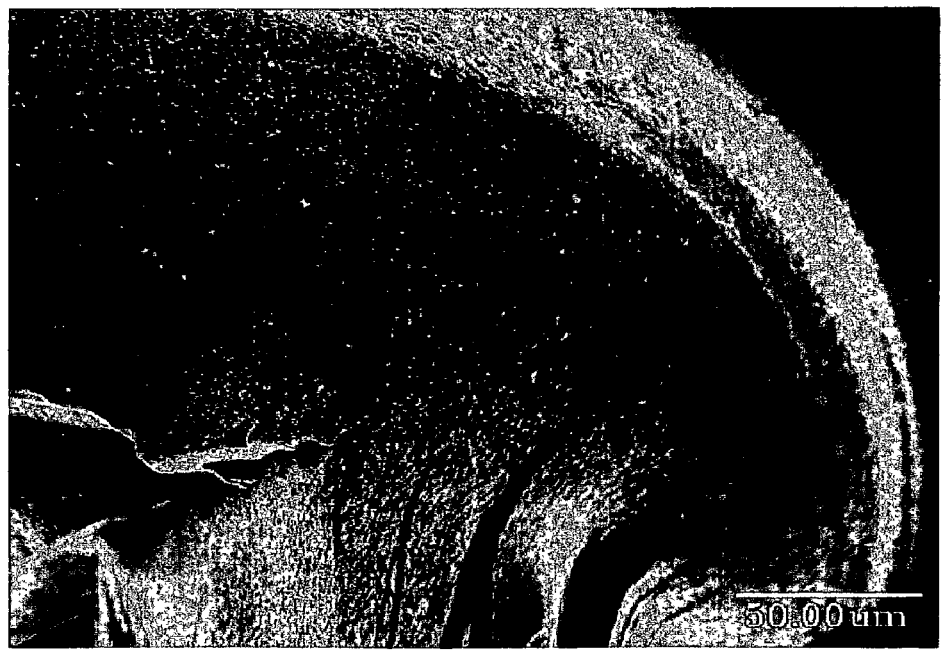
FIG. 7 is a Scanning Electron Micrograph (SEM) of fractured surface of material prepared in Example 30.
Figure 8:
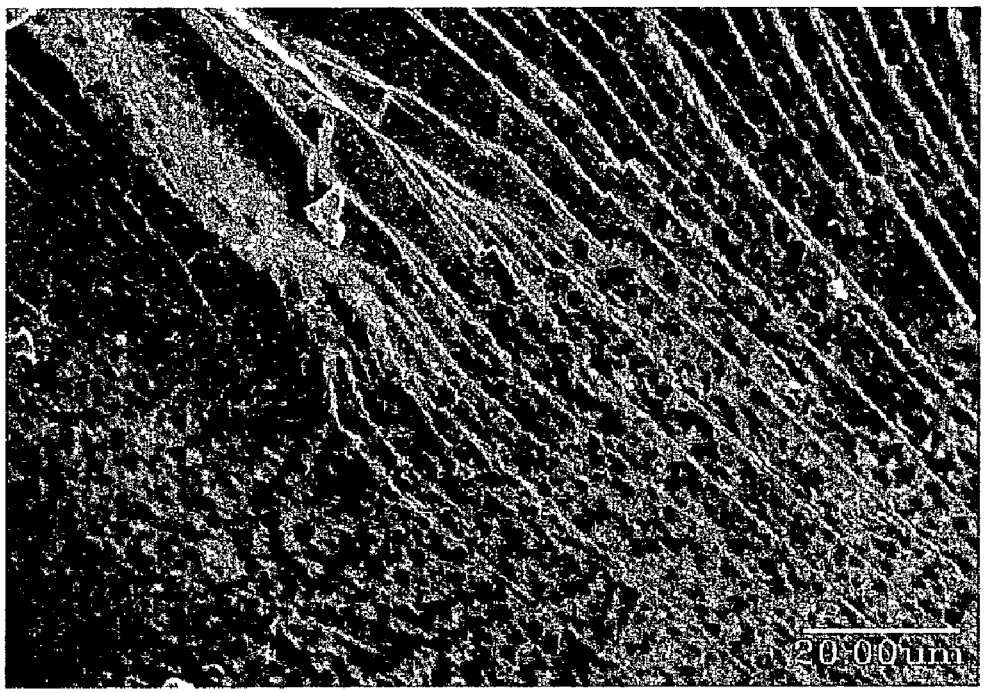
FIG. 8 is a Scanning Electron Micrograph (SEM) of fractured surface of material prepared in Example 30.

Classic glass fracture characteristics were noticeable in the material of Example 30, even after crystallization took place. The fracture surface shown in FIG. 7 is a good example of Wallner lines, common in most glass fracture. The fracture surface shown in FIG. 8 displays hackle, another common characteristic of glass fracture. The definitions of Wallner lines and hackle are taken as those given in the textbook, *Fundamentals of Inorganic Glasses*, Arun K Varshneya, p. 425–27, 1994.

The average hardness of the material of Example 30 was determined as follows. Several particles were mounted in mounting resin (obtained under the trade designation "TRANSOPTIC POWDER" from Buehler, Lake Bluff, Ill.). The resulting cylinder of resin was about 2.5 cm in diameter and about 1.9 cm high. The mounted section was prepared using conventional polishing techniques using a polisher (obtained from Buehler, Lake Bluff, Ill. under the trade designation "ECOMET 3"). The sample was polished for about 3 minutes with a diamond wheel, followed by 5 minutes of polishing with each of 45, 30, 15, 9, 3 and 1-micrometer slurries. The microhardness measurements were made using a conventional microhardness tester (obtained under the trade designation "MITUTOYO MVK-VL" from Mitutoyo Corporation, Tokyo, Japan) fitted with a Vickers indenter using a 500-gram indent load. The microhardness measurements were made according to the guidelines stated in ASTM Test Method E384 Test Methods for Microhardness of Materials (1991), the disclosure of which is incorporated herein by reference. The microhardness were an average of 20 measurements. The average microhardness of the material of Example 30 was 16.4 GPa.

For Example 31, the second half of the bar was heat-treated at 1300° C. for 1 hour in an electrically heated furnace (obtained from CM Furnaces, Bloomfield, N.J. under the trade designation "Rapid Temp Furnace"). The heat-treated bar was crushed with a hammer into particles of −30+35 mesh size (i.e., the fraction collected between 600-micrometer opening size and 500-micrometer opening size screens). The particles were mounted and viewed using above described methods.

Figure 9:
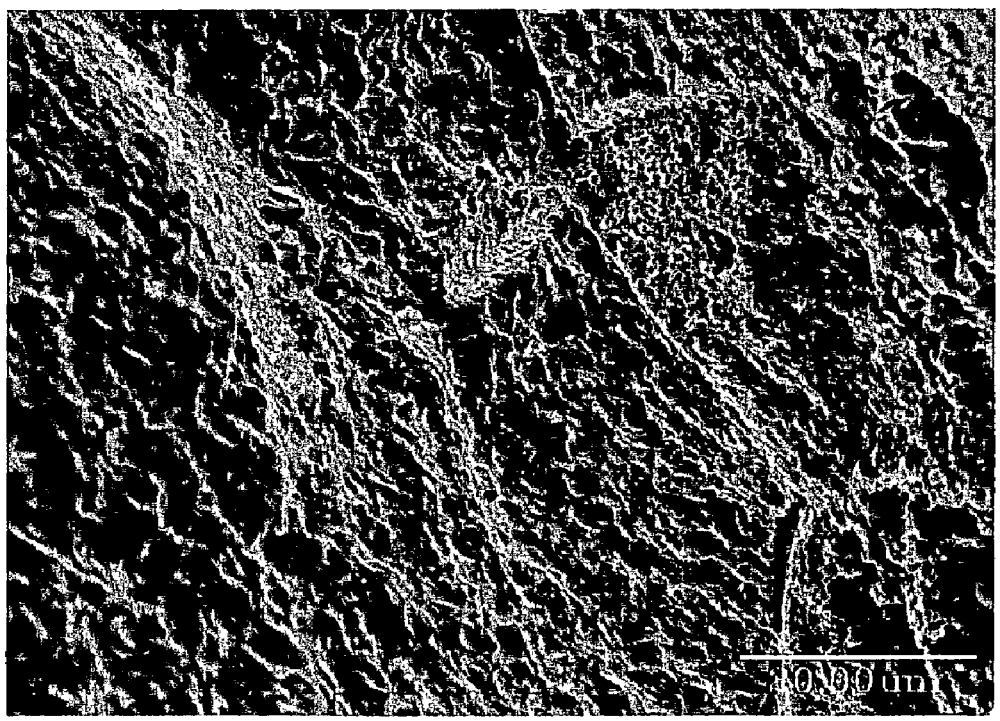
FIG. 9 is a Scanning Electron Micrograph (SEM) of fractured surface of material prepared in Example 31.

In contrast to the glass-fractured surface of the material of Example 30, the material of Example 31 exhibited fractured surfaces commonly seen in polycrystalline material. The fractured surface shown in FIG. 9 shows a rough surface with feature similar in size to the crystal size, typical of transgranular fracture.

Example 32

Figure 10:
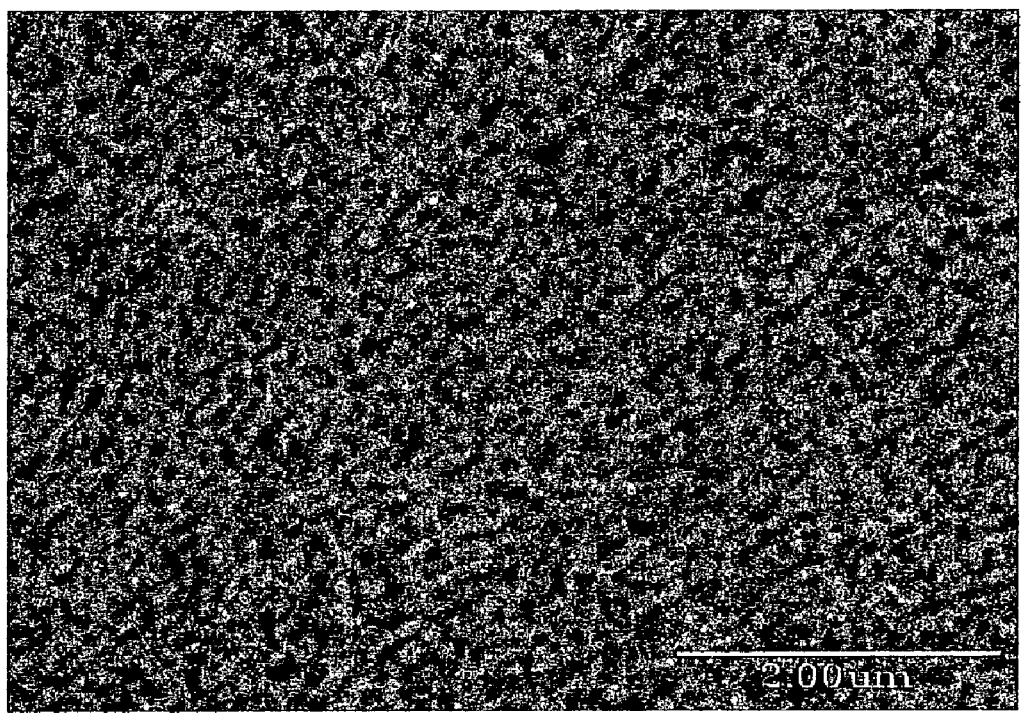
FIG. 10 is a back scattered electron micrograph of the material prepared in Example 32.

Beads from Example 4 were heat-treated at 1300° C. for 30 minutes in an electrically heated furnace. The crystallized beads were mounted and polished as described in Examples 30–31 and coated with a thin layer of gold-palladium and view using a JEOL SEM (Model JSM 840A). FIG. 10 is a typical back-scattered electron (BSE) micrograph of the microstructure found in crystallized beads. The crystallized sample was nanocrystalline with very narrow distribution of crystal size, with no crystals being larger than 200 nm visually observed from the micrograph.

The average crystal size was determined by the line intercept method according to the ASTM standard E 112-96 "Standard Test Methods for Determining Average Grain Size". The sample was mounted in mounting resin (obtained under the trade designation "TRANSOPTIC POWDER" from Buehler, Lake Bluff, Ill.). The resulting cylinder of resin was about 2.5 cm in diameter and about 1.9 cm high. The mounted section was prepared using conventional polishing techniques using a polisher (obtained from Buehler, Lake Bluff, Ill. under the trade designation "ECOMET 3"). The sample was polished for about 3 minutes with a diamond wheel, followed by 5 minutes of polishing with each of 45, 30, 15, 9, 3, and 1-micrometer slurries. The mounted and polished sample was coated with a thin layer of gold-palladium and view using a JEOL SEM (Model JSM 840A). A typical back-scattered electron (BSE) micrograph of the microstructure found in the sample was used to determine the average crystal size as follows. The number of crystals that intersected per unit length ($N_L$) of a random line were drawn across the micrograph was counted. The average crystal size is determined from this number using the following equation.

$$\text{Average Crystal Size} = \frac{1.5}{N_L M}$$

Where $N_L$ is the number of crystals intersected per unit length and M is the magnification of the micrograph. The average crystal size in the sample was 140 nm, as measured by line-intercept method.

Example 33

The consolidated material produced in Example 21 was heat treated at 1300° C. for 45 minutes in an electrically heated furnace (obtained from CM Furnaces, Bloomfield, N.J. under the trade designation "Rapid Temp Furnace"). The resulting crystalline material was crushed by using a "Chipmunk" jaw crusher (Type VD, manufactured by BICO Inc., Burbank, Calif.) into abrasive particles and graded to retain the −30+35 fraction (i.e., the fraction collected between 600-micrometer opening size and 500-micrometer opening size screens) and the −35+40 mesh fraction (i.e., the fraction collected 500-micrometer opening size and 5425-micrometer opening size screens). The two mesh fractions were combined to provide a 50/50 blend.

An aspect ratio measurement was taken using the method of Example 26. The resulting aspect ratio was 1.84.

Density of the particles was taken using the method of Example 26. The resulting density was 5.19 g/cc.

Example 34

About 150 grams of the beads prepared as described in Example 1 were placed in a 5 centimeter (cm)×5 cm×5 cm steel can, which was then evacuated and sealed from the atmosphere. The steel can was subsequently hot-isostatically pressed (HIPed) using a HIP apparatus (obtained under the trade designation "IPS Eagle-6", American Isostatic Pressing, Ohio). The HIPing was carried out at 207 MPa (30 ksi) pressure in an argon atmosphere. The HIPing furnace was ramped up to 970° C. at 25° C./minute and held at that temperature for 30 minutes. After the HIPing, the steel can was cut and the charge material removed. It was observed that beads coalesced into a chunk of transparent, glassy material. The DTA trace, conducted as described in Example 1–20, exhibited a glass transition ($T_g$) of 879° C. and a crystallization temperature ($T_x$) of 931° C.

Example 35

A polyurethane-lined mill was charged with 819.6 grams of alumina particles ("APA-0.5"), 818 grams of lanthanum oxide particles (obtained from Molycorp, Inc.), 362.4 grams of yttria-stabilized zirconium oxide particles (with a nominal composition of 94.6 wt-% $ZrO_2$ (+$HfO_2$) and 5.4 wt-% $Y_2O_3$; obtained under the trade designation "HSY-3" from Zirconia Sales, Inc. of Marietta, Ga.), 1050 grams of distilled water and about 2000 grams of zirconia milling media (obtained from Tosoh Ceramics, Division of Bound Brook, N.J., under the trade designation "YTZ"). The mixture was milled at 120 revolutions per minute (rpm) for 4 hours to thoroughly mix the ingredients. After the milling, the milling media were removed and the slurry was poured onto a glass ("PYREX") pan where it was dried using a heat-gun. The dried mixture was ground with a mortar and pestle and screened through a 70-mesh screen (212-micrometer opening size). After grinding and screening, some of the particles were fed into a hydrogen/oxygen torch flame as described in Example 22.

Figure 11:
FIG. 11 is an optical photomicrograph of a sectioned bar (2-mm thick) of the hot-pressed material demonstrating its transparency.

About 50 grams of the beads was placed in a graphite die and hot-pressed using a uniaxial pressing apparatus (obtained under the trade designation "HP-50", Thermal Technology Inc., Brea, Calif.). The hot-pressing was carried out at 960° C. in an argon atmosphere and 13.8 megapascals (MPa) (2000 pounds per square inch (2 ksi)) pressure. The resulting translucent disk was about 48 millimeters in diameter, and about 5 mm thick. Additional hot-press runs were performed to make additional disks. FIG. 11 is an optical photomicrograph of a sectioned bar (2-mm thick) of the hot-pressed material demonstrating its transparency.

The density of the resulting hot-pressed glass material was measured using Archimedes method, and found to be within a range of about 4.1–4.4 g/cm$^3$. The Youngs' modulus (E) of the resulting hot-pressed glass material was measured using a ultrasonic test system (obtained from Nortek, Richland, Wash. under the trade designation "NDT-140"), and found to be within a range of about 130–150 GPa.

The average microhardnesses of the resulting hot-pressed material was determined as follows. Pieces of the hot-pressed material (about 2–5 millimiters in size) were mounted in mounting resin (obtained under the trade designation "ECOMET 3" from Buehler Ltd., Lake Bluff, Ill.). The resulting cylinder of resin was about 2.5 cm (1 inch) in diameter and about 1.9 cm (0.75 inch) tall (i.e., high). The mounted samples were polished using a conventional grinder/polisher (obtained under the trade designation "ECOMET 3" from Buehler Ltd.) and conventional diamond slurries with the final polishing step using a 1-micrometer diamond slurry (obtained under the trade designation "METADI" from Buehler Ltd.) to obtain polished cross-sections of the sample.

The microhardness measurements were made using a conventional microhardness tester (obtained under the trade designation "MITUTOYO MVK-VL" from Mitutoyo Corporation, Tokyo, Japan) fitted with a Vickers indenter using a 500-gram indent load. The microhardness measurements were made according to the guidelines stated in ASTM Test Method E384 Test Methods for Microhardness of Materials (1991), the disclosure of which is incorporated herein by reference. The microhardness values were an average of 20 measurements. The average microhardness of the hot-pressed material was about 8.3 GPa.

The average indentation toughness of the hot-pressed material was calculated by measuring the crack lengths extending from the apices of the vickers indents made using a 500 gram load with a microhardness tester (obtained under the trade designation "MITUTOYO MVK-VL" from Mitutoyo Corporation, Tokyo, Japan). Indentation toughness ($K_{IC}$) was calculated according to the equation:

$$K_{IC} = 0.016(E/H)^{1/2}(P/c)^{3/2}$$

wherein:
E=Young's Modulus of the material;
H=Vickers hardness;
P=Newtons of force on the indenter;
c=Length of the crack from the center of the indent to its end.

Samples for the toughness were prepared as described above for the microhardness test. The reported indentation toughness values are an average of 5 measurements. Crack (c) were measured with a digital caliper on photomicrographs taken using a scanning electron microscope ("JEOL SEM" (Model JSM 6400)). The average indentation toughness of the hot-pressed material was 1.4 MPa·m$^{1/2}$.

The thermal expansion coefficient of the hot-pressed material was measured using a thermal analyser (obtained from Perkin Elmer, Shelton, Conn., under the trade designation "PERKIN ELMER THERMAL ANALYSER"). The average thermal expansion coefficient was $7.6 \times 10^{-6}$/° C.

The thermal conductivity of the hot-pressed material was measured according to an ASTM standard "D 5470-95, Test Method A" (1995), the disclosure of which is incorporated herein by reference. The average thermal conductivity was 1.15 W/m·K.

The translucent disk of hot-pressed $La_2O_3$—$Al_2O_3$—$ZrO_2$ glass was heat-treated in a furnace (an electrically heated furnace (obtained under the trade designation "Model KKSK-666-3100" from Keith Furnaces of Pico Rivera, Calif.)) as follows. The disk was first heated from room temperature (about 25° C.) to about 900° C. at a rate of about 10° C./min and then held at 900° C. for about 1 hour. Next, the disk was heated from about 900° C. to about 1300° C. at a rate of about 10° C./min and then held at 1300° C. for about 1 hour, before cooling back to room temperature by turning off the furnace. Additional runs were performed with the same heat-treatment schedule to make additional disks.

Figure 12:
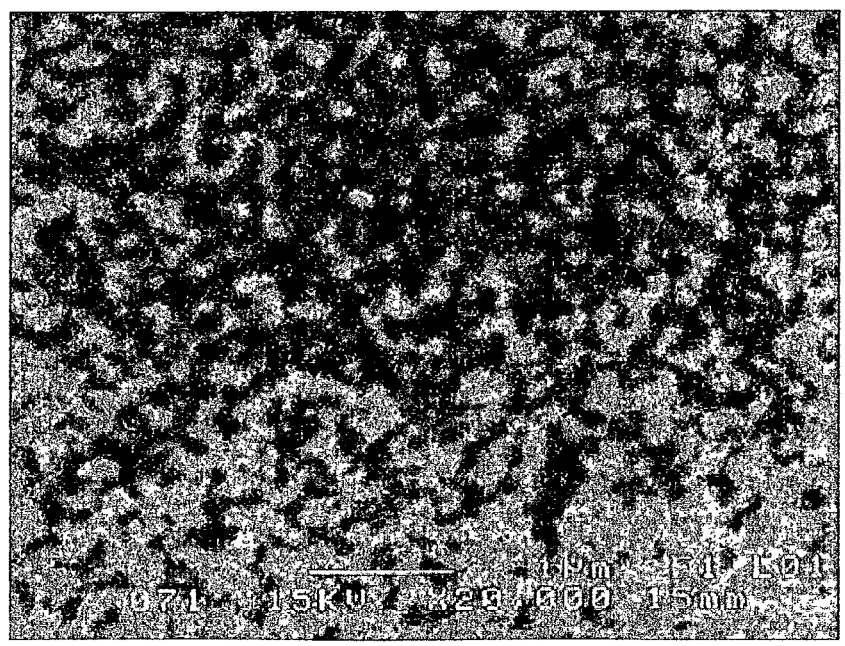
FIG. 12 is a Scanning Electron Micrograph (SEM) photomicrograph of a polished section of heat-treated Example 35 material.

FIG. 12 is a scanning electron microscope (SEM) photomicrograph of a polished section of heat-treated Example 35 material showing the fine crystalline nature of the material. The polished section was prepared using conventional mounting and polishing techniques. Polishing was done using a polisher (obtained from Buehler of Lake Bluff, Ill. under the trade designation "ECOMET 3 TYPE POLISHER-GRINDER"). The sample was polished for about 3 minutes with a diamond wheel, followed by three minutes of polishing with each of 45, 30, 15, 9, and 3-micrometer diamond slurries. The polished sample was coated with a thin layer of gold-palladium and viewed using JEOL SEM (Model JSM 840A).

Based on powder X-ray diffraction as described in Example 22 of a portion of heat-treated Example 35 material and examination of the polished sample using SEM in the backscattered mode, it is believed that the dark portions in the photomicrograph were crystalline $LaAl_{11}O_{18}$, the gray portions crystalline $LaAlO_3$, and the white portions crystalline cubic/tetragonal $ZrO_2$.

The density of the heat-treated material was measured using Archimedes method, and found to be about 5.18 g/cm$^3$. The Youngs' modulus (E) of the heat-treated material was measured using an ultrasonic test system (obtained from Nortek, Richland, Wash. under the trade designation "NDT-140"), and found to be about 260 GPa. The average microhardness of the heat-treated material was determined as described above for the Example 35 glass beads, and was found to be 18.3 GPa. The average fracture toughness ($K_{IC}$) of the heat-treated material was determined as described above for the Example 35 hot-pressed material, and was found to be 3.3 MPa·m$^{1/2}$.

Examples 36–38

Examples 36–38 beads were prepared as described in Example 35, except the raw materials and the amounts of raw materials, used are listed in Table 3, below, and the milling of the raw materials was carried out in 90 milliliters (ml) of isopropyl alcohol with 200 grams of the zirconia media (obtained from Tosoh Ceramics, Division of Bound Brook, N.J., under the trade designation "YTZ") at 120 rpm for 24 hours. The sources of the raw materials used are listed in Table 4, below.

TABLE 3

| Example | Weight percent of components | Batch amounts, g |
|---|---|---|
| 36* | La$_2$O$_3$: 48 | La$_2$O$_3$: 240 |
|  | Al$_2$O$_3$: 52 | Al$_2$O$_3$: 260 |
| 37 | Al$_2$O$_3$: 41.0 | Al$_2$O$_3$: 20.5 |
|  | ZrO$_2$: 18.0 | ZrO$_2$: 9.0 |
|  | Gd$_2$O$_3$: 41.0 | Gd$_2$O$_3$: 20.5 |
| 38 | Y$_2$O$_3$: 19 | Y$_2$O$_3$: 9.5 |
|  | Al$_2$O$_3$: 51 | Al$_2$O$_3$: 25.5 |
|  | ZrO$_2$: 17.9 | ZrO$_2$: 8.95 |
|  | La$_2$O$_3$: 12.1 | La$_2$O$_3$: 6.05 |

*For this example, same milling procedure as in Example 36 was used.

TABLE 4

| Raw Material | Source |
|---|---|
| Alumina particles (Al$_2$O$_3$) | Obtained from Condea Vista, Tucson, AZ under the trade designation "APA-0.5" |
| Gadolinium oxide particles (Gd$_2$O$_3$) | Obtained from Molycorp Inc., Mountain Pass, CA |
| Lanthanum oxide particles (La$_2$O$_3$) | Obtained from Molycorp Inc., Mountain Pass, CA |
| Yttria-stabilized zirconium oxide particles (Y-PSZ) | Obtained from Zirconia Sales, Inc. of Marietta, GA under the trade designation "HSY-3" |
| Yttrium oxide particles (Y$_2$O$_3$) | Obtained from H.C. Stark Newton, MA |

Various properties/characteristics of some Example 36–39 materials were measured as follows. Powder X-ray diffraction (using an X-ray diffractometer (obtained under the trade designation "PHILLIPS XRG 3100" from PHILLIPS, Mahwah, N.J.) with copper K<1 α1 radiation of 1.54050 Angstrom) was used to qualitatively measure phases present in example materials. The presence of a broad diffused intensity peak was taken as an indication of the amorphous nature of a material. The existence of both a broad peak and well-defined peaks was taken as an indication of the existence of crystalline matter within an amorphous matrix. Phases detected in various examples are reported in Table 5, below.

TABLE 5

| Example | Phases detected via X-ray diffraction | Color | T$_g$, ° C. | T$_x$, ° C. | Hot-pressing temp., ° C. |
|---|---|---|---|---|---|
| 36 | Amorphous* | Clear | 840 | 925 | 960 |
| 37 | Amorphous* | Clear | 886 | 933 | 985 |
| 38 | Amorphous* | Clear | 843 | 938 | 970 |

*glass, as the example has a T$_g$

For differential thermal analysis (DTA), a material was screened to retain beads in the 90–125 micrometer size range. DTA runs were made (using an instrument obtained from Netzsch Instruments, Selb, Germany under the trade designation "NETZSCH STA 409 DTA/TGA"). The amount of each screened sample placed in a 100-microliter Al$_2$O$_3$ sample holder was 400 milligrams. Each sample was heated in static air at a rate of 10° C./minute from room temperature (about 25° C.) to 1200° C.

For each of Examples 36–38, about 25 grams of the beads were placed in a graphite die and hot-pressed using a uniaxial pressing apparatus (obtained under the trade designation "HP-50", Thermal Technology Inc., Brea, Calif.). The hot-pressing was carried out in an argon atmosphere and 13.8 megapascals (MPa) (2000 pounds per square inch (2 ksi)) pressure. The hot-pressing temperature at which appreciable glass flow occurred, as indicated by the displacement control unit of the hot pressing equipment described above, is reported for various examples in Table 5, above. About 400 grams of Example 36 beads and 200 grams of Example 37 beads were hot-pressed.

Example 36–38 beads were, heat-treated in a furnace (an electrically heated furnace (obtained under the trade designation "Model KKSK-666-3100" from Keith Furnaces of Pico Rivera, Calif.)) as follows. The beads were heated from room temperature (about 25° C.) to about 1300° C. at a rate of about 10° C./minute and then held at 1300° C. for about 1 hour before cooling back to room temperature by turning off the furnace.

Figure 13:
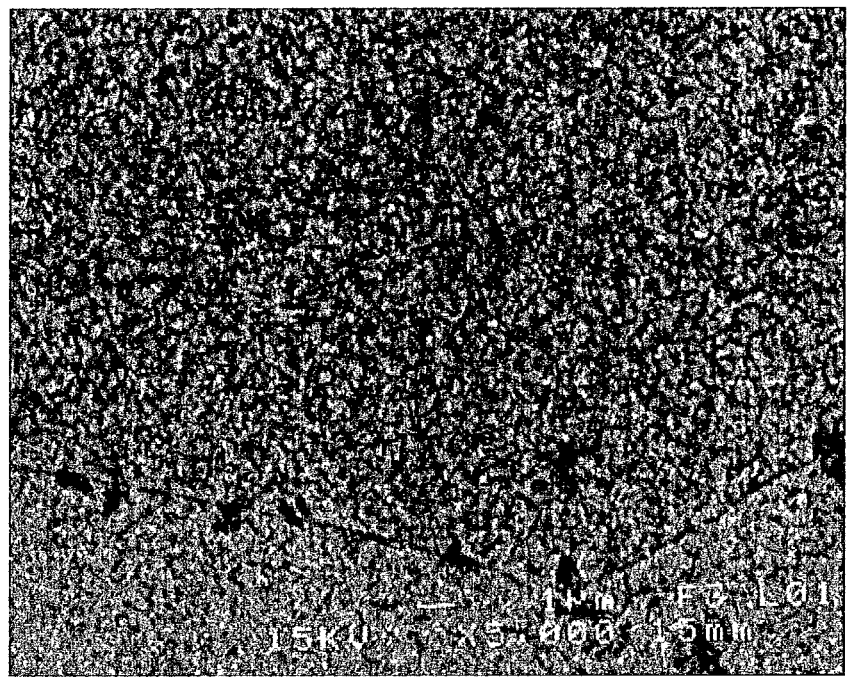
FIGS. 13 and 14 are Scanning Electron Micrograph (SEM) photomicrographs of a polished section of heat-treated Examples 36 and 37 materials, respectively.
Figure 14:
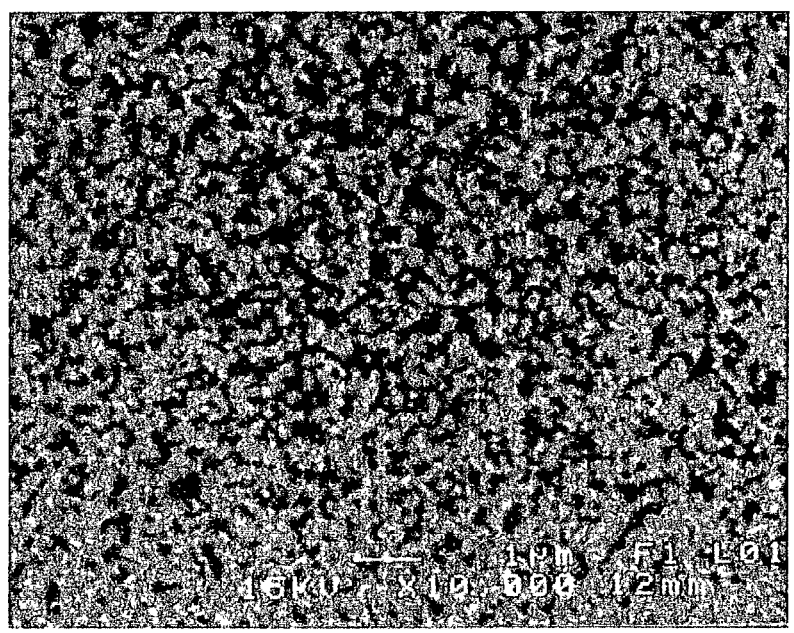

FIGS. 13 and 14 are scanning electron microscope (SEM) photomicrographs of a polished section of heat-treated Examples 36 and 37 materials, respectively. The polished sections were prepared using conventional mounting and polishing techniques. Polishing was done using a polisher (obtained from Buehler of Lake Bluff, Ill. under the trade designation "ECOMET 3 TYPE POLISHER-GRINDER"). The sample was polished for about 3 minutes with a diamond wheel, followed by three minutes of polishing with each of 45, 30, 15, 9, and 3-micrometer diamond slurries. The polished sample was sputter coated with a thin layer of gold-palladium and viewed using JEOL SEM (Model JSM 840A).

Phases present after heat-treatment were analyzed using powder X-ray diffraction techniques described above. The results are summarized in Table 6, below.

TABLE 6

| Example | Phases detected via X-ray diffraction | Hardness, GPa |
|---|---|---|
| 35 | Cubic/tetragonal ZrO$_2$ | 16.4 ± 0.3 |
|  | α-Al$_2$O$_3$ |  |
|  | LaAl$_{11}$O$_{18}$ |  |
|  | LaAlO$_3$ |  |
| 36 | LaAl$_{11}$O$_{18}$ | 16.0 ± 0.4 |
|  | LaAlO$_3$ |  |
| 37 | Cubic/tetragonal ZrO$_2$ | 16.9 ± 0.1 |
|  | GdAlO$_3$ |  |
|  | α-Al$_2$O$_3$ |  |
| 38 | Cubic/tetragonal ZrO$_2$ |  |
|  | Y$_3$Al$_5$O$_{12}$ |  |
|  | LaAlO$_3$ |  |
|  | α-Al$_2$O$_3$ |  |

The average microhardnesses of heat-treated beads from selected Examples 35–38 were measured by mounting loose beads (about 125 micrometers in size) in mounting resin (obtained under the trade designation "ECOMET 3" from Buehler Ltd., Lake Bluff, Ill.). The resulting cylinder of resin was about 2.5 cm (1 inch) in diameter and about 1.9 cm (0.75 inch) high. The mounted samples were polished using a conventional grinder/polisher (obtained under the trade designation "ECOMET 3" from Buehler Ltd.) and conventional diamond slurries with the final polishing step using a 1-micrometer diamond slurry (obtained under the trade designation "METADI" from Buehler Ltd.) to obtain polished cross-sections of the sample.

The microhardness measurements were made using a conventional microhardness tester (obtained under the trade designation "MITUTOYO MVK-VL" from Mitutoyo Corporation, Tokyo, Japan) fitted with a Vickers indenter using a 500-gram indent load. The microhardness measurements were made according to the guidelines stated in ASTM Test Method E384 Test Methods for Microhardness of Materials (1991), the disclosure of which is incorporated herein by reference. The microhardness values were an average of 20 measurements. The average microhardness values are reported in Table 6, above.

Grinding Performance of Examples 35, 35A, and 36 and Comparative Examples D–F

Examples 35 and 36 hot-pressed material was crushed by using a "Chipmunk" jaw crusher (Type VD, manufactured by BICO Inc., Burbank, Calif.) into (abrasive) particles and graded to retain the −25+30 mesh fraction (i.e., the fraction collected between 25-micrometer opening size and 30-micrometer opening size sieves) and −30+35 mesh fractions (i.e., the fraction collected between 30-micrometer opening size and 35-micrometer opening size sieves) (USA Standard Testing Sieves). These two mesh fractions were combined to provide a 50/50 blend. The blended material was heat treated at 1300° C. for 1 hour as described above. Thirty grams of the resulting glass-ceramic abrasive particles were incorporated into a coated abrasive disc. The coated abrasive disc was made according to conventional procedures. The glass-ceramic abrasive particles were bonded to 17.8 cm diameter, 0.8 mm thick vulcanized fiber backings (having a 2.2 cm diameter center hole) using a conventional calcium carbonate-filled phenolic make resin (48% resole phenolic resin, 52% calcium carbonate, diluted to 81% solids with water and glycol ether) and a conventional cryolite-filled phenolic size resin (32% resole phenolic resin, 2% iron oxide, 66% cryolite, diluted to 78% solids with water and glycol ether). The wet make resin weight was about 185 g/m². Immediately after the make coat was applied, the glass-ceramic abrasive particles were electrostatically coated. The make resin was precured for 120 minutes at 88° C. Then the cryolite-filled phenolic size coat was coated over the make coat and abrasive particles. The wet size weight was about 850 grams per square (g/m²). The size resin was cured for 12 hours at 99° C. The coated abrasive discs were flexed prior to testing.

Example 35A coated abrasive disk was prepared as described for Example 36 except the Example 35A abrasive particles were obtained by crushing a hot-pressed and heat-treated Example 35 material, rather than crushing then heat-treating.

Comparative Example D coated abrasive discs were prepared as described for Example 35, except heat-treated fused alumina abrasive particles (obtained under the trade designation "ALODUR BFRPL" from Triebacher, Villach, Austria) was used in place of the 35 glass-ceramic abrasive particles.

Comparative Example E coated abrasive discs were prepared as described for Example 35, except alumina-zirconia abrasive particles (having a eutectic composition of 53% $Al_2O_3$ and 47% $ZrO_2$; obtained under the trade designation "NORZON" from Norton Company, Worcester, Mass.) were used in place of the Example 35 glass-ceramic abrasive particles.

Comparative Example F coated abrasive discs were prepared as described above except sol-gel-derived abrasive particles (marketed under the trade designation "321 CUBITRON" from the 3M Company, St. Paul, Minn.) were used in place of the Example 35 glass-ceramic abrasive particles.

The grinding performance of Examples 35, 35A, 36, and Comparative Examples D–F coated abrasive discs were evaluated as follows. Each coated abrasive disc was mounted on a beveled aluminum back-up pad, and used to grind the face of a pre-weighed 1.25 cm×18 cm×10 cm 1018 mild steel workpiece. The disc was driven at 5,000 rpm while the portion of the disc overlaying the beveled edge of the back-up pad contacted the workpiece at a load of 8.6 kilograms. Each disc was used to grind an individual workpiece in sequence for one-minute intervals. The total cut was the sum of the amount of material removed from the workpieces throughout the test period. The total cut by each sample after 12 minutes of grinding as well as the cut at the 12th minute (i.e., the final cut) are reported in Table 7, below. The Example 35 and 36 results are an average of two discs, where as one disk was tested for each of Example 35A and Comparative Examples D, E, and F.

TABLE 7

| Example | Total cut, g | Final cut, g |
|---------|--------------|--------------|
| 35 | 1163 | 91 |
| 35A | 1197 | 92 |
| 36 | 1094 | 91 |
| Comp. D | 514 | 28 |
| Comp. E | 689 | 53 |
| Comp. F | 1067 | 89 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Glass-ceramic having an average hardness of at least 13 GPa, wherein the glass-ceramic has x, y, and z dimensions each perpendicular to each other, and wherein each of the x, y, and z dimensions is at least 5 mm.

2. The glass-ceramic according to claim 1 wherein the hardness is at least 15 GPa.

3. The glass-ceramic according to claim 1 wherein the hardness is at least 16 GPa.

4. The glass-ceramic according to claim 3 wherein the hardness is at least 17 GPa.

5. The glass-ceramic according to claim 4 wherein the hardness is at least 18 GPa.

6. The glass-ceramic according to claim 1 comprising at least 35 percent by weight $Al_2O_3$, based on the total weight of the glass-ceramic.

7. The glass-ceramic according to claim 1 wherein the glass-ceramic contains not more than 10 percent by weight collectively $As_2O_3$, $B_2O_3$, $GeO_2$, $P_2O_5$, $SiO_2$, $TeO_2$, and $V_2O_5$, based on the total weight of the glass.

8. Beads comprising the glass-ceramic according to claim 1.

9. A plurality of abrasive particles having a specified nominal grade, wherein at least a portion of the plurality of abrasive particles comprise a glass-ceramic having an average hardness of at least 15 GPa.

10. The plurality of abrasive particles according to claim 9 wherein the hardness is at least 16 GPa.

11. The plurality of abrasive particles according to claim 10 wherein the hardness is at least 18 GPa.

12. The plurality of abrasive particles according to claim 9 wherein the specified nominal grade is selected from the group consisting of ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600.

13. The plurality of abrasive particles according to claim 9 wherein the specified nominal grade is selected from the group consisting of P8, P12, P16, P24, P36, P40, P50, P60, P80, P100, P120, P150, P180, P220, P320, P400, P500, P600, P800, P1000, and P1200.

14. The plurality of abrasive particles according to claim 9 wherein the specified nominal grade is selected from the group consisting of JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

15. An abrasive article comprising a binder and a plurality of abrasive particles, wherein at least a portion of the abrasive particles comprise a glass-ceramic having an average hardness of at least 15 GPa.

16. The abrasive article according to claim 15 wherein the abrasive article is a bonded abrasive article, a non-woven abrasive article, or a coated abrasive article.

17. A method of abrading a surface, the method comprising:
providing an abrasive article comprising a binder and a plurality of abrasive particles, wherein at least a portion of the abrasive particles comprise a glass-ceramic having an average hardness of at least 15 GPa;
contacting at least one of the abrasive particles comprise glass-ceramic with a surface of a workpiece; and
moving at least one of the contacted abrasive particles comprising glass-ceramic or the contacted surface to abrade at least a portion of the surface with the contacted abrasive particle comprising glass-ceramic.

18. A method for making glass-ceramic, the method comprising:
heat-treating amorphous material such that at least a portion of the amorphous material converts to a glass-ceramic, the amorphous material comprising at least 35 percent by weight $Al_2O_3$, based on the total weight of the amorphous material, and a metal oxide other than $Al_2O_3$, wherein the amorphous material contains not more than 10 percent by weight collectively $As_2O_3$, $B_2O_3$, $GeO_2$, $P_2O_5$, $SiO_2$, $TeO_2$, and $V_2O_5$, based on the total weight of the amorphous material, wherein the glass-ceramic has an average hardness of at least 13 GPa, wherein the glass-ceramic has x, y, and z dimensions each perpendicular to each other, and wherein each of the x, y, and z dimensions is at least 5 mm.

19. A method for making a glass-ceramic article, the method comprising:
providing glass particles, the glass comprising at least 35 percent by weight $Al_2O_3$, based on the total weight of the glass of each particle, and a metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass of each particle, the glass having a $T_g$;
heating the glass particles above the $T_g$ such that the glass particles coalesce to form a shape;
cooling the shape to provide a glass article, and
heat-treating the glass article such that at least a portion of the glass converts to glass-ceramic to provide a glass-ceramic article, wherein the glass-ceramic has an average hardness of at least 13 GPa.

20. A method for making abrasive particles, the method comprising:
heat-treating particles comprising amorphous material such that at least a portion of the amorphous material is converted to a glass-ceramic and provides abrasive particles comprising the glass-ceramic, the amorphous material of each particle comprising at least 35 percent by weight $Al_2O_3$, based on the total weight of the amorphous material of each particle, and a metal oxide other than $Al_2O_3$, wherein the amorphous material of each particle contains not more than 10 percent by weight collectively $As_2O_3$, $B_2O_3$, $GeO_2$, $P_2O_5$, $SiO_2$, $TeO_2$, and $V_2O_5$, based on the total weight of the amorphous material of each particle, wherein the glass-ceramic has an average hardness of at least 15 GPa.

21. The method according to claim 20 wherein prior to the heat-treating the particles comprising the amorphous material, a plurality of particles having a specified nominal grade is provided, wherein at least a portion of the particles is a plurality of the glass particles, and wherein the heat-treating is conducted such that a plurality of abrasive particles having a specified nominal grade is provided, wherein at least a portion of the abrasive particles is a plurality of the abrasive particles comprising the glass-ceramic.

22. The method according to claim 20 further comprising grading the abrasive particles comprising the glass-ceramic to provide a plurality of abrasive particles having a specified nominal grade, wherein at least a portion of the plurality of abrasive particles is a plurality of the abrasive particles comprising the glass-ceramic.

23. A method for making abrasive particles, the method comprising:
heat-treating amorphous material such that at least a portion of the amorphous material is converted to a glass-ceramic, the amorphous material comprising at least 35 percent by weight $Al_2O_3$, based on the total weight of the amorphous material, and a metal oxide other than $Al_2O_3$, wherein the amorphous material contains not more than 10 percent by weight collectively $As_2O_3$, $B_2O_3$, $GeO_2$, $P_2O_5$, $SiO_2$, $TeO_2$, and $V_2O_5$, based on the total weight of the amorphous material, wherein the glass-ceramic has an average hardness of at least 15 GPa; and
crushing the glass-ceramic to provide abrasive particles comprising the glass-ceramic.

24. A method for making glass-ceramic, the method comprising:
combining at least (a) glass comprising at least 35 percent by weight $Al_2O_3$, based on the total weight of the glass, and at least one other metal oxide, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass, the glass having a $T_g$ and (b) refractory particles relative to the glass particles;
heating the glass particles above the $T_g$ such that the glass particles coalesce;
cooling the glass to provide ceramic; and
heat-treating the glass of the ceramic such that at least a portion of the glass converts to glass-ceramic to provide the glass-ceramic, wherein the glass-ceramic has an average hardness of at least 13 GPa.

25. The glass-ceramic according to claim 1 in the form of an IR window.

* * * * *

UNITED STATES PATENT AND TRADEMARK OFFICE
CERTIFICATE OF CORRECTION

PATENT NO.        : 7,147,544 B2
APPLICATION NO. : 10/211044
DATED             : December 12, 2006
INVENTOR(S)       : Anatoly Z. Rosenflanz It is certified that error appears in the above-identified patent and that said Letters Patent is hereby corrected as shown below:

<u>On Page 2 of the Title Pages, Item [56] Column 1, under (U.S. Patent Documents)</u>
Line 5, after "11/1952" delete "Cornstock, III" and insert
   -- Comstock, III --, therefor.
Line 32, after "12/1975" delete "Plesstinger et al." and insert -- Plesslinger et al. --, therefor.

<u>On Page 2 of the Title Pages, Item [56] Column 2, under (U.S. Patent Documents)</u>
Line 72, below "5,395,407A  3/1995  Cottringer et al." delete
   "5,395,407A  3/1995  Cottringer et al.". (Repeated Entry)

<u>On Page 4 of the Title Pages, Item [56] Column 1, under (Other Publications)</u>
Line 17, delete "ZrO2" and insert -- $ZrO_2$ --, therefor.
Line 42, delete "368-374,." and insert -- 368-374. --, therefor.

<u>On Page 4 of the Title Pages, Column 2, under (Other Publications)</u>
Line 34, delete "$ZRO_2$" and insert -- $ZrO_2$ --, therefor.
Line 36, delete "$ZRO_2$" and insert -- $ZrO_2$ --, therefor.
Line 41, delete "$ZRO_2$" and insert -- $ZrO_2$ --, therefor.

<u>On Page 5 of the Title Pages, Column 1, under (Other Publications)</u>
Line 24, after "Kinetics" delete "on" and insert -- of --, therefor.
Line 33, delete "Microstructures" and insert -- Microstructure --, therefor.

<u>On Page 5 of the Title Pages, Item [56] Column 2, under (Other Publications)</u>
Line 5, delete "Rodriguez," and insert -- Rodriquez --, therefor.
Line 18, delete "Tai-11" and insert -- Tai-II --, therefor.
Line 20, delete "$Al_2O_3/REA10_3$" and insert -- $Al_2O_3/REAlO_3$ --, therefor.
Line 39, delete "65," and insert -- 55, --, therefor.

UNITED STATES PATENT AND TRADEMARK OFFICE
CERTIFICATE OF CORRECTION

PATENT NO. : 7,147,544 B2
APPLICATION NO. : 10/211044
DATED : December 12, 2006
INVENTOR(S) : Anatoly Z. Rosenflanz It is certified that error appears in the above-identified patent and that said Letters Patent is hereby corrected as shown below:

<u>Column 1</u>
Line 67, after "U.S. Pat." delete "No" and insert -- No. --, therefor.

<u>Column 2</u>
Line 29, after "U.S." delete "Pat" and insert -- Pat. --, therefor.

<u>Column 6</u>
Line 22, after "based" insert -- on the total --.
Line 66, after "coarse particles" insert -- to --.

<u>Column 13</u>
Line 6, after "10" insert -- , --.
Line 37, delete "be can" and insert -- can be --, therefor.

<u>Column 14</u>
Line 53, delete "10/211,604," insert -- 10/211,640, --, therefor.

<u>Column 17</u>
Line 3, after "conducted" delete "at".

<u>Column 19</u>
Line 3, delete "$LaAl_{11}O_{18}$,)," and insert -- $LaAl_{11}O_{18}$), --, therefor.

<u>Column 33</u>
Line 26, delete "Poulenc," and insert -- Poulence, --, therefor.

UNITED STATES PATENT AND TRADEMARK OFFICE
CERTIFICATE OF CORRECTION

PATENT NO.        : 7,147,544 B2
APPLICATION NO.   : 10/211044
DATED             : December 12, 2006
INVENTOR(S)       : Anatoly Z. Rosenflanz It is certified that error appears in the above-identified patent and that said Letters Patent is hereby corrected as shown below:

Column 45
Line 2, delete ($K_{IC}$) and insert -- ($K_{ic}$), --, therefor.

Column 46
Line 44, after "techniques" insert -- as --.

Signed and Sealed this

Second Day of December, 2008

JON W. DUDAS
*Director of the United States Patent and Trademark Office*